United States Patent
Bryers et al.

(10) Patent No.: US 7,765,328 B2
(45) Date of Patent: *Jul. 27, 2010

(54) CONTENT SERVICE AGGREGATION SYSTEM

(75) Inventors: Mark Bryers, Granite Bay, CA (US); Elango Ganesan, Palo Alto, CA (US); Frederick Gruner, Palo Alto, CA (US); David Hass, Santa Clara, CA (US); Robert Hathaway, Sunnyvale, CA (US); Ramesh Panwar, Pleasanton, CA (US); Ricardo Ramirez, Sunnyvale, CA (US); Abbas Rashid, Fremont, CA (US); Mark Vilas, San Jose, CA (US); Nazar Zaidi, Palo Alto, CA (US); Yen Lee, San Jose, CA (US); Chau Ahn Ngoc Nguyen, San Jose, CA (US); John Phillips, Santa Clara, CA (US); Yuhong Andy Zhou, Alameda, CA (US); Gregory G. Spurrier, Sunnyvale, CA (US); Sankar Ramanoorthi, San Jose, CA (US); Michael Freed, Pleasanton, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 237 days.

This patent is subject to a terminal disclaimer.

(21) Appl. No.: 11/983,135

(22) Filed: Nov. 7, 2007
(Under 37 CFR 1.47)

(65) Prior Publication Data

US 2008/0114887 A1    May 15, 2008

Related U.S. Application Data

(63) Continuation of application No. 10/191,742, filed on Jul. 8, 2002, now Pat. No. 7,305,492.

(60) Provisional application No. 60/303,354, filed on Jul. 6, 2001.

(51) Int. Cl.
    *G06F 15/16* (2006.01)
(52) U.S. Cl. .............. 709/249; 709/220; 709/221; 709/222; 709/223; 709/245
(58) Field of Classification Search .......... 709/220, 709/221, 222, 223, 245, 249
    See application file for complete search history.

(56) References Cited

U.S. PATENT DOCUMENTS 5,613,136 A    3/1997    Casavant et al.

(Continued)

OTHER PUBLICATIONS

Harmon, William "32-Bit Bus Master Ethernet Interface for the 68030 (Using the Macintosh SE/30)," Apr. 1993.

(Continued)

*Primary Examiner*—Yves Dalencourt
(74) *Attorney, Agent, or Firm*—Shumaker & Sieffert, P.A.

(57) ABSTRACT

A network content service apparatus includes a set of compute elements adapted to perform a set of network services; and a switching fabric coupling compute elements in said set of compute elements. The set of network services includes firewall protection, Network Address Translation, Internet Protocol forwarding, bandwidth management, Secure Sockets Layer operations, Web caching, Web switching, and virtual private networking. Code operable on the compute elements enables the network services, and the compute elements are provided on blades which further include at least one input/output port.

23 Claims, 50 Drawing Sheets

U.S. PATENT DOCUMENTS

| | | | |
|---|---|---|---|
| 5,721,855 | A | 2/1998 | Hinton et al. |
| 5,933,601 | A | 8/1999 | Fanshier et al. |
| 6,052,720 | A | 4/2000 | Traversat et al. |
| 6,101,500 | A | 8/2000 | Lau |
| 6,148,337 | A | 11/2000 | Estberg et al. |
| 6,163,544 | A | 12/2000 | Andersson et al. |
| 6,212,559 | B1 | 4/2001 | Bixler et al. |
| 6,223,260 | B1 | 4/2001 | Gujral et al. |
| 6,263,346 | B1 | 7/2001 | Rodriquez |
| 6,272,537 | B1 | 8/2001 | Kekic et al. |
| 6,310,890 | B1 | 10/2001 | Choi |
| 6,374,329 | B1 | 4/2002 | McKinney et al. |
| 6,389,464 | B1 | 5/2002 | Krishnamurthy et al. |
| 6,393,481 | B1 | 5/2002 | Deo et al. |
| 6,405,289 | B1 | 6/2002 | Arimilli et al. |
| 6,466,973 | B2 | 10/2002 | Jaffe |
| 6,477,566 | B1 | 11/2002 | Davis et al. |
| 6,477,572 | B1 | 11/2002 | Elderton et al. |
| 6,480,955 | B1 | 11/2002 | DeKoning et al. |
| 6,502,131 | B1 | 12/2002 | Vaid et al. |
| 6,510,164 | B1 | 1/2003 | Ramaswamy et al. |
| 6,516,345 | B1 | 2/2003 | Kracht |
| 6,529,941 | B2 | 3/2003 | Haley et al. |
| 6,563,800 | B1 | 5/2003 | Salo et al. |
| 6,636,242 | B2 | 10/2003 | Bowman-Amuah |
| 6,662,221 | B1 | 12/2003 | Gonda et al. |
| 6,681,232 | B1 | 1/2004 | Sistanizadeh et al. |
| 6,738,908 | B1 | 5/2004 | Bonn et al. |
| 6,804,816 | B1 | 10/2004 | Liu et al. |
| 6,816,905 | B1 | 11/2004 | Sheets et al. |
| 6,934,745 | B2 | 8/2005 | Krautkremer |
| 6,952,728 | B1 | 10/2005 | Alles et al. |
| 6,983,317 | B1 | 1/2006 | Bishop et al. |
| 6,990,517 | B1 | 1/2006 | Bevan et al. |
| 7,069,344 | B2 | 6/2006 | Carolan et al. |
| 7,082,463 | B1 | 7/2006 | Bradley et al. |
| 7,082,464 | B2 | 7/2006 | Hasan et al. |
| 7,305,492 | B2 * | 12/2007 | Bryers et al. ............... 709/249 |
| 2001/0042190 | A1 | 11/2001 | Tremblay et al. |
| 2002/0007443 | A1 | 1/2002 | Gharachorloo et al. |
| 2002/0032725 | A1 | 3/2002 | Araujo et al. |
| 2002/0038339 | A1 | 3/2002 | Xu |
| 2002/0105972 | A1 | 8/2002 | Richter et al. |
| 2003/0097428 | A1 | 5/2003 | Afkhami et al. |
| 2005/0021713 | A1 | 1/2005 | Dugan et al. |

OTHER PUBLICATIONS

Troutman, Denise "DP83916EB-AT: High Performance AT Compatible Bus Master Ethernet Adapter Card," Nov. 1992.

Papavassiliou, "Network and service management for wide-area electronic commerce networks," International Journal of Network Management, John Wiley & Sons, Ltd., Mar. 2001, vol. 11, Issue 2, pp. 75-90.

Muller, "Managing Service Level Agreements," International Journal of Network Management, John Wiley & Sons, Ltd., May 1999, vol. 9, Issue 3, pp. 155-166.

Schmidt, "A Family of Design Patterns for Flexibly Configuring Network Services in Distributed Systems," Proceedings of the Third International Conference on Configurable Distributed Systems, May 6-8, 1996, IEEE Press, pp. 124-135.

* cited by examiner

Control Authority

Flow Classification

IPSEC

Firewall, Nat Forwarding

Example: IKE VPN Processing

CONTENT SERVICE AGGREGATION SYSTEM

CLAIM OF PRIORITY

This application is a Continuation of U.S. application Ser. No. 10/191,742, filed Jul. 8, 2002, which is now U.S. Pat. No. 7,305,492, entitled "Content Service Aggregation System," which claims the benefit of U.S. Provisional Application No. 60/303,354, filed Jul. 6, 2001, entitled "Content Service Aggregation System," the entire content of each of which is incorporated herein by reference.

BACKGROUND OF THE INVENTION

1. Field of the Invention

The present invention is directed to a system for implementing a multifunction network service apparatus.

2. Description of the Related Art

The worldwide system of computer networks known as the Internet has provided business and individuals with a new mechanism for supplying goods and services, and conducting commerce. As the number and type of network services used on the Internet have grown, so has the strain that providing such services places on businesses. As the number, complexity and interaction of inter-networked services has risen, the associated costs of building and maintaining a network infrastructure to support those services have grown as well. Many enterprises have thus turned outsourced vendors, sometimes called managed service providers or data centers, to provide these services in lieu of building and maintaining the infrastructure themselves. Customers of such managed service providers are often called subscribers.

The managed service provider can operate in many different ways. Typically it can provide secure facilities where the infrastructure service equipment is located, and manage equipment for the subscriber. The scope of management and services is defined by an agreement with the subscriber calling for the managed service provider to solely or jointly manage the equipment with the subscriber. This is sometimes referred to as "co-location". In other cases, the managed service provider can lease the physical space from another provider (called a hosting provider) and provide just the management of the infrastructure equipment on behalf of its subscribers.

A data center is a specialized facility that houses Web sites and provides data serving and other services for subscribers. The data center may contain a network operations center (NOC), which is a restricted access area containing automated systems that constantly monitor server activity, Web traffic, and network performance. A data center in its most simple form may consist of a single facility that hosts all of the infrastructure equipment. However, a more sophisticated data center is normally an organization spread throughout the world with subscriber support equipment located in various physical hosting facilities.

Data centers allow enterprises to provide a number of different types of services, including e-commerce services to customers; extranets and secure Virtual Private Networks (VPNs) to employees and customers; firewall protection and Network Address Translation (NAT) services, Web caching and load balancing services, as well as many others. These services can all be provided at an off-site facility in the data center without requiring the enterprise to maintain the facility itself.

A typical data center facility will house physical hardware in a number of equipment racks, generally known as "cages", which hold networking equipment and servers which are operated by the data center on behalf of the subscriber. Generally, the subscriber maintains the content and control over the servers, while contracting with the data center to provide services such as maintenance and service configuration. It should be well understood that there are myriad ways in which subscribers can arrange their relationships with data centers.

The equipment that provides the infrastructure services for a set of subscribers can take several forms. Depending on the complexity and variety of services required, the equipment generally includes one or more single function devices dedicated to the subscriber. Generally, because the devices are designed with the co-location model in mind—customers leasing rack space and pieces of equipment as needed—service devices generally include the ability to provide only one or a few services via the device. Typical multi-function devices that do combine services combine those that are closely related, such as NAT and firewall services. A data center facility generally has a number of devices to manage, and in many case the devices multiply as redundant devices may be used for fail over security to provide fault-tolerance or for load balancing.

Normally, services such as NAT, Firewall and VPN are provided by specialized computers or special function appliances at the subscribers site. In offloading the services to a data center, the data center will use specialized appliances or servers coupled to the subscribers Web servers in the cages to implement special functions for the subscribers. These appliances can include service provision devices and the subscriber's application servers as well as other specialized equipment for implementing the subscriber's service structure. The cages may thus include network appliances dedicated to one or more of the following tasks: routing, firewall, network address translation, Secure Sockets Layer (SSL) acceleration, virtual private networking, public key infrastructure (PKI), load balancing, Web caching, or the like. As a result, the management of all subscribers within the data center becomes very complex and expensive with many different management interfaces for all of the subscribers and subscriber devices. Administering the equipment in each cage is generally accomplished via an administrative access interface coupled to each single function device. An example of one prior art architecture used in a data center is shown in FIG. 1. In this example, a plurality of individual service appliances 24, each providing a different type of IP service, are coupled to a network 20 (in this case it is the Internet) and a local LAN 21, which is a high speed local network secure within the data center. The local LAN may couple each of the appliances to each other, as well as various subscriber servers 25. Each of the individual appliances 24 performs only some limited form of processing which is specific to the service function it is designed to provide. In addition, this type of architecture is difficult to manage since each device 24 has its own configuration interface 26. All service set-up parameters must be made within each device. Indeed, each appliance may be provided by a different manufacturer and hence have its own configuration paradigm.

In general, each of these appliances 24 works on network data packets carried in the network using TCP/IP protocol. The data is routed between appliances using the full TCP/IP stack, requiring that each appliance process the entire stack in order to apply the service that the appliance is designed to provide. This results in a large degree of processing overhead just in dealing with the transmission aspects of the data. To combat these problems, some network equipment manufacturers have built multi-service devices capable of providing additional IP level services in one physical package. Typically, however, these devices couple network coupled "line cards" designed to provide the particular value added service to the network with some form of central processor, with the combination being generally organized into multi-service routing device. The compute elements on the line cards have limited or specialized processing capability, and all services set-up and advanced processing must go through the central processing card. Such service set-up is sometimes called "slow path" processing, referring to that occurs infrequently or is complex, such as exception packet handling, while more routine functions are performed by the appliances themselves.

An example of this type of system is shown in FIG. 2. In the system shown in FIG. 2, a central processor 30 controls and performs all service implementation functions, with some routing via other appliances coupled to the fabric. In this architecture, the service processing is limited to the speed and throughput of the processor.

An important drawback to the systems of the prior art such as those shown in FIG. 1 and FIG. 2 is that processing of application services requires each line card to perform the full IP stack functions. That is, each card must perform IP processing and routing to perform the network service on the data carried by the IP packet. Any packet entering the line card must be processed through the IP, TCP and HTTP level, the data processed, and the packet re-configured with proper TCP and IP information before being forwarded on.

A second important drawback of these systems is that they perform processing on only one flow of packets at a time. That is, the central processor of the embodiment of FIG. 2 is a bottleneck for system performance.

SUMMARY OF THE INVENTION

The invention, roughly described, comprises an architecture for controlling a multiprocessing system to provide a network service to network data packets using a plurality of compute elements. In one aspect, a single service is provided by multiple compute elements. In a second aspect, multiple services are provided by multiple elements. In one embodiment, the invention may comprise a management compute element including service set-up information for at least one service; and at least one processing compute element communicating service set-up information with the management compute element in order to perform service specific operations on data packets. This embodiment may further include a flow element, directing data packets to the at least one processing compute element.

The system control architecture providing multiple network IP services to networked data in a multiprocessing system, the multiprocessing system having a plurality of compute elements, comprising code provided on a first compute element causing the compute element to function as a control compute element maintaining multi-service management information and service configuration instructions; and service processing code provided on at least a second compute element causing said second compute element to function as a service processing element performing service specific instructions responsive to the control compute element on data transmitted to the service processing element.

The system control architecture of claim 2 further including code, provided on a third compute element, causing said third compute element to function as a flow stage compute element communicating with the control compute element and the service processing element.

In a further aspect, the system may comprise a method of controlling a processing system including a plurality of processors. The method may include the steps of operating at least one of said processing units as a control authority including service provisioning information for a subscriber; and operating a set of processors as service specific compute elements responsive to the control authority, receiving provisioning information from the subscriber and performing service specific instructions on data packets to provide content services. In this embodiment, data packets having common attributes including a common subscriber may be (but need not be) organized in a flow and processed by the set of processors, with each flow being bound to the same set of processors. Each subscriber may have multiple flows.

In a still further embodiment of the invention, a method of operating a multiprocessor system is disclosed. The method may comprise operating at least one processor as a control authority storing information on configuration of a plurality of network services, operating at least a second processor as a compute element for one of said services, and transmitting selected information on the configuration of the services to the compute element to operate the compute element to perform calculations on the service.

In a still further aspect, the invention may comprise system for processing content services using a processing pipeline in a multi-processor system. In this embodiment, the invention includes at least one processor comprising a Control Authority having service specific data and instructions; a plurality of service specific processors arranged in a processing pipeline and coupled by a switching fabric, communicating with the Control Authority to receive set-up information and perform service specific instructions on packet data; and a flow processor directing network traffic to the service specific processors. In this embodiment, the data input to the architecture is organized as a flow, and each flow is bound to a processing pipeline for service specific operations.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

BRIEF DESCRIPTION OF THE DRAWINGS

The invention will be described with respect to the particular embodiments thereof. Other objects, features, and advantages of the invention will become apparent with reference to the specification and drawings in which.

DETAILED DESCRIPTION

I. Control Architecture

Figure 1:
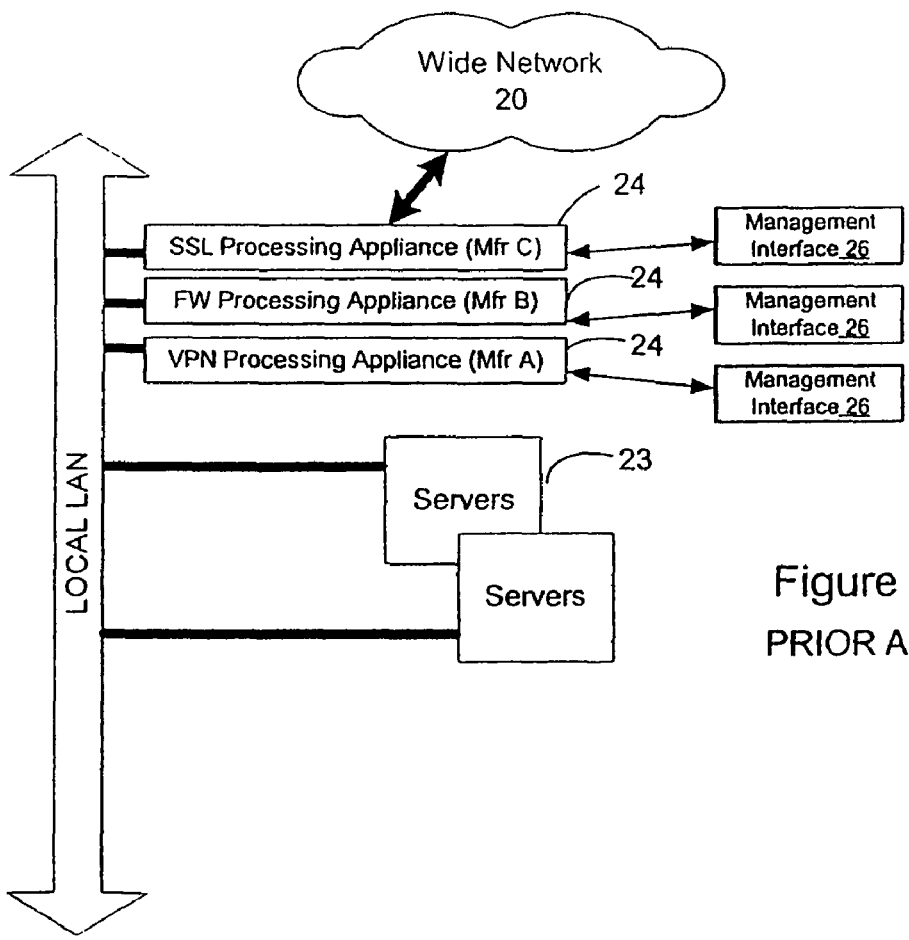
FIG. 1 depicts a first prior art system for providing a plurality of network services to a subscriber.
Figure 2:
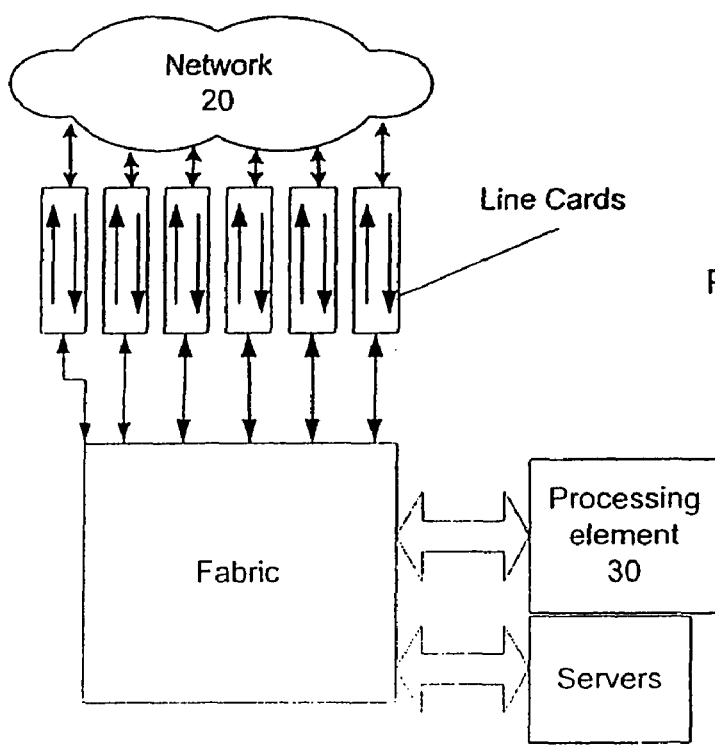
FIG. 2 depicts a second prior art system for providing a plurality of network services to a subscriber.

The present invention provides an architecture for controlling a content services aggregator—a device which provides a number of network services. The architecture is designed to provide the services on a multi-processor system. In one aspect, the invention comprises a software architecture comprised of an operating paradigm optimized for packet routing and service processing using multiple compute elements coupled through a switching fabric and control backplane.

Various embodiments of the present invention will be presented in the context of multiple hardware architectures. It should be recognized that the present invention is not limited to use with any particular hardware, but may be utilized with any multiple compute element architecture allowing for routing of packets between compute elements running components of the invention as defined herein.

In the following detailed description, the present invention is described by using flow diagrams to describe either the structure or the processing that implements the method of the present invention. Using this manner to present the present invention should not be construed as limiting of its scope. The present invention contemplates both methods and systems for controlling a multiprocessor system, for implementing content services to a multitude of subscribers coupled to the multiprocessing system, and for distributing the provision of such services across a number of compute elements. In one embodiment, the system and method of the invention can be implemented on general-purpose computers. The currently disclosed system architecture may also be implemented with a number of special purpose systems.

Embodiments within the scope of the present invention also include articles of manufacture comprising program storage apparatus and having encoded therein program code. Such program storage apparatus can be any available media which can be accessed by a general purpose or special purpose computer. By way of example, and not limitation, such program storage apparatus can comprise RAM, ROM, EEPROM, CD-ROM or other optical disk storage, magnetic disk storage or other magnetic storage devices, or any other medium which can be used to store the desired program code and which can be accessed by a general purpose or special purpose computer. Combinations of any of the above are also included within the scope of such program storage means.

Program code comprises, for example, executable instructions and data which causes a general purpose or special purpose computer to perform a certain function or functions.

A. Overview

The software architecture of the present invention provides various content based networking services to subscribers in a network environment. In one embodiment, the system architecture of the present invention is designed to run on processing hardware which is located in a network configuration between a physical layer interface switch and a "Layer 2" IP switch. The architecture supports multiple subscribers and multiple subscriber services in accordance with the invention.

Figure 3:
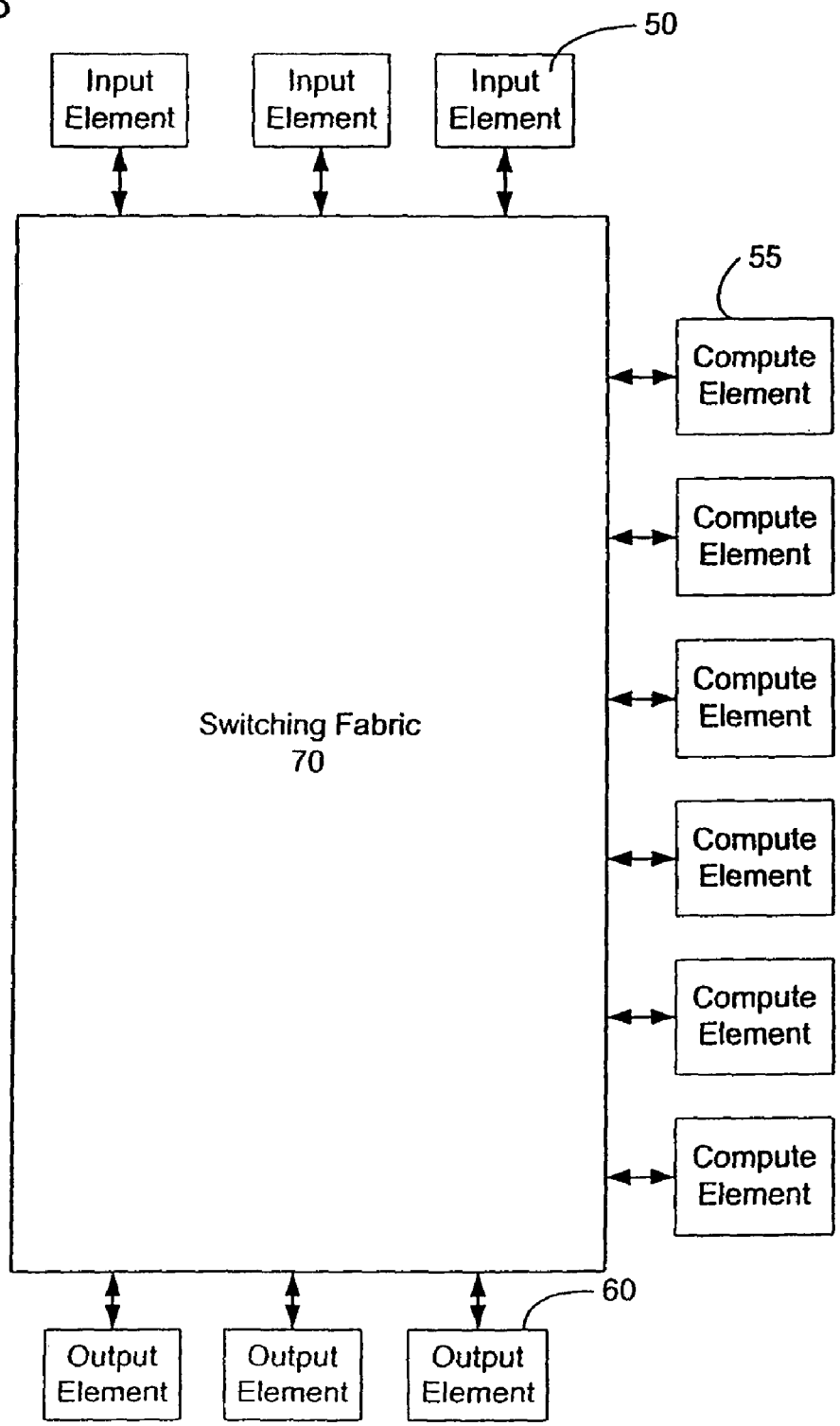
FIG. 3 depicts a general hardware embodiment suitable for use with the service provision architecture of the present invention

A general hardware architecture on which the software architecture of the present invention may be implemented is shown in FIG. 3. As shown therein, a plurality of compute elements are coupled to a switching fabric to allow packets to traverse the fabric and be routed through means discussed below to any other compute element coupled to the fabric. It should be understood that the hardware shown in FIG. 3 may comprise a portion of a content service aggregation, but does not illustrate components of the aggregator such as I/O ports, busses and network interfaces which would be used in such aggregators.

In general, packets enter the system via the input elements, get switched via the fabric and travel through one or more compute elements where the services are rendered and exit via the output elements. The function of the control system of the present invention is to route data packets internally within the system, maintain the data structures which allow the services provided by the content services aggregation device to be performed, and coordinate the flows of data through the system.

When implemented with a multiprocessor device such as that shown in FIG. 3, the control architecture of the present invention provides a content service aggregator which distributes service provision over a plurality of compute elements in order to increase the processing performance of the device beyond that presently known in the art. In combination with this distributed processing, any number of compute elements may be provided.

In the depiction shown in FIG. 3, each compute element may comprise one or more microprocessors, including any commercially available microprocessor. Alternatively, the compute elements may comprise one or more application-specific integrated circuit processors specifically designed to process packets in accordance with the network service which the content service aggregator is designed to provide. Each compute element in FIG. 3 includes at least a processing unit, such as a CPU. As discussed below, each compute element may include a number of CPUs and function specific processing engines. Not detailed in FIG. 3 but utilized in the present invention is some form of addressable memory. In the implementation of FIG. 3, the memory may be incorporated into the compute elements themselves, or provided separately and may be memory dedicated to and accessible by one processor or memory shared by many processors.

In FIG. 3, certain elements have been designated as "input elements", other elements have been designated as "output elements", while still other elements have been designed as simply "compute" elements. As will become clear after the reading of the specification, the designation of the elements as input, output or compute elements is intended to enable the reader to understand that certain elements have functions which are implemented by the software architecture of the present invention as controlling processing flow (the input/output elements) and performing service provisioning.

Figure 4:
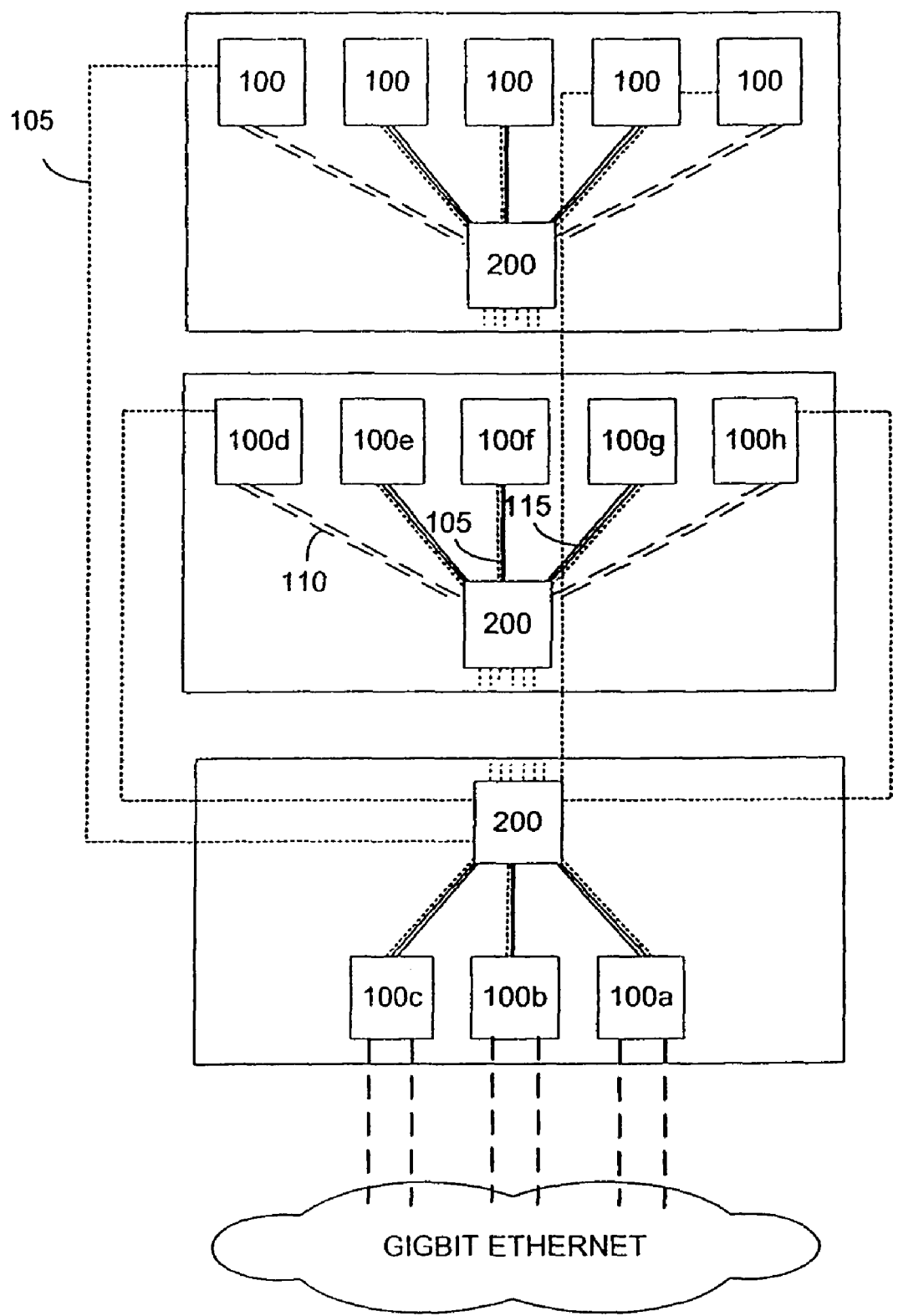
FIG. 4 depicts a second hardware embodiment suitable for use with the service provision architecture of the present invention.

FIG. 4 shows a more specialized hardware configuration that is suitable for use with the system of the present invention. In this particular embodiment, the computer elements 100 are a series of multi-CPU compute elements, such as multi-processor unit 2010 disclosed below with reference to FIGS. 16-35. Briefly, each element contains a plurality of CPUs, application specific processing engines, a shared memory, a sequencer and a MAC.

In addition, the switching fabric is comprised of a plurality of cross-bar switching elements 200, such as cross-bar switches 3010 and 3110 described below with reference to FIGS. 36-45.

In order to implement a content service aggregation device using the embodiment of FIG. 4, a plurality of compute elements 100 are organized onto a processing pipeline or "blade". Each blade may comprise a physical card having a series of connectors and connections, including wiring interconnecting the compute elements and at least one cross bar element 200 to a connection plane and other such blades. In FIG. 4, the system may include two processor pipelines, each having five compute elements and one switching element provided thereon, as well as an input output blade including three compute elements and one switching element 200. The input/output pipeline processing elements 100 are coupled to a gigabit Ethernet connection.

It should be recognized that the compute elements need not be provided on the blades, and that different configurations of input/output schemes are possible. In a further embodiment, the content services aggregator may include two input blades and two processing blades or any number of processing and input blades.

Each blade includes a series of packet path data connections 115, control path connections 105 and combined data and control connections 110. The collection of compute elements on a single blade provides a processing pipeline for providing the content services. It should be recognized that the processing pipeline need not be physically separated on a blade in any particular configuration, but may comprise a series of processors linked by a crossbar switch, a grouping of crossbar switches, or other switching fabric capable of routing packets in the manner specified in the instant application to any of the various compute elements coupled to the switch.

As noted above, the hardware suitable for running the system of the present invention may comprise any multiprocessor system having addressable memory operatively coupled to each processor. However, the compute elements shown in FIG. 4, as well as multi-processor unit 2010 described below, each include a central processing unit coupled to a coprocessor application engine. The application engines are specifically suited for servicing applications assigned to the compute engine. This enables different compute engines to be optimized for servicing a number of different applications the content service aggregator will provide. For example, one compute engine may contain coprocessor application engines for interfacing with a network, while other coprocessors include different application engines. The coprocessors also offload associated central processing units from processing assigned applications. The coprocessors perform the applications, leaving the central processing units free to manage the allocation of applications. The coprocessors are coupled to a cache memory to facilitate their application processing. Coprocessors exchange data directly with cache memory—avoiding time consuming main memory transfers found in conventional computer systems. The multi-processor also couples cache memories from different compute engines, allowing them to exchange data directly without accessing main memory.

As such, the architecture shown in FIG. 4 is particularly suited for use in a content service aggregation device and, in accordance with the particular implementations shown in the co-pending applications, provides a high throughput system suitable for maintaining a large number of subscribers in a data center.

Although the particular type of hardware employed in running the software architecture of the present invention is not intended to be limiting on the scope of the software control architecture of the present invention, the invention will be described with respect to its use in a hardware system employing a configuration such as that shown in FIG. 4, where the compute elements are multi-processor unit 2010, described below with reference to FIGS. 16-35, and the cross-bar fabric elements are cross-bar switches 3010 or 3110, described below with reference to FIGS. 36-45.

The control system of the present invention takes into account the fact that communication overhead between any two elements is not the same and balances the process for best overall performance. The control system allows for a dynamically balanced throughput, memory usage and compute element usage load among the available elements, taking into account the asymmetric communications costs. The architecture also scales well for additional processors and groups of processors. The architecture can host as few as a single subscriber and as many as several thousand subscribers in an optimal fashion and handles dynamic changes in subscribers and the bandwidth allocated to them.

There are a number of different types of traffic which are recognized by the system of the present invention, including local traffic, remote traffic, control traffic and data traffic, as well as whether the traffic is inbound to the content services aggregator or outbound from the aggregator. The processors of FIG. 3 and the processing pipelines of FIG. 4 may handle these flows differently in accordance with the system of the invention.

In one embodiment, each input/output processor on the blade may have a local and a remote port with Gigabit Ethernet interfaces. The interfaces fall under one of the following categories: local port, remote port; trusted management port; port mirror or inter-device RP. Local ports connect to a trusted side of the device's traffic flow (i.e. a cage-side or the subscriber-side) and hence have "local" traffic. Remote ports connect to the un-trusted side (the internet side) of the device's traffic flow. A trusted management port is the out of band management port used to access the content services aggregator and is physically secured. Data on this port has no access control and no firewalls are applied to traffic coming in from this port. An inter-device RP port is used to connect two content services aggregators in redundant mode. Port mirror is a debug feature that duplicates the traffic of a local or remote port for debugging purposes.

B. Software Hierarchy

Figure 5:
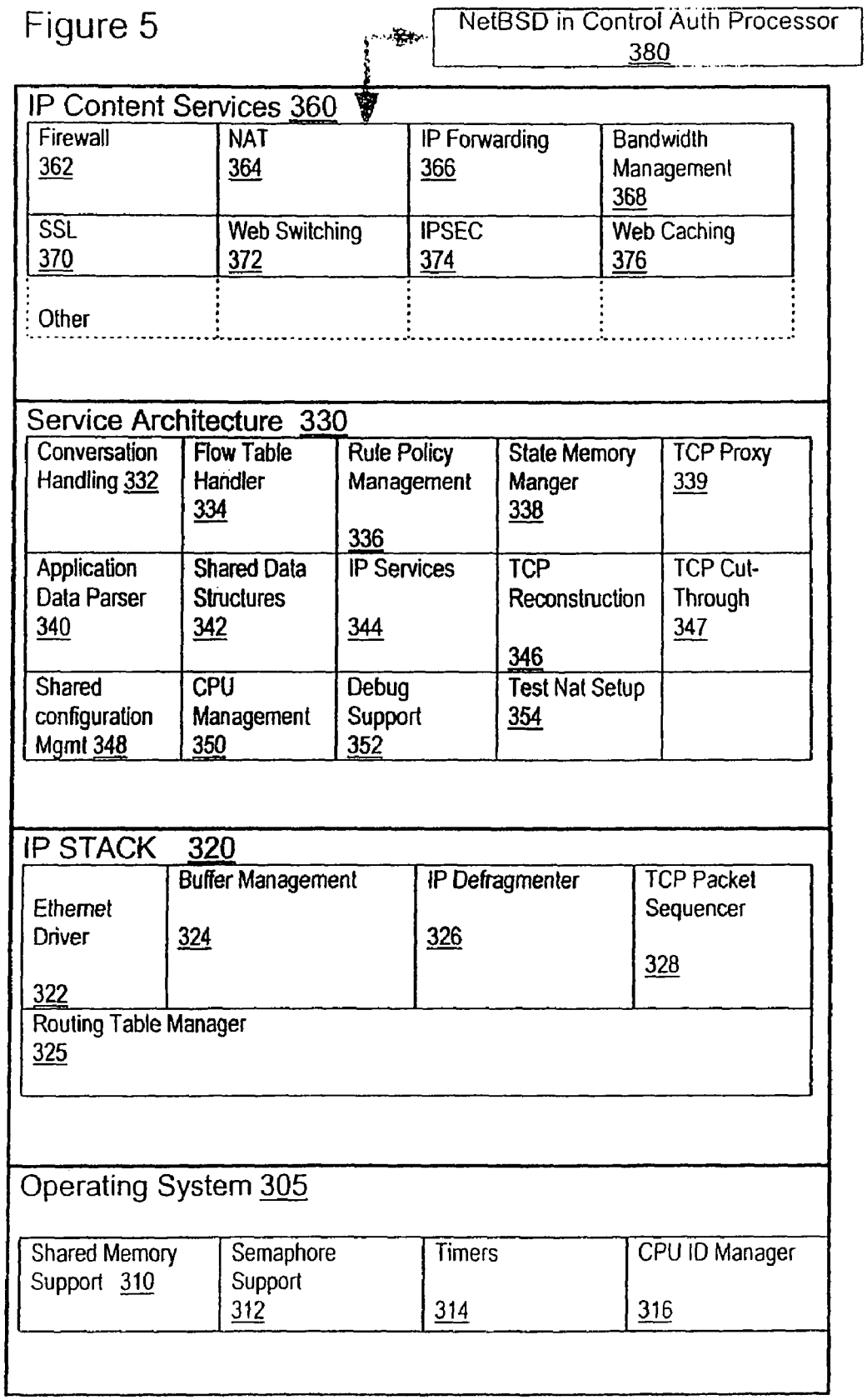
FIG. 5 is a block diagram illustrating the software system architecture of the control system of the present invention.

As shown in FIG. 5, the software architecture is a four layer hierarchy which may include: an operating system layer 305, an internet protocol (IP) stack 320, a service architecture layer 330 and a network services layer 360. Each layer has a number of sub-components as detailed below. The top layer is the content application services layer which includes modules implementing the various IP services. Those listed in FIG. 5 are Firewall, Network Address Translation, IP Forwarding (OSPF Routing), bandwidth management, Secure Sockets Layer processing, Web (or Layer 7) content based switching, Virtual Private Networking using IPSec, and Web caching. It should be understood that the number and type of Web services which may be provided in accordance with the architecture of the present invention are not limited to those shown in FIG. 5, and those listed and described herein are for purposes of example. Additional services may be added to those shown in FIG. 5 and in any particular implementation, all services shown in FIG. 5 need not be implemented.

In one embodiment, each processing compute element is configured to run with the same software configuration, allowing each processing compute element to be used dynamically for any function described herein. In an alternative embodiment, each compute element is configured with software tailored to the function is designated to perform. For example, if a compute element is used in providing a particular service, such as SSL, the processing compute element will only require that code necessary to provide that service function and other content services codes need not be loaded on that processor. The code can be provided by loading an image of the code at system boot under the control of a Control Authority processor. It should be further understood that, in accordance with the description set forth in co-pending U.S. patent application Ser. No. 09/900,481, filed Jul. 6, 2001 by Fred Gruner, David Hass, Robert Hathaway, Ramesh Penwar, Ricardo Ramirez, and Nazar Zaidi, entitled MULTI-PROCESSOR SYSTEM, the compute elements may be tailored to provide certain computational aspects of each service in hardware, and each service module 360 and service architecture module 330 may be constructed to take advantage of the particular hardware configuration on which it is used.

Shown separate from the architecture stack and running on one or more compute elements, is a NetBSD implementation that serves as the Control Authority for the system of the present invention. As will be understood to one of average skill in the art, NetBSD is a highly portable unix-like operating system. The NetBSD implementation provides support and control for the content services running in the content services aggregator. Although in one implementation, a single instance of NetBSD running on a single processing CPU may be utilized, in order to provide a high throughput for the content services aggregator, multiple instances of NetBSD are preferably utilized in accordance with the invention. Such multiple instances may be provided on multiple processors, or, when the system is utilized with the compute element of co-pending U.S. patent application Ser. No. 09/900,481, filed Jul. 6, 2001 by Fred Gruner, David Hass, Robert Hathaway, Ramesh Penwar, Ricardo Ramirez, and Nazar Zaidi, entitled MULTI-PROCESSOR SYSTEM, multiple copies of NetBSD may be provided on a single compute element.

In both examples, the single or multiple copies of NetBSD running on a single or multiple CPUs respectively, comprise the "Control Authority" and control the operation of the system as a whole. In one implementation, eight copies of NetBSD are run on the compute element of co-pending U.S. patent application Ser. No. 09/900,481, filed Jul. 6, 2001 by Fred Gruner, David Hass, Robert Hathaway, Ramesh Penwar, Ricardo Ramirez, and Nazar Zaidi, entitled MULTI-PROCESSOR SYSTEM and are divided into specific tasks where seven total processors are used and run independent copies of NetBSD: 3 are dedicated for the OSPF processes; 3 are dedicated for IKE/PKI processes; 1 is dedicated for the management processes; and one is a spare.

As the name implies, the Control Authority manages the system. Specifically, it handles such items as: system bring up; fault tolerance/hot swaps; management functions; SNMP; logging functions; command line interface parsing: interacting with the Network Management System such as that disclosed in co-pending U.S. patent application Ser. No. 09/900,482, filed Jul. 6, 2001 by Elango Gannesan, Taqi Hasan, Allen B. Rochkind and Sagar Golla, entitled NETWORK MANAGEMENT SYSTEM and U.S. patent application Ser. No. 10/190,036, filed Jul. 5, 2002 by Taqi Hasan and Elango Gannesan, entitled INTEGRATED RULE NETWORK MANAGEMENT SYSTEM, which applications are hereby fully incorporated by reference into the instant application; layer 2 and layer 3 routing functions; ICMP generation and handling; OSPF processes; and IKE/PKI processes. As noted above, the Control Authority supports IKE/PKI, OSPF routing, fault tolerance and management processes on one or more NETBSD compute elements or CPUs.

Traffic to and from the Control Authority may take several forms: local port traffic to the Control Authority, traffic from the Control Authority to the local port, aggregator-to-aggregator traffic, or control traffic passing through the crossbar switch. Local to Control Authority traffic may comprise out-of-band management traffic which is assumed to be secure. This is the same for Control Authority traffic moving to the local port. Control traffic from inside the device may take several forms, including event logs and SNMP updates, system status and system control message, in-band management traffic, IKE/PKI traffic and OSPF traffic.

At boot, each compute element may perform a series of tasks including initialization of memory, load translation look aside buffer (TLB), a micro-code load, a basic crossbar switch configuration, a load of the NetBSD system on the Control Authority processor and finally a load of the packet processing code to each of the compute elements. The Control Authority processor NetBSD implementation may boot from a non-volatile memory source, such as a flash memory associated with the particular compute element designated as the Control Authority, or may boot via TFTP from a network source. The Control Authority can then control loading of the software configuration to each compute element by, in one embodiment, loading an image of the software specified for that element from the flash memory or by network (TFTP) load. In each of the image loads, one or more of the elements shown in FIG. 5 may be installed in the compute element. Each compute element will use the operating system 305, but subsets of higher layers (320, 330, 360) or all of said modules, may be used on the compute elements.

The operating system 305 is the foundation layer of system services provided in the above layers. The operating system 305 provides low-level support routines that higher layers rely on, such as shared memory support 310, semaphore support 312 and timer support 314. These support routines are illustrated in FIG. 5. In addition, a CPU ID manager 316 is provided to allow for individual CPU identification.

The operating components shown in FIG. 5 are run on each of the service processing compute elements, which are those compute elements other than the one or more compute elements which comprise the Control Authority. In certain implementations, compute elements have a shared memory resource for CPUs in the compute element. For the shared memory function, one CPU needs to initialize the memory in all systems before all processors can start reading a shared memory region. In general, the initialization sequence is required by one of the processors with access to the shared memory region, but the initialization processor is not in a control relationship with respect to any other processor. The initialization processor maps the shared memory to agreed-upon data structures and data sizes. The data structures and semaphore locks are initialized and a completion signal is sent to the processors.

In general, each CPU can issue a series of shared memory allocation calls for an area of the shared memory region mapped to application data structures. After the call, the application accesses the data structures through application-specific pointers. The sequence of calls to the shared memory allocation is the same in all processors and for all processes, since the processors are all allocating from the same globally shared memory pool. Each processor other than the master processor must perform a slave initialization process where it initializes the data sizes and structures of the master and waits for the completion signal from the master CPU.

The semaphore library 312 implements Portable Operating System Interface (POSIX) semantics. A semaphore library is provided and a memory based semaphore type is also provided to enable data locking in the shared memory. Wait and post calls are provided for waiting for lock to be free, and releasing the lock on a particular memory location. The initialization will generally set the memory location to a free state (1). The wait loop will loop until the lock is free and set the lock value to locked (0) to acquire the lock. The post call releases the lock for the next available call. Additional POSIX interfaces are also implemented to provide a uniform interface for dealing with each of the compute elements.

The timer support module 314 implements two abstract data types: a timer handler, which is a callback function for timer expiration and takes a single void parameter with no return value; and a timestamp function, which is an object used short time information. The functions exported by the timer module are: timer_add, which allows the controller to add a timer callback given a time, handler, and generic parameters; a timer_timestamp which returns the current timestamp; a timer_timeout which checks for timeouts given the timestamp and timeout value; and the timer_tostring which is a debug return printable string for the timestamp.

The CPU identification module 316 provides for unique CPU identification. There are three exported functions including an initialization module, an obtained ID module, and a get ID module. The obtain IDE module allows a system chance to obtain the unique CPU you IDE in a Linux-like manner. The CPU ID function allows the return of the CPU ID for the CPU.

Returning to FIG. 5, the next level of the software architecture of the present invention implements an IP stack 320. The IP stack 320 provides functionality is that are normally found in the networking portion of the operating system area. In addition, it provides various TCP/IP services. The stack of the present invention is optimized for performance. An important feature of the IP stack of the present invention is that it is distributed. Multiple processors with a shared memory share the processing of IP packets in the stack.

In the IP stack, the Ethernet driver 322 is responsible for interfacing with the hardware functions such as receiving packets, sending packets, and other Ethernet functions such as auto negotiation. Is also responsible for handling buffer management as needed by the hardware.

The buffer management module 324 acts as interface between Ethernet driver and the balance of the system. The buffer manager performs and handles how buffers are dispatched and collected.

The IP fragmentation module 326 is responsible for identifying a fragmented IP packets and collecting them into a linked list of frames. A routing table management module 325 is responsible for maintaining forwarding tables used by IP forwarding and routing. It is responsible for interacting with the routing module on the Control Authority compute element. A TCP packet sequencer 328 is provided to collect and send out packets in an original ordering and is utilized when a subscriber requires packets to be read in order. This sequencer is used as an optional processing step that can be disabled and suffer no performance loss.

Other modules, which are provided in the IP stack, include timeout support, ARP support, echo relay support, a MAC driver and debug support.

Returning again to FIG. 5, the next level in the architecture is the service architecture 330. The service architecture 330 provides support for the flow control and conversation based identification of packets described below. The service architecture 330 is a flow-based architecture that is suitable for implementing content services such as firewall, NAT bandwidth management, and IP forwarding.

The service architecture is a distributed system, using multiple microprocessors with shared memory for inter-processor communications and synchronization. The system uses the concept of a "flow" to define a series of packets, with multiple flows defining a "conversation."

A flow is defined as all packets having a common: source address, source port, destination address, destination port, subscriber ID, and protocol. As packets travel through the content service aggregator, each packet is identified as belonging to a flow. (As discussed below, this is the task of the Control Authority and input/output compute elements.) The flows are entered into flow tables which are distributed to each of the compute elements so that further packets in the same flow of can be identified and suitable action on the packet applied in rapid fashion. It should be noted that the subscriberID is not necessarily used within the processing pipes. If the traffic is local to remote traffic, a VLAN tag is used along with the subscriber ID. If the traffic is remote to local, a forwarding table lookup is performed.

Figure 6A:
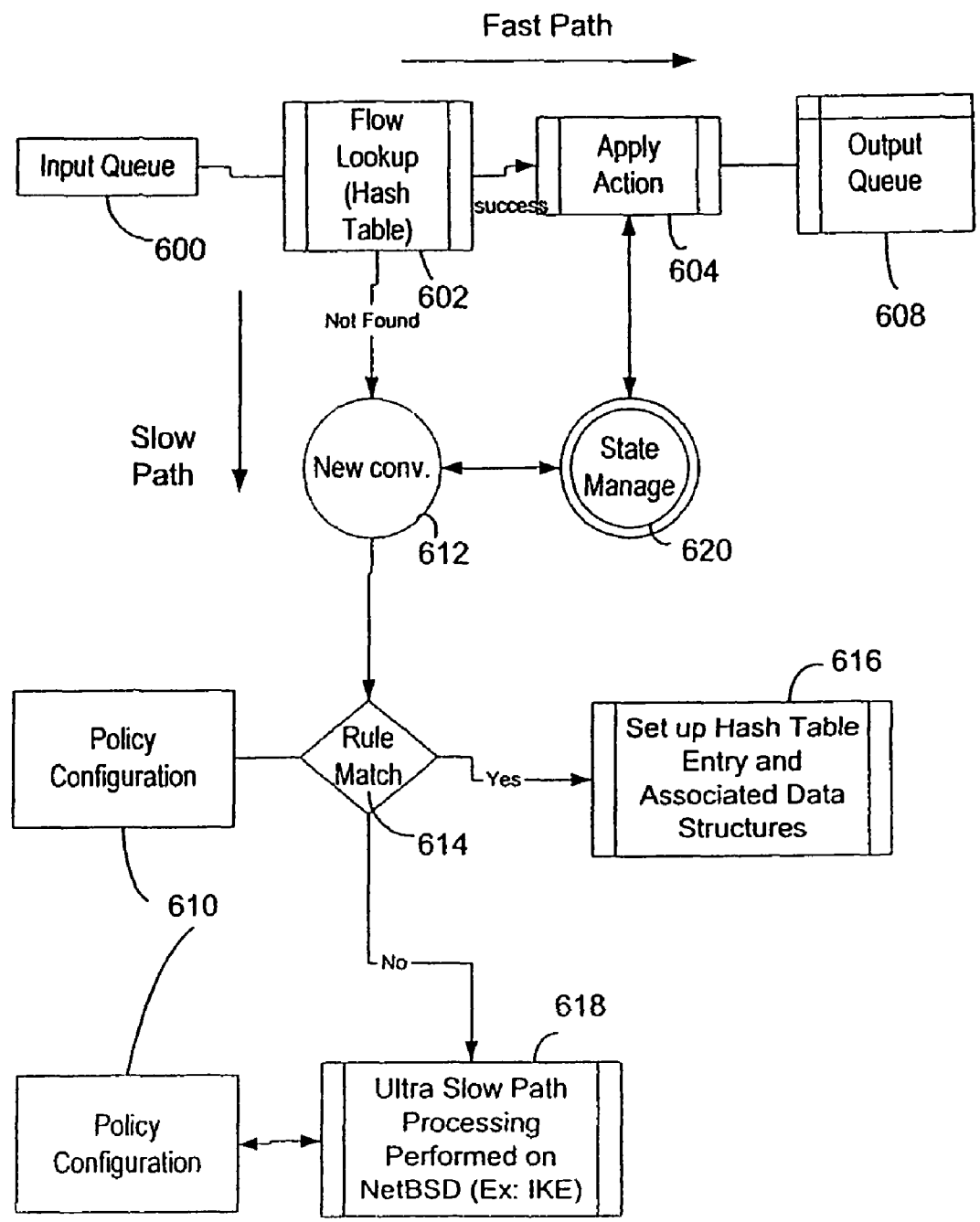
FIG. 6a is a block diagram illustrating the fast path and slow path processing of packets in the system of the present invention.

The use of the flow tables allows for packet processing to be rapidly directed to appropriate processors performing application specific processing. Nevertheless, initially, the route of the packets through the processing pipelines must be determined. As shown in FIG. 6*a*, packets and flows can follow a "slow" or "fast" path through the processors. The identification process defines a "slow path" for the packet, wherein the processing sequence for the flow must be set up as well as the specific requirements for each process. This includes performing a policy review based on the particular subscriber to whom the flow belongs, and setting up the flow to access the particular service or series of services defined for that subscriber. A "fast path" is established once the flow is identified and additional packets in the flow are routed to the service processors immediately upon identification for processing by the compute elements.

This slow path versus a fast path distinction is found in many of the applied services. For example, in the case of routing, the first packet of a flow may incur additional processing in order to allow the system to look up the appropriate next hop and output interface information. Subsequent packets in the flow are quickly identified and forwarded to see next hop and output interface non-performing routing information look-ups again. Similar "slow" and "fast" path models are applied in the provision of other services.

Flows are organized into a conversation model. In a conversation, two parties are supported: an initiator and a respondent. Each conversation is a model of a user session, with a half-conversation corresponding to an initiator or a responder. Each half conversation has a control channel and data channel, so that there are four total flows in, for example, an FTP session, a for an responder door control channel's and an initiate for and responder gator channels.

Figure 6B:
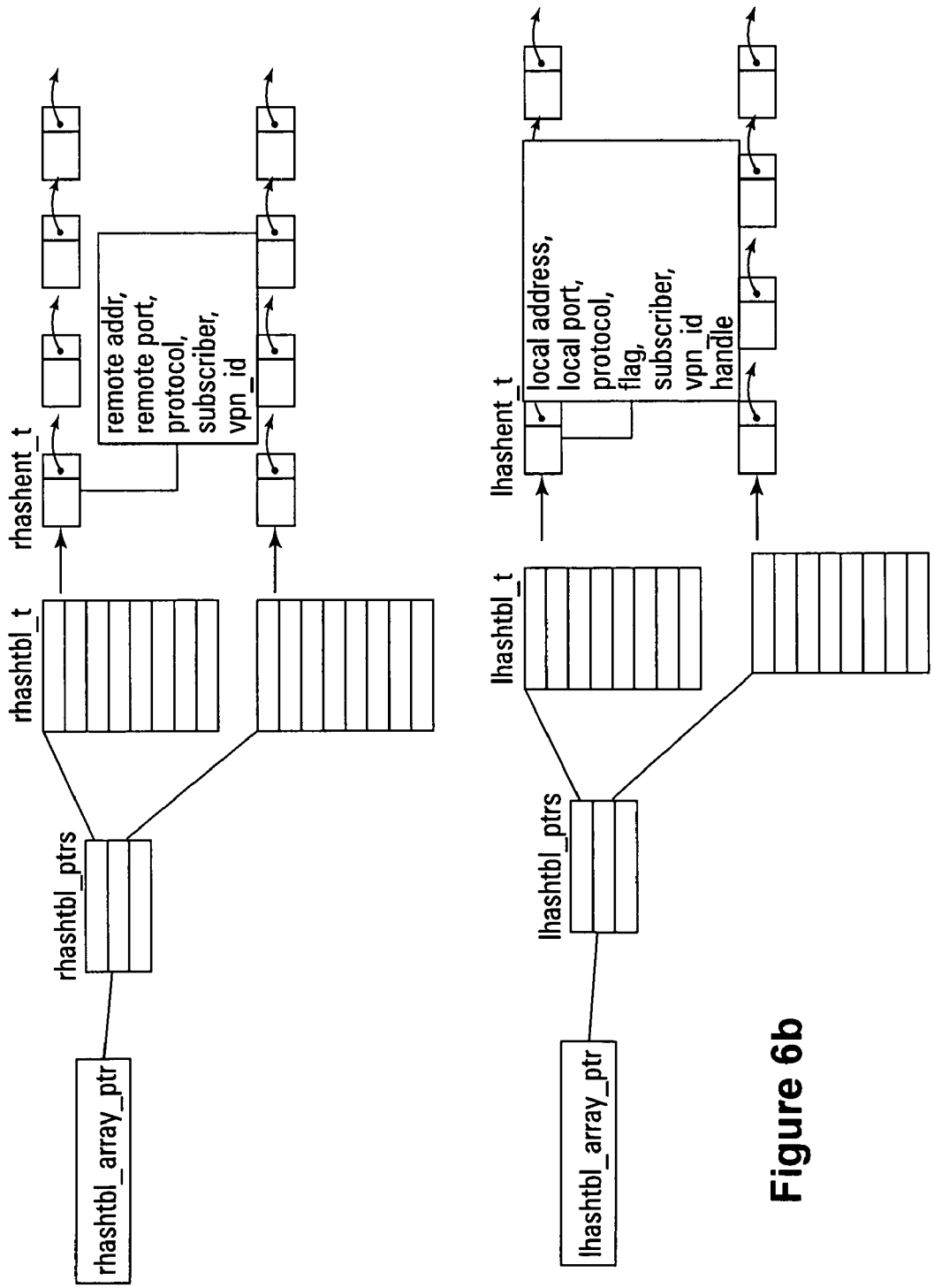
FIG. 6b is a diagram illustrating one of the data structures used in the system of the present invention.

Returning to FIG. 6*a*, the slow path/fast path distinction in the present system is illustrated. When the first packet of a new conversation enters the system via the input queue 600, the flow lookup 602 will fail and a slow path process is taken where new conversation processing 612 is performed. The new conversation processing involves rule matching 612 based on a policy configuration 610 on the applicable policy. If a particular conversation is allowed, then a conversation object is created and state memory is allocated for the conversation. The flow objects are created and entered into the flow table 616. If the rule match determines that the conversation is not part of a flow which can be processed by the service compute elements, the packets require further processing which is performed on one of the processors of the Control Authority 618, such as IKE. This processing is implemented by consulting with the policy configuration 610 for the subscriber owning the packet. An exemplary set of flow tables is represented in FIG. 6*b*. In FIG. 6*b*, two tables are shown: rhasttbl and lhastbl. rahstbl includes remote object flow identification information, such as the remote address, remote port, protocol, subscriber and VPN identification. The local hash table contains internal flow data and subscriber specific information, such as the local address, local port, protocol, flag, subscriber VPN identification, and a handle (whose usage is described below).

When additional packets in the flow arrive, the flow table lookup will succeed and the fast path will be taken directly to the service action processor or processing pipeline, allowing the service to be applied with much greater speed. In some cases, a conversation manager is consulted. Following application that a particular service, the packet exits at the system via an output queue.

Returning again to the service architecture of FIG. 5, an additional module shown in the service architecture is the conversation handler 322. The conversation handler 332 is responsible for creating, maintaining, operating, and destroying conversation and half conversation objects.

The flow module 334 is responsible for flow objects which are added and deleted from the flow table.

The rules policy management module 336 allows policies for a particular subscriber to be implemented on particular flows and has two interfaces: one for policy configuration and one for conversation creation. The policy configuration module 336 matches network policy rules for a particular subscriber to application processing in the content services level of the architecture. The conversation creation module consults the policy database and performs rule matching on newly arrived packets. In essence, when a packet arrives, if it takes the slow path, the packet must the clear aid to determine which subscriber to packet belongs to any policies in place for that subscriber in order to ford the packet through the correct processing pipeline for that particular subscriber.

The service state memory manager 336 allows any service in the service architecture to attach an arbitrary service-specific state, were data for the state is managed by the state module. Thus, the allocated state objects can be attached on a per flow basis, per half conversation basis, or per conversation basis. States that are outside the conversation such as, for example, RPC port mappings, are dealt with separately.

The application data parser 340 provides a common application data parsing routine. One example is a Telnet protocol.

Finally, a TCP data reconstruction module 344 ensures that data seen that by the IP content services are exactly the same data seen by final destination servers. An anti-replay defense may be implemented using this module as well.

At the top of the architecture stack shown in FIG. 5 are the IP content services modules 360.

In the version of NetBSD running on the Control Authority, the Ethernet driver has been changed to match a simple Mac interface, where it gets and puts packets from a pre-assigned block of memory. Hence IP addresses are assigned to these NetBSD CPUs and the programs are run as if they are multiple machines. Inter NetBSD CPU communication is done by using loopback addresses 127.0.0.*. IKE/PKI and the management CPU has the real IP addresses bound to their interfaces.

The MAC layer is aware of the IP addresses owned by the NetBSD CPUS and shuttles packets back and forth.

Each management CPU runs its components as pthreads (Single Unix Specification Threads). In the embodiment shown in FIG. 4, the CPUs communicate with the compute element CPUs through UDP sockets; this is done so that the processes/threads on the NetBSD CPUs can block and not waste CPU cycles.

The security of subscriber traffic is maintained by using VLAN tagging. Each subscriber is assigned a unique VLAN tag and the traffic from the subscribers is separated out using this VLAN tag. In one embodiment, the content services aggregation device is assumed to be in place between the physical WAN switch and a layer 2 switch coupled between the device and the data center. The VLAN table reflects tags at the downstream Layer 2 switch and is configured at the aggregator by the operator.

Figure 8:
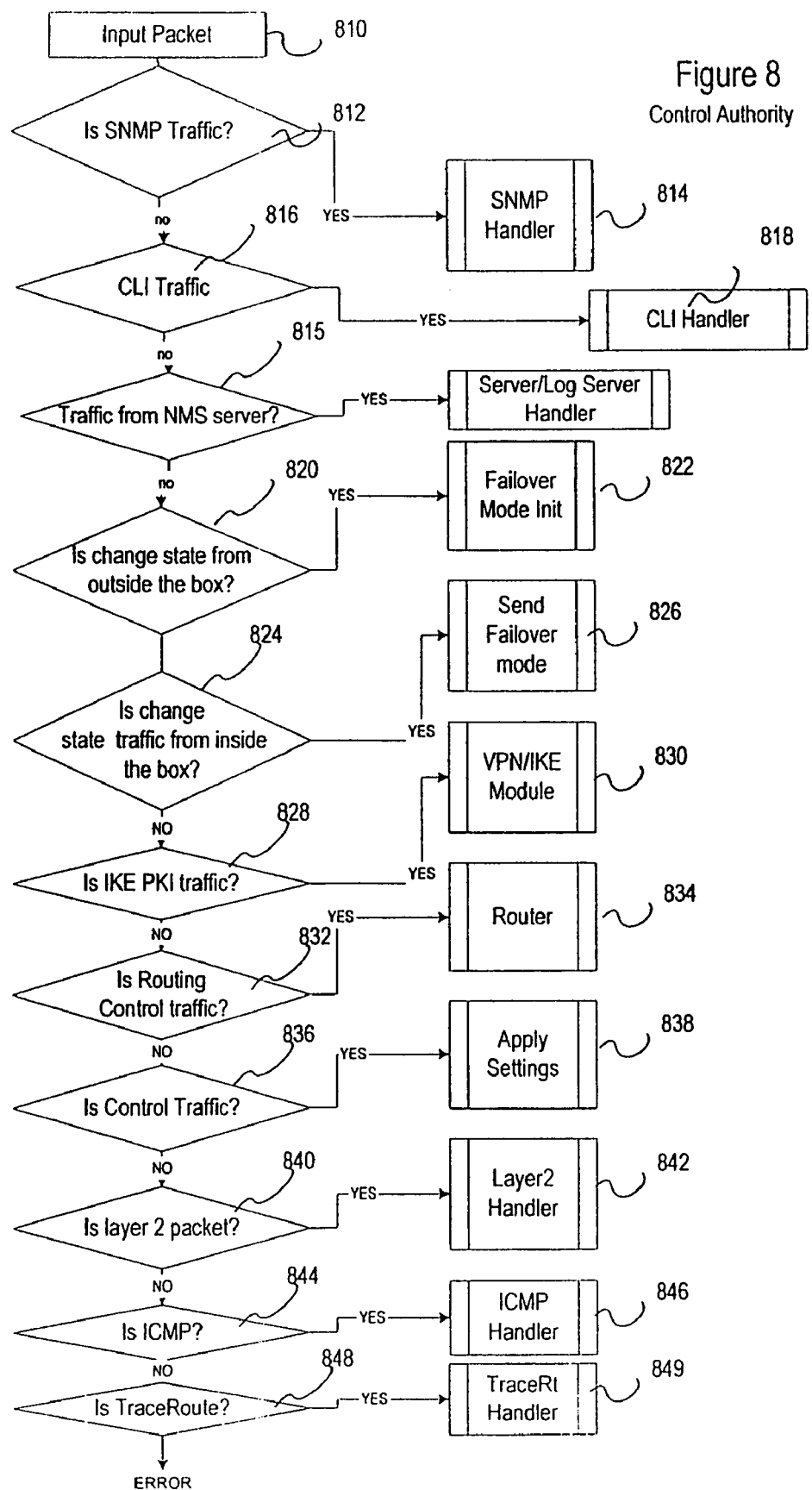
FIG. 8 is a flowchart depicting processes running in a processing element designated as a control authority processor and the classification of traffic to processes running in the control authority processor.

Operation of the Control Authority on the different types of traffic is illustrated in FIG. 8.

As a new packet enters the Control Authority 100a, at step 810, the Control Authority determines type of traffic it is and routes it to one of a number of function handlers accordingly. If the traffic is SNMP traffic, an affirmative result is seen at step 812 and the traffic is forwarded to an SNMP handler at 814. If the management traffic Command Line Interface traffic at step 816, the traffic is forwarded to a CLI handler at 818.

If the traffic is from the Network Management System server at step 815, the traffic is forwarded to a Log Server handler at 817. If the traffic is change of state traffic from outside of the content services aggregator at step 820, it is routed to a failover handler 822. Likewise, if the aggregator is sending change state traffic inside of the aggregator, at step 824 the result is affirmative, and it is forwarded to the failover mode initialization handler at 826. In this sense, failover refers to a service applicable when multiple content services aggregators are coupled together to allow performance redundancy. They may be configured as master-slave or peer-to-peer and upon failure of one of the devices, the failover handler will coordinate one device taking over for another.

At step 828, a determination is made as to whether the traffic is IKE/PKI traffic and if so, the traffic is forwarded to the IKE/PKI module, discussed in further detail below. If the traffic comprises routing instructions, as determined at step 836, the traffic is handled by the router module at 834. If the traffic is control traffic, at step 836, the particular control settings are applied 838. If the traffic is a layer 2 packet, it is handled by a layer 2 handler at 842. And if the packet is an ICMP packet, it is handled by an ICMP handler at 846. Finally, if the packet is a trace route packet 848, it is forwarded to a tracert (trace route) handler at 849. If it cannot be determined what type of packet type is present, an error is generated and the packet dropped. It should be understood that the ordering of the steps listed in FIG. 8 is not indicative of the order in which the determination of the packets is made, or that other types of functional determinations on the packet are not made as packets enter the Control Authority.

C. Processing Pipelines

As noted above, the system supports a plurality of application service modules. Those shown in FIG. 5 include Firewall, NAT, IP forwarding (OSPF, static and RIP Routing), Bandwidth Management, SSL Encryption/Decryption, Web Switching, Web Caching and IPSEC VPN.

In an implementation of the architecture of the present invention wherein the compute elements and cross-bar switch are respectively multi-processor unit 2010 and cross-bar switch 3010 or 3110 described below, IP packets with additional data attached to them may be sent within the system. This ability is used in creating a pipeline of compute elements, shown in FIGS. 7a and 7b.

Figure 7A:
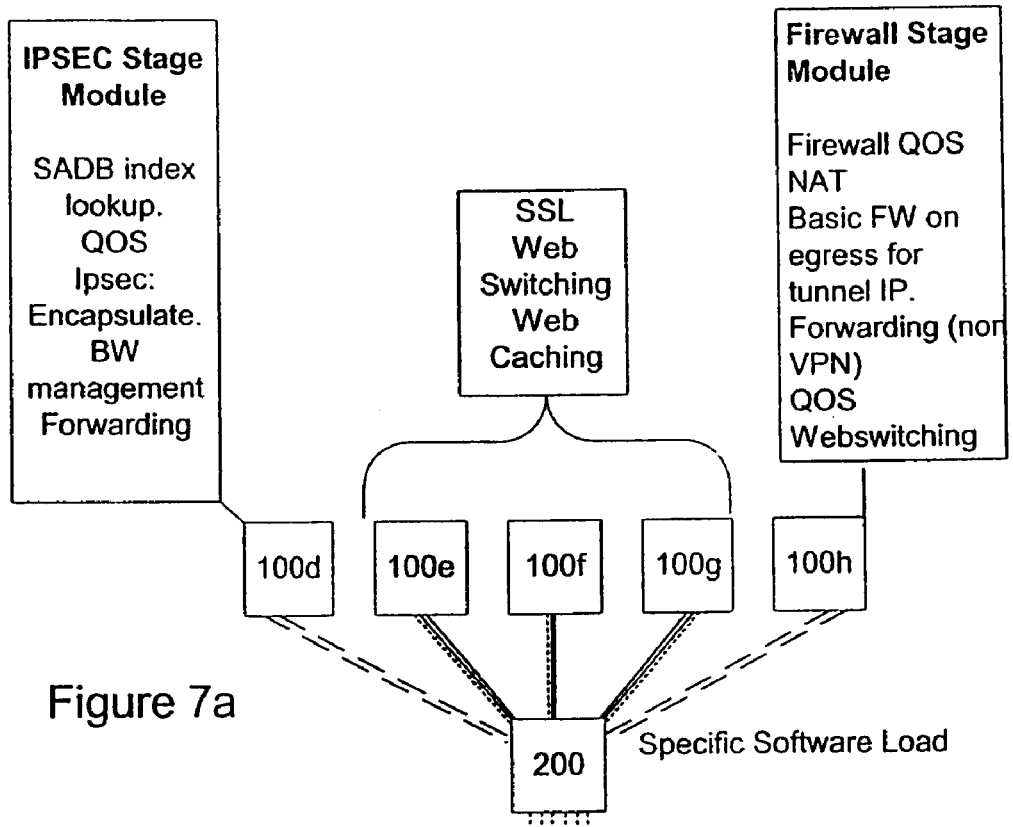
FIG. 7a is a block diagram depicting the functional software modules applied to various processors on a dedicated processing pipeline in accordance with the present invention.

In one embodiment, the processing pipelines are dynamic. That is, any compute element can transfer a processed packet to any other compute element via the crossbar switch. In a fully dynamic embodiment, each compute element which is not part of the control authority can perform any of the services provided by the system and has a full software load (as described briefly above). In an alternative embodiment, the process pipelines are static, and the flow follows an ordering of the compute elements arranged in a pipeline as shown in FIG. 7a in order to efficiently process the services. In this static pipeline, functional application service modules are assigned to specific compute elements, and specific processors within the compute elements may be optimized for computations associated with providing a particular service. As such, the software load for each compute element is controlled by the Control Authority at boot as described above. Nevertheless, the pipelines shown in FIG. 7a are only one form of processing pipeline and the hardware representation therein is not intended to be exclusive or limiting on the scope of the present invention. It should be recognized that this ordering is exemplary and any number of variations of static pipelines are configurable. As illustrated in FIG. 4, the processing pipeline shown in FIG. 7a and the flow pipeline shown in FIG. 7b may be provided on physical cards which may be used as part of a larger system.

As noted briefly above, once a new packet flow enters the input queue and is fed to an input compute element 100b, 100c, a policy matching process performs a rule-matching walk on a per subscriber basis to determine which services are to be applied to the flow. In one embodiment, the flow is then provided to a processor pipeline with specific compute elements designated as performing individual content services applications in cooperation with the Control Authority.

Figure 7B:
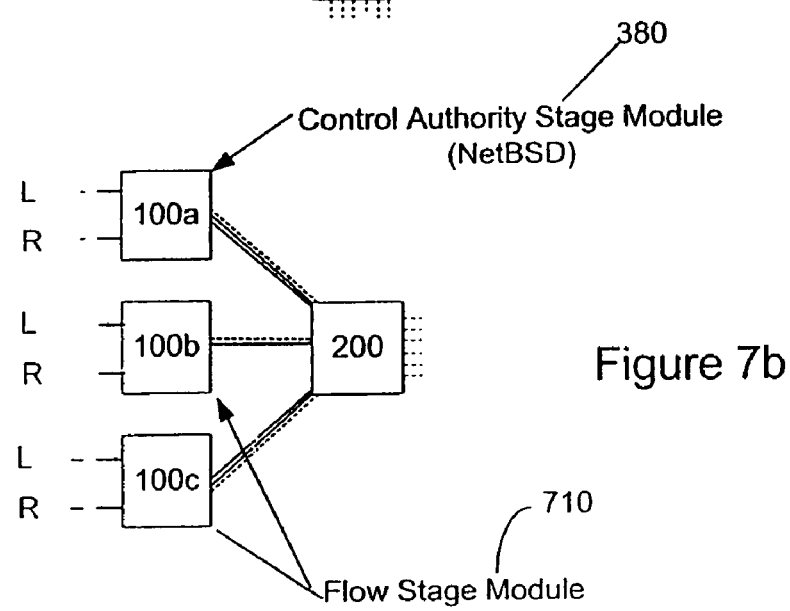
FIG. 7b is a block diagram depicting functional software modules applied to various processors in an input/output pipe in accordance with the present invention.

FIGS. 7a and 7b illustrate generally the mapping of the particular application module to particular process element, thereby forming a process pipeline. As shown in FIG. 7b, two compute elements 100b and 100c perform flow stage operations allowing the system to classify flow and conversation packets. Processor 100a represents the Control Authority NetBSD compute engine. FIG. 7a shows the application modules operating on individual processors. In one embodiment, each compute element may be optimized for implementing one of the content services applications. In an alternative embodiment, a dynamic pipeline may be created wherein the compute elements can perform one or more different network services applications, and each element used as needed to perform the individual services. In FIG. 7a, processor 100d is optimized to cooperate with the Control Authority to perform IPSec utilizing the IPSec module. This includes performing security association database (SADB) lookups, IPSec encapsulation, bandwidth management, QoS, and forwarding. Compute element 100h is optimized for Firewall and NAT processing as well as QoS and Webswitching. Likewise, processors 100f, 100g and 100e are utilized for Web switching, Web caching, and SSL optimized computations. In some cases, elements 100d and 100h are referred to herein as "edge" compute elements, as they handle operations which occur at the logical beginning and end of the processing pipeline.

Each of the application services modules cooperates with the Control Authority 380 in the provision of application services. For each service application, this cooperation is different. For example, in IPSec processing, Security Policy Database (SPD) information is stored in the flow stage, wile IKE and PKI information is kept in the Control Authority, and statistics on IPSec and the security association database is maintained in the IPSec stage. In providing the firewall service, IP level check info is maintained in the flow stage, level 4-7 check info is maintained in the firewall module, and time based expiration is maintained in the Control Authority.

In this embodiment, for example, in order to contain the IPSec sequence number related calculations to the shared memory based communication, a single IPSec security association will be mapped to a single Operating System 305 compute element. In addition, in order to restrict the communications needed between the various flows of a "conversation", a conversation will be mapped to a single processing element. In essence, this means that a given IPSec communication will be handled by a single processing pipe.

D. Flow Stage Module

Figure 9:
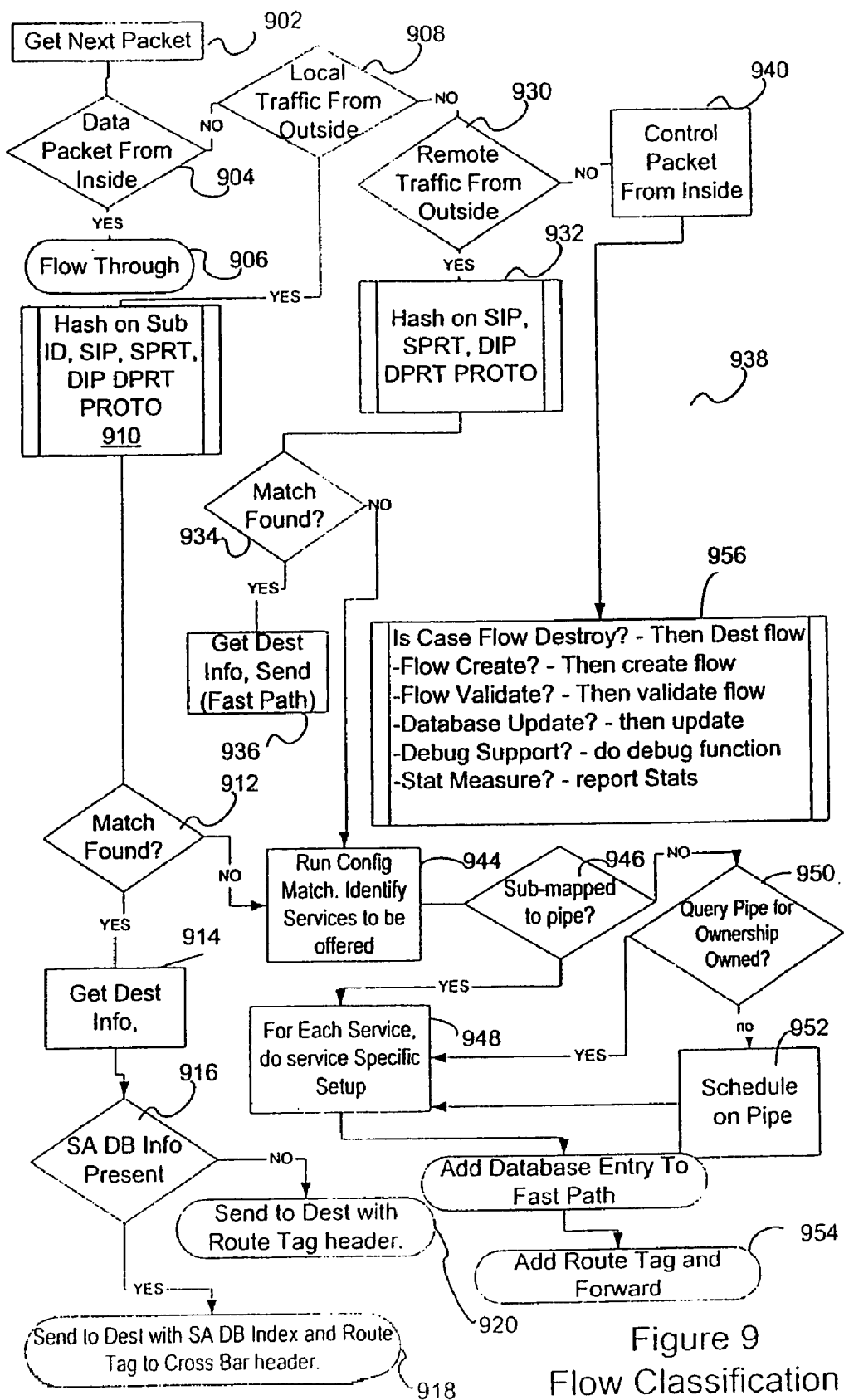
FIG. 9 is a flowchart depicting the flow classification utilized by one input processing element to classify a flow of data packets in accordance with the present invention.

FIG. 7b illustrates the flow stage module as operating on two compute elements 100b and 100c. FIG. 9 illustrates the process flow within the flow stage. The flow stage module is responsible for identifying new flows, identifying the set of services that needs to be offered to the flow and dynamically load balancing the flow (to balance throughput, memory usage and compute usage) to a pipeline of compute elements. In doing so, the flow stage also honors the requirements laid out by the above items. Flow stage also stores this information in a flow hash table, for subsequent packets in a flow to use.

As new flows are identified, if a new flow requires other support data structures in the allocated compute elements, appropriate functions are called to set up the data structures needed by the compute elements. An example of a data structure for the IPSec security authority process is described below with respect to FIGS. 13-14.

In general, and as described in particular with respect to FIG. 9, for every packet in a flow, the flow hash table is read, a "route-tag" that helps to route a packet via the required compute elements internally to the content service aggregator is added, and the packet is forwarded on for processing.

Certain conventions in the routing are maintained. In general, new flows are routed to processing pipelines such that the traffic through the content service aggregator is uniformly distributed across the available processing pipelines. Flows are distributed to processing pipelines such that the flows belonging to the same security association are sent to the same processing pipeline. New flows are allocated such that a "conversation" (flows, reverse flows and related flows) is sent to the same processing pipeline. In addition, the flow stage checks the SPD policies on new flows and trigger IKE if an IKE-SA/IPSec-SA is not already established.

To bind conversations and a given IPSec security association to single compute elements, the flow stage employs various techniques. In one case, the stage can statically allocate subscribers to processing pipelines based on minimum and maximum bandwidth demands. (For example, all flows must satisfy some processing pipeline minimum and minimize variation on the sum of maximums across various processing pipelines). In an alternative mode, if a subscriber is restricted to a processing pipeline, new flows are allocated to the single pipe where the subscriber is mapped. Also, the route-tag is computed in the flow stage based on policies. The processing can later modify the route-tag, if needed.

The flow routing process is illustrated in FIG. 9. As each packet enters the system at step 902, the system determines the type of the packet it is and routes it accordingly. At step 904, if the packet is determined to be a data packet from inside the content services aggregator, the system understands that the packet is intended to flow through the system at step 906, and the compute elements 100b, 100c are set to a flowthrough mode. If the packet is not from inside the aggregator at 904, then at step 908 if the system determines that the packet is local traffic from outside of the content services aggregator, the flow table is checked at step 910 and if a match is found at step 912, the destination is retrieved at step 914. If the security association database contains information on the flow at step 916, then at step 918, the packet is forwarded to its destination via the crossbar switch with its security association database index, route tag and crossbar header attached. If the security association database information is not present at step 916, and the packet is forwarded to its destination with only its route tag and the crossbar header at 920.

If no match is found at the checking the hash flow table at step 912, then a policy walk is performed wherein the identity of the subscriber and the services to be offered are matched at step 944. If a subscriber is not allocated to multiple pipes, at step 946, each pipe is "queried" at step 950 (using the multicast support in the cross-bar switch) to determine which pipe has ownership of the conversation. If one of the pipelines does own the conversation, the pipeline that owns this conversation returns the ownership info at 950 and service specific set-up is initiated at 948. The service specific setup is also initiated if the flow is found to be submapped as determined by step 946. If no pipe owns the flow at step 950, that the flow is scheduled for a pipe at 952. Following service specific setup at 948, a database entry to the fast path processing is added at 953 and at step 954, route tag is added and the packet forwarded.

If the packet is not local at 908, it may be remote traffic from outside of the content services aggregator as determined at step 930, the flow table is checked at step 932 and if a match is found, at step 934, it is forwarded to its destination at step 936. If it is remote traffic from outside the box and a match is not found at step 934, the packet is mapped to its destination at step 938 and an entry is created in the flow table before forwarding the packet to its destination.

If the packet is a control packet from within the content services aggregator at step 940, the packet is one of several types of control packets and may be included those shown in process 956. These types of control packets may include a flow destroy packet, indicating that a particular flow is to be destroyed. A flow create packet indicating that the particular flow is to be created in the flow table. Other types of control packets include a flow validate packet, database update packets, debug support packets, or load measuring packets.

E. QOS (Quality of Service)

QOS is performed by both the IPSec Modules and the Firewall Modules at the flow stage.

In the system of the present invention, bandwidth allocation is performed on a per-subscriber basis. In general, the goal of QOS is to provide bandwidth allocation on a per-system rather than per-interface basis. The minimum guaranteed and maximum allowed bandwidth usage is configurable on a per-subscriber basis. The QOS architecture provides that where an internal contention for a resource makes it impossible to meet the minimum bandwidth requirements for all subscribers, performance should degrade in a manner that is "fair" to all subscribers, and where the system is under-utilized, the extra available bandwidth should be allocated in a manner that is "fair" to all subscribers with active traffic.

The traditional approach to QOS uses an architecture known as Classify, Queue, and Schedule (CQS). When a packet arrives in the system, it is first classified to determine to which traffic class it belongs. Once this classification has been made, the packet is placed in a queue along with other packets of the same class. Finally, the scheduler chooses packets for transmission from the queues in such a way that the relative bandwidth allocation among the queues is maintained. If packets for a given class arrive faster than they can be drained from the queue (i.e. the class is consuming more bandwidth than has been allocated for it) the queue depth will increase and the senders of that traffic class must be informed to lower their transmission rates before the queue completely overflows. Thus, in the CQS architecture, bandwidth control is shared between two loosely-coupled algorithms: the scheduling algorithm maintains the proper division of outgoing bandwidth among the traffic classes and the selective-drop algorithm (a.k.a. the admission control algorithm) controls the incoming bandwidths of the traffic classes.

This traditional architecture does not function well in the multiprocessor system of the present invention. In order to implement a fair scheduling algorithm one would have to monitor (n·s·c) queues, where n is the number of processors, s is the number of subscribers and c is the number of classifications per subscriber. Further, each compute CPU's queues cannot be dealt with in isolation since the per-class-per-subscriber bandwidth guarantees are for the entire compute element, not for the individual CPUs.

The QOS architecture of the present invention determines a set of distributed target bandwidths for each traffic class. This allows the content aggregator to provide bandwidth guarantees for the system as a whole. These targets are then used on a local basis by each flow compute element to enforce global QOS requirements over a period of time. After that period has elapsed, a new set of target bandwidths are calculated in order to accommodate the changes in traffic behavior that have occurred while the previous set of targets were in place. For each traffic class, a single target bandwidth must be chosen that: provides that class with its minimum guaranteed bandwidth (or a "fair" portion, in the case of contention for internal resources); does not allow that class to exceed its maximum allowed bandwidth; and awards a "fair" portion of any extra available bandwidth to that class.

For purposes of the following disclosure, the term "time quantum" (or "quantum") refers to the amount of time that elapses between each synchronization of the admission control state; the term $Min_i$ refers to the minimum bandwidth guaranteed to subscriber i; the term $Max_i$ refers to the maximum bandwidth allowed to subscriber i; the term $B_i$ refers to the total bandwidth used by subscriber i during the most recently completed time quantum; the term $Avg_i$ refers to the running average of the bandwidth used by subscriber i over multiple time quanta; and the term $Total_{i,j}$ refers to the total bandwidth sent from flow Compute element i to P-Blade edge Compute element j during the most recently completed time quantum.

Two additional assumptions are made: the change in $Avg_i$ between two consecutive time quanta is small compared to $Min_i$ and $Max_i$; and the time required to send a control message from a processing pipeline edge compute element to all flow compute elements is very small compared to the round trip time of packets that are being handled by the system as a whole.

Identifying and correcting is the top priority to determine the set of target bandwidths for the next quantum, multiple congestion areas in which a resource may become over-subscribed and unable to deal with all of its assigned traffic are identified.

There are three potential points of resource contention in the system of the present invention: the outbound ports from the flow stage processing pipeline crossbar switch to the service provision processing pipeline compute elements; the inbound port to the service processing pipeline crossbar switch from the edge compute elements (or the computational resources of the edge compute elements themselves); and the outbound ports from the flow stage crossbar switch to the outgoing system interfaces. The first two areas of contention (hereafter known as inbound contention) are managed by the flow compute elements 100b, 100c while outbound interface contention is resolved by the service processing pipeline edge compute elements 100d, 100h. The following description follows the general case of inbound contention. It will be understood by one of average skill that the methods used there can be easily applied to outbound contention.

After the flow compute elements have exchanged statistics for the more recently completed time quantum, the overall bandwidth from each flow compute element to each edge compute element, $Total_{i,j}$, is computed. Resource contention exists for edge compute element j if any of the following constraints are not met:

$$Total_{1,j} + Total_{2,j} \leq 1 \frac{\text{Gbit}}{\text{sec}}$$

$$Total_{1,j} + Total_{2,j} \leq 1 \frac{\text{Gbit}}{\text{sec}}$$

$$\sum_{i=1}^{4} Total_{i,j} \leq 1 \frac{\text{Gbit}}{\text{sec}}$$

Note that this method of contention detection is strictly for the purposes of identifying and correcting contention after it has occurred during a time quantum. Another method is required for detecting and reacting to instantaneous resource contention as it occurs and is described below.

As noted above, one goal of the QOS architecture is that, in the presence of resource contention, the minimum guaranteed bandwidths for each subscriber contending for the resource should be reduced in a manner that is fair to all contending subscribers. More specifically, the allocation of the available bandwidth for a contended resource will be considered fair if the ratio of $Avg_i$ to $Min_i$ is roughly the same for each subscriber contending for that resource:

$$\text{Fair} \Leftrightarrow \forall\, i, j \in \{\text{Contenders}\}: \frac{Avg_i}{Min_i} \approx \frac{Avg_j}{Min_j}$$

Once contention for a resource has been detected, the contenders' bandwidth usage for the next quantum is scaled back to alleviate the contention and maintain a fair allocation of bandwidth among the contenders. In the case of a single contended resource with a bandwidth deficit of D, a fair allocation is obtained by determining a penalty factor, $P_i$, for each subscriber that is then used to determine how much of D is reclaimed from that subscriber's bandwidth allocation. $P_i$ can be calculated by solving the system of linear equations:

$$\frac{Avg_1 - P_1 D}{Min_1} = \ldots = \frac{B_n - P_n D}{Min_n}$$

$$\sum_{i=1}^{n} P_i = 1$$

The above equations yield ideal values for the set of penalty factors in the case of a single contended resource. In the case of m contended resources, a nearly ideal set of penalty factors can be found by solving the system of linear equations:

$$\frac{Avg_1 - P_{1,1}D_1 - \ldots - P_{1,m}D_m}{Min_1} = \ldots = \frac{Avg_n - P_{n,1}D_1 - \ldots - P_{n,m}D_m}{Min_n}$$

$$\sum_{i=1}^{n} P_{i,1} = 1$$

$$\vdots$$

$$\sum_{i=1}^{n} P_{i,m} = 1$$

Solving systems of linear equations is a well-studied problem and the best algorithms have a time complexity of $O(n^3)$ where n is the number of variables. Given that n could be well over 1000, in order to make the system practical for implementation in the present invention, the following algorithm can be used to find approximate values for the penalty factors. The intuition behind the algorithm is that the systems of linear equations shown are being used to minimize, for all contenders, the quantity:

$$abuse_i = \frac{Avg_i - P_i D - \ldots - P_{1,m}D_m}{Min_i} - \frac{\sum_{j=1}^{n}\frac{Avg_j - P_j D - \ldots - P_{1,m}D_m}{Min_j}}{n}$$

The algorithm divides D into s smaller units and penalizes by D/s the subscriber with the highest calculated abuse value during each of s iterations. Since it takes O(n) operations to determine the subscriber to penalize for each iteration, the time complexity of this algorithm is O(sn), or simply O(n) if s is fixed. In practice, abuse will not actually be calculated; identifying the subscriber with the highest ratio of penalized average bandwidth to minimum bandwidth is equivalent.

Unfortunately, not all traffic-shaping decisions may be postponed until the next time quantum. In the case of resource contention, it is possible for the packet buffers in the flow and edge compute elements to overflow from the cache in a time period that is much smaller than a full time quantum. In the case of inbound contention, there can be up to 1 Gbit/sec of excess data being sent to a contended resource. Assuming the worst case of 64 byte packets and that 300 packets will fit in an compute element's cache (remember that all packets require a minimum of one 512-byte block), an overflow condition may occur in as quickly as:

$$\frac{300 \text{ packets} \cdot 64 \frac{\text{bytes}}{\text{packet}} \cdot 8 \frac{\text{bits}}{\text{byte}}}{1 \frac{\text{Gbit}}{\text{sec}}} \approx 150 \text{ μsec}$$

This amount of time is about 40 times smaller than the proposed time quantum so it will be necessary to detect and handle this situation before the current time quantum has expired.

The choice of time quantum has a direct impact on the performance of the QOS architecture. If the value is too small, the system will be overloaded by the overhead of exchanging state information and computing new target bandwidths; if the value is too large, the architecture will not be able to react quickly to changing traffic patterns.

As a starting point, the largest possible quantum that will still prevent a traffic class with the minimum possible bandwidth allocation from using more than its bandwidth quota during a single quantum is used. Assuming that the 5 Mbits/sec as the minimum possible bandwidth for a class and that this minimum is to be averaged over a time period of 10 seconds, the choice of time quantum, q, is:

$$q = \frac{5 \frac{\text{Mbits}}{\text{sec}} \cdot 10 \text{ sec}}{8 \frac{\text{Gbits}}{\text{sec}}} = 6.25 m \text{ sec}$$

This parameter may be empirically tuned to find the ideal balance between responsiveness to changing traffic patterns and use of system resources.

Since maintaining a true moving average of the bandwidth used on a per-subscriber basis requires a good deal of storage space for sample data, the Exponential Weighted Moving Average (EWMA) is used.

The EWMA is calculated from a difference equation that requires only the bandwidth usage from the most recent quantum, v(t), and the previous average:

$$Avg_i(t) = (1-w) Avg_i(t-1) + wv(t)$$

where w is the scaling weight. The choice of w determines how sensitive the average is to traffic bursts.

In general, in implementing the aforementioned QOS architecture, the system includes a flow stage QOS module, an IPSec stage outbound QOS module, an IPSec stage inbound QOS module, a firewall stage outbound QOS module, and a firewall stage inbound QOS module.

The flow stage QOS module is responsible for keeping statistics on the bandwidth consumed by subscribers that it sees. Time is divided into quantum and at the end of each quantum (indicated through a control message from the Control Authority), statistics are shared with the other flow stages, including the split of the bandwidth by service processing pipelines. This enables each flow stage to have an exact view of the bandwidth consumed by different customers/priorities.

Bandwidth maximum limits and contention avoidance are enforced by calculating drop probability and applying it on packets that pass therethrough.

In implementation, the flow stage QOS module will use a number of variables (where each variable has the form "variable [id1] [id2] . . . [id(n)]" and such variables may include: bytes_sent[cpu][subscriber][color][p-ipe], number_of flows [subscriber][color][p-pipe], drop_probability[subscriber] [color][p-pipe], and bytes_dropped[cpu][subscriber][color] [p-pipe] where the id "color" refers to the packet priority.

When time quantum messages are received from the Control Authority, the CPU will sum up the statistics and send to the CA and other CPUs to generate (bytes_seen[subscriber] [color][p-pipe]). The CLI cpu will also send messages to the compute-CPUs to reset their counters. The flow stage module will also calculate the bandwidth usage in the last quantum and determine whether any maximums are exceeded. If so, it will calculate the drop probability in shared memory. Compute CPUs use it as soon as it is available. Next, the flow stage will calculate cumulative bytes_sent[p-pipe], if a processing pipeline is over subscribed, it will calculate drop probability drop_probability[subscriber][color][p-pipe] in shared memory. Compute elements in the service pipeline use this as soon as it is available. The variable bytes_sent[p-pipe] is used in assigning new flows to processing pipelines. If the processing pipeline or the cross-bar switch sends a "back-off" message, the flow stage QOS will compute a new drop probability: drop_probability[subscriber][color][p-pipe] using a rule of thumb that the TCP window will reduce the rate by 50% if a packet is dropped. If there are many simultaneous flows, the drop probability is higher and smaller if we have small number of flows currently active. The flow stage QOS will also send alerts when maximum is exceeded, when min is not satisfied due to internal contention, when packets are dropped due to contention. Finally, this stage will keep track of packets dropped and log it to control authority.

The QOS module present on the IPSec compute element of the processor stage inbound and firewall stage inbound QOS module send panic messages back to the Control Authority on overload. A watermark is implemented to ensure that a burst can be handled even after a panic message was sent.

The IPSec stage inbound QOS module and firewall stage inbound QOS module implementations keep track of the queue sizes in the compute CPUs. If a 80% watermark is exceeded send a panic signal to the flow stages. In this stage, there is no need to drop packets.

The IPSec stage outbound QOS module and firewall stage outbound QOS module detect contention on an output interface. The packets that come to this stage (in outbound direction) would be pre-colored with the priority and subscriber by the flow stages. This stage needs to send the packets to the correct queue based on the color. Due to the handling of QOS at the input a backoff really indicates contention for an output port, due to bad luck.

In implementation, the flow stage outbond QOS module will use a number of variables (where each variable has the form "variable [id1] [id2] . . . [id(n)]" and such variables may include bytes_sent[cpu][subscriber][color][interface]. Upon receipt of time quantum messages from the control authority CLI CPU will sum up the statistics and send to the CA and other CPUs: bytes_sent[cpu][subscriber][color][interface]. The CLI cpu will also send messages to the compute-CPUs to reset their counters. The flow stage outbound QOS will then calculate cumulative bytes_sent[interface], if an interface is over subscribed, calculate drop probability: drop_probability [subscriber][color][interface] in shared memory. This information will then be provided to the processing pipeline compute elements to use as soon as it is available. In alternative embodiments, the "use bytes_sent[interface]" value can be used in assigning new flows to interfaces on equal cost paths. Upon receiving a back-off message from a p-pipe, compute new drop probability: drop_probability[subscriber][color][p-pipe] using a rule of thumb whereby the TCP window will reduce the rate by 50% if a packet is dropped. If there are many simultaneous flows, the drop probability is higher and smaller if we have small number of flows currently active. The flow stage QOS will also send alerts when packets are dropped due to contention. Finally, this stage will keep track of packets dropped and log it to control authority.

F. IPSec Stage Module

The IPSec stage module is responsible for encapsulating local to remote IPSec traffic and de-capsulating remote-to-local IPSec traffic. For remote-to-local traffic, if needed, the module de-fragments the encapsulated IPSec packets before de-capsulation. For local-to-remote traffic, if needed, the module fragments a packet after encapsulated (if the packet size exceeds the MTU). Before sending the packet to the Firewall stage compute element, the module tags the packet with the subscriber ID and a VPN IKE tunnel ID. Each subscriber is entitled to implement firewall rules specific to that subscriber. Once an IKE session is established, the security associations are sent to this stage by the Control Authority. This stage is responsible for timing out the security association and starting the re-keying process. Control information and policies are downloaded from the Control Authority. The module also supports management information bases, logging and communication with other compute elements.

Figure 10:
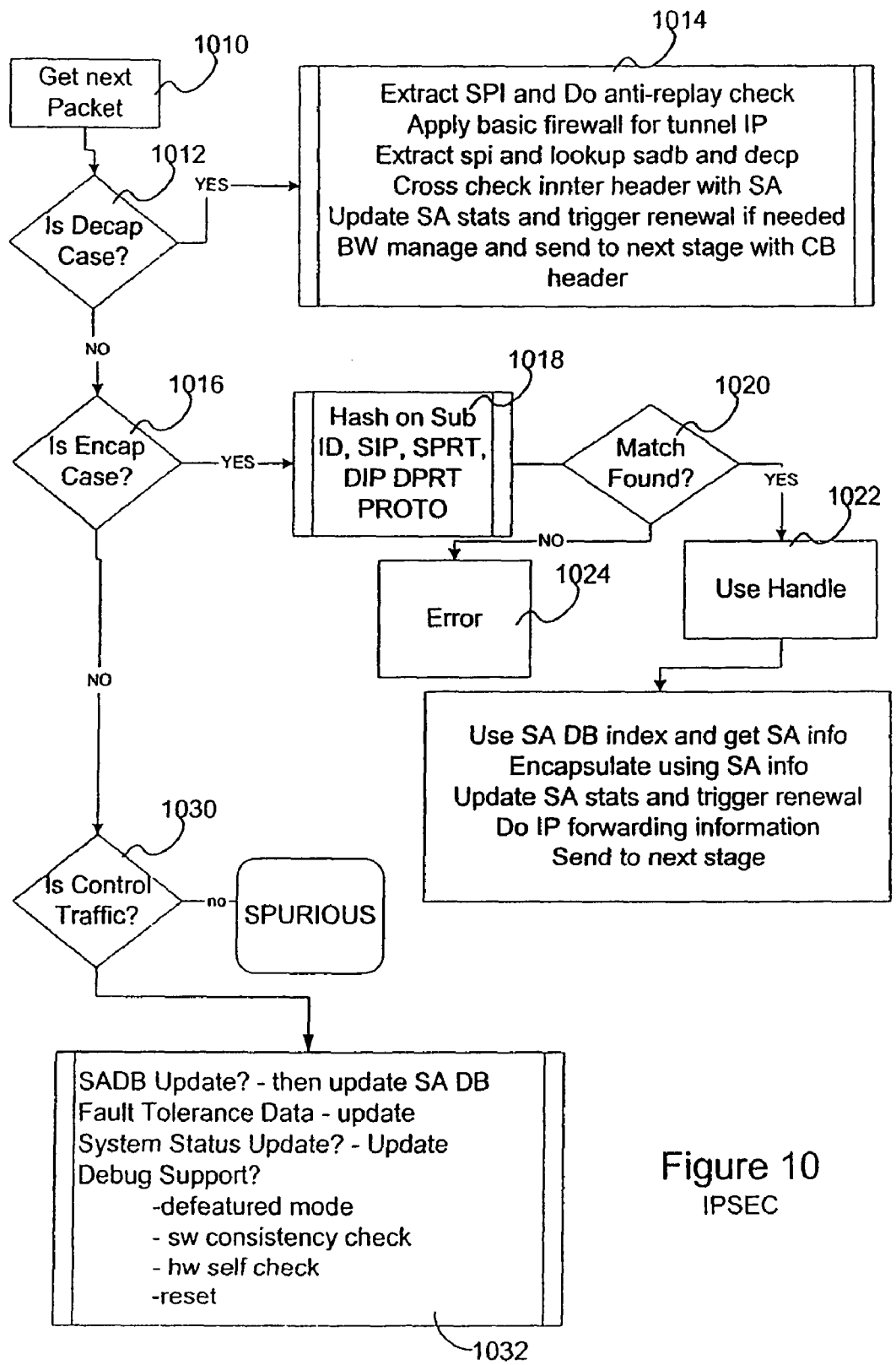
FIG. 10 is a flowchart depicting processing occurring in a virtual private network processing stage of the system of the present invention.

In one implementation, the IPSec module operates as generally shown in FIG. 10. As each new packet enters the IPSec module at 1010, a determination is made as to whether the packet needs to be encapsulated at step 1016 or de-capsulated at step 1012. If the packet is an encapsulation case, at step 1014, the system will extract the security parameter index (SPI) and do an anti replay check. Basic firewall rules will be applied based on the tunneling IP. The security association (SA) will be retrieved from the security association database, and the packet de-capsulated using the security association. The internal header will be cross-checked with the security association. The security association status will be updated and renewal triggered if needed. Bandwidth management rules may be applied before sending the packet on to the next compute element processing stage with the crossbar header attached.

If the packet requires encapsulation, at step 1016, the system will first determine whether the packet is part of an existing flow by checking the hash flow table at step 1018. If a match is found, the system will use the handle value and at step 1026, using the security association database index, the system will retrieve the security association, encapsulate the packet using the security association, update the security association status and trigger a renewal if necessary. IP forwarding information will be saved and the packet will be forwarded on to the next stage. If a match is not found in the hash table, an error will be generated at step 1024. If the traffic is control traffic is indicated at step 1030, it may comprise one of several types of control traffic including security association database update, fault tolerance data, system update data, or debug support along the systems running the featured mode, triggering a software consistency checked, a hard ware self check, or a system reset at 1032.

A more detailed description of the IPSec module is shown and described with respect to FIGS. 12-15, and illustrates more specifically how the Control Authority and the compute elements work together to provide the service in a distributed manner.

Figure 12:
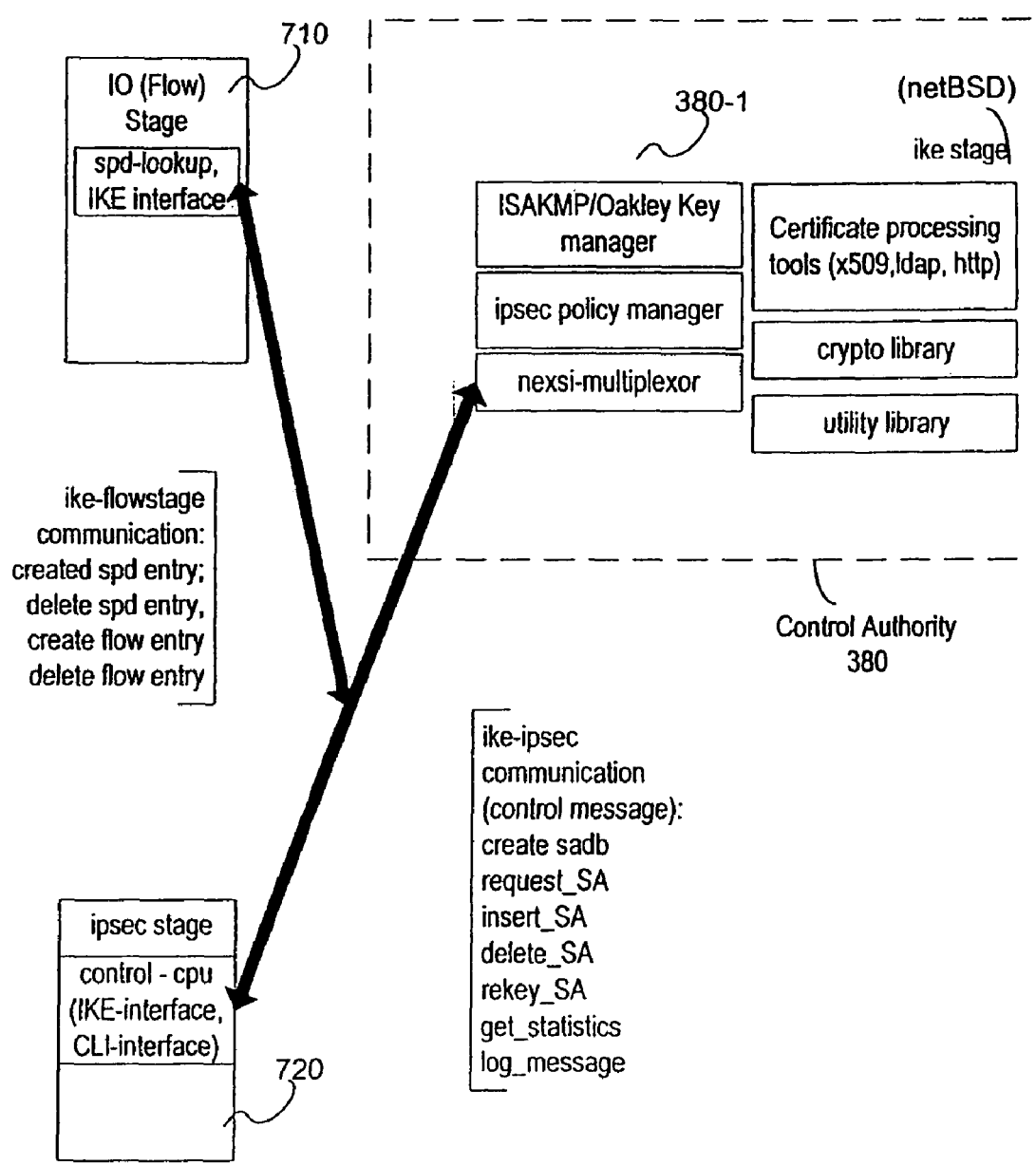
FIG. 12 is a block level overview of VPN processing occurring in the system of the present invention and the communication between various stages and modules.

FIG. 12 is a block diagram illustrating how the flow stage 710, the IPSec processor stage 720 and the IKE stage 380-1 running in the Control Authority cooperate to distribute the IPSec service. As shown in FIG. 12, the IKE stage of the Control Authority includes an ISAKMP/Oakley key manager, an IPSec policy manager, a multiplexor, certificate processing tools, a cryptography library and a utility library. The IO/Flow stage 710, described above, performs the SPD lookups and provides the IKE interface, while the IPSec stage 720 provides a command line interface and is the controlling processor for the operation.

Communication between the flow stage and the IPSec stage 720 will include SPD entry commands, including creation and deletion of SPD entries, as well as flow entry control. Control messages for IKE and IPSec will pass between the IKE stage 380-1 and the IPSec CPU 720. The IPSec stage will retrieve all security association information from the IKE stage 380-1. The flow stage 710 will provide the initial lookups and provide a handle for the packet, as described above with respect to FIG. 10. Once the compute engine receives the packet, the type of processing required is identified. The possibilities include Encryption and HMAC generation, decryption and validation and none. Note that various types of IPSec processing can occur, including Encapsulating Security Protocol (ESP) and Authentication Header (AH) processing.

Figure 15:
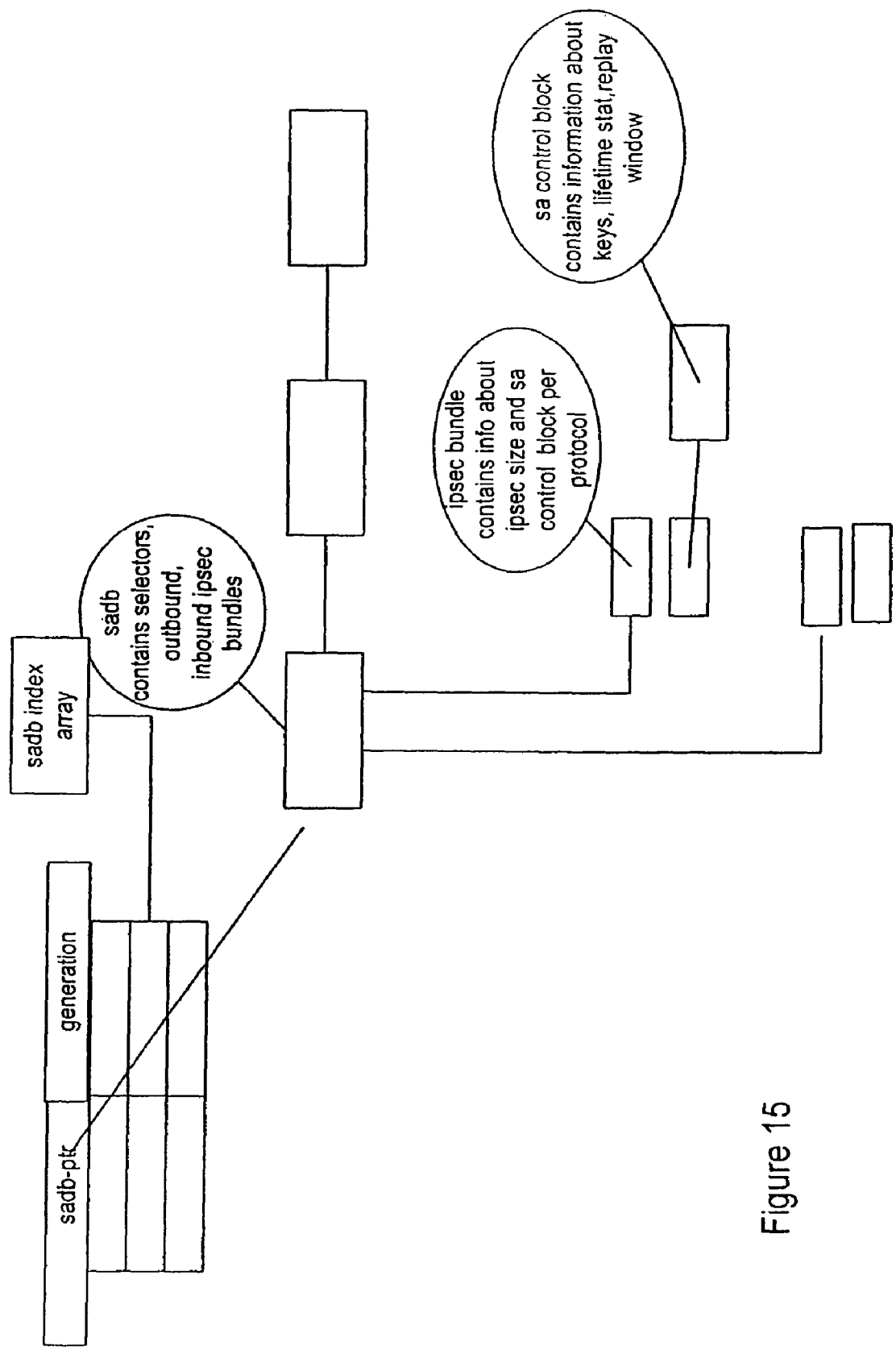
FIG. 15 is a diagram illustrating the data structures configured by the BSD processors running in the control authority.

The data structure for the security association database is illustrated in FIG. 15. As shown therein each security association includes a database pointer sadb-ptr to the security association database. Each data entry contains selectors as well as inbound and outbound IPSec bundles. Each IPSec bundle contains information about IPSec size and security association control blocks. Each control block contains information about security keys, lifetime statistics and the replay window.

Figure 13:
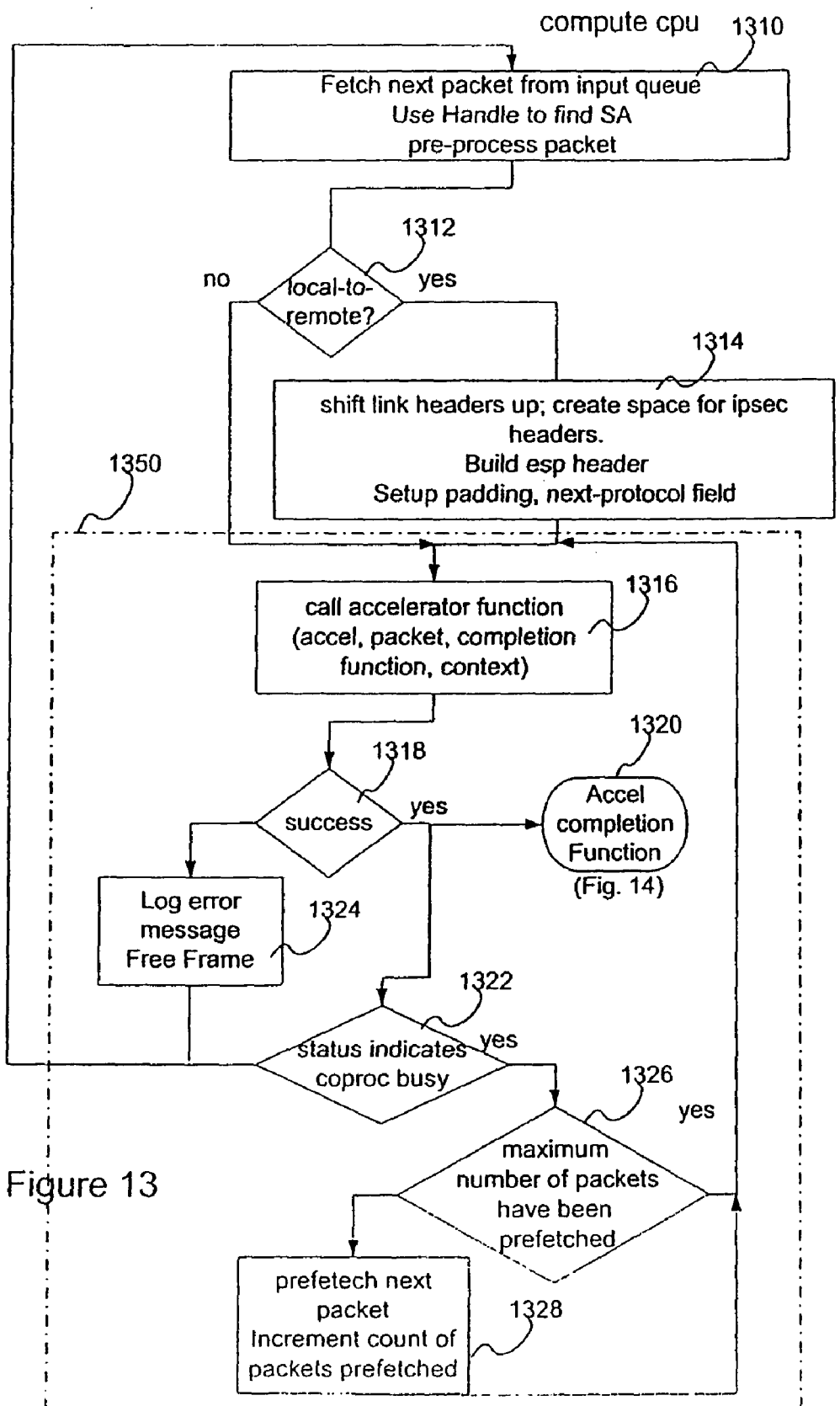
FIG. 13 is a flowchart representing processing in accordance with the VPN processing stage using IKE and PKI.

The particular implementation of IPSec processing on the compute engine (and by reference therein to the control stage 380-1) is shown in FIG. 13. As shown in FIG. 13, the compute CPU fetches the next packet from its input queue. (This operation will vary depending on the nature of the hardware running the system of the present invention.)

At step 1310, using the handle provided by the flow stage, the CPU will find the security association for the packet and preprocess the packet. If the packet is a local to remote packet (a packet destined for the Internet), as determined at step 1312, the CPU at step 1314 will shift the link headers, create space for IPSec headers in the packet headers, build an ESP header, set padding and set the next protocol field.

At this stage, the packet is ready for encryption. In a general hardware implementation, the encryption algorithm proceeds using the encryption techniques specified in the RFCs associated with IPSec and IKE and implemented using standard programming techniques on a conventional microprocessor. In one particular implementation using the multiprocessing hardware discussed herein, the encryption technique 1350 is implemented using a compute element with an accelerator: steps 1316, 1318, 1320, 1322, 1326 and 1328 are implemented if the software is operated on a compute element in accordance with co-pending U.S. patent application Ser. No. 09/900,481, filed Jul. 6, 2001 by Fred Gruner, David Hass, Robert Hathaway, Ramesh Penwar, Ricardo Ramirez, and Nazar Zaidi, entitled MULTI-PROCESSOR SYSTEM wherein the compute elements include an application specific co-processor wherein certain service specific functions can be accelerated in hardware, as defined in the co-pending application.

In this implementation the acceleration function is called at step 1316 and if the call is successful at 1318, the co-processor performs the encryption function and completes at step 1320. The status flag indicating the co-processor is busy will be set at 1322, a check will be made at 1326 to determine if the maximum number of packets has been prefetched and if not packets will be pre-fetched (step 1328) for continued processing as long as the minimum number of packets has not been reached (at step 1326). If the call for the accelerator function fails, an error will be logged at 1324.

Figure 14:
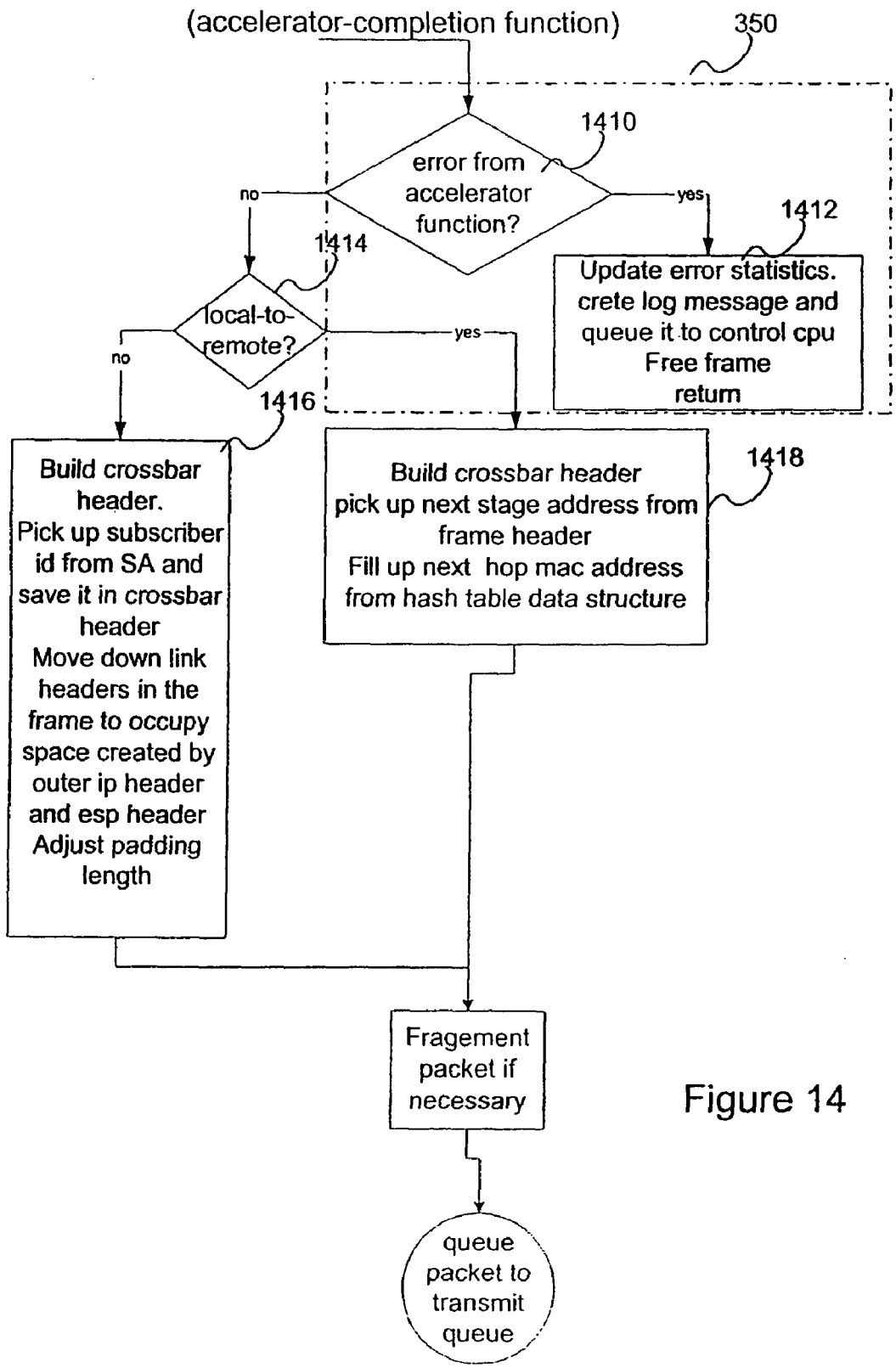
FIG. 14 is a flowchart representing processing of a packet after completion of the encryption and decryption in the packet processing stage of FIG. 13.

FIG. 14 shows the completion of the encapsulation function. Once the packet had been encapsulated, if no errors (at step 1410) have occurred in the encapsulation accelerator, or upon completion of the conventional encryption process, if the packet is determined to be a local to remote packet at step 1414, then at step 1416, the cross bar header will be added, the subscriber identifier will be determined from the security association and saved in the crossbar header. The packet will be fragmented as necessary and transmitted to the compute element's output queue.

If the packet is not a local to remote packet, then the cross bar header will be built and the next stage packet will be determined from the frame header. The next hop Mac address will be filled from the hash table data structure and the packet forwarded to the next compute element stage for processing.

It should be noted that each security association can consist of multiple flows and all packets belonging to a security association are generally directed to one compute element. The security policy database is accessible to all compute elements, allowing all compute elements to do lookups in the database.

G. Firewall Stage Module

The firewall stage performs a number of functions. For local to remote non-IPSec traffic the stage performs stateful Firewall, forwarding and NAT. In addition, for local to remote IPSec traffic, the stage performs basic egress firewall for tunnel IP and forwarding for tunneling packets. For remote to local traffic, the stage performs (de)NAT, Firewall, Forwarding, and bandwidth management.

This stage also receives forwarding table updates and downloads policies from the Control Authority. Support for MIBs, logs and communication to other compute elements are also present in this stage.

Figure 11:
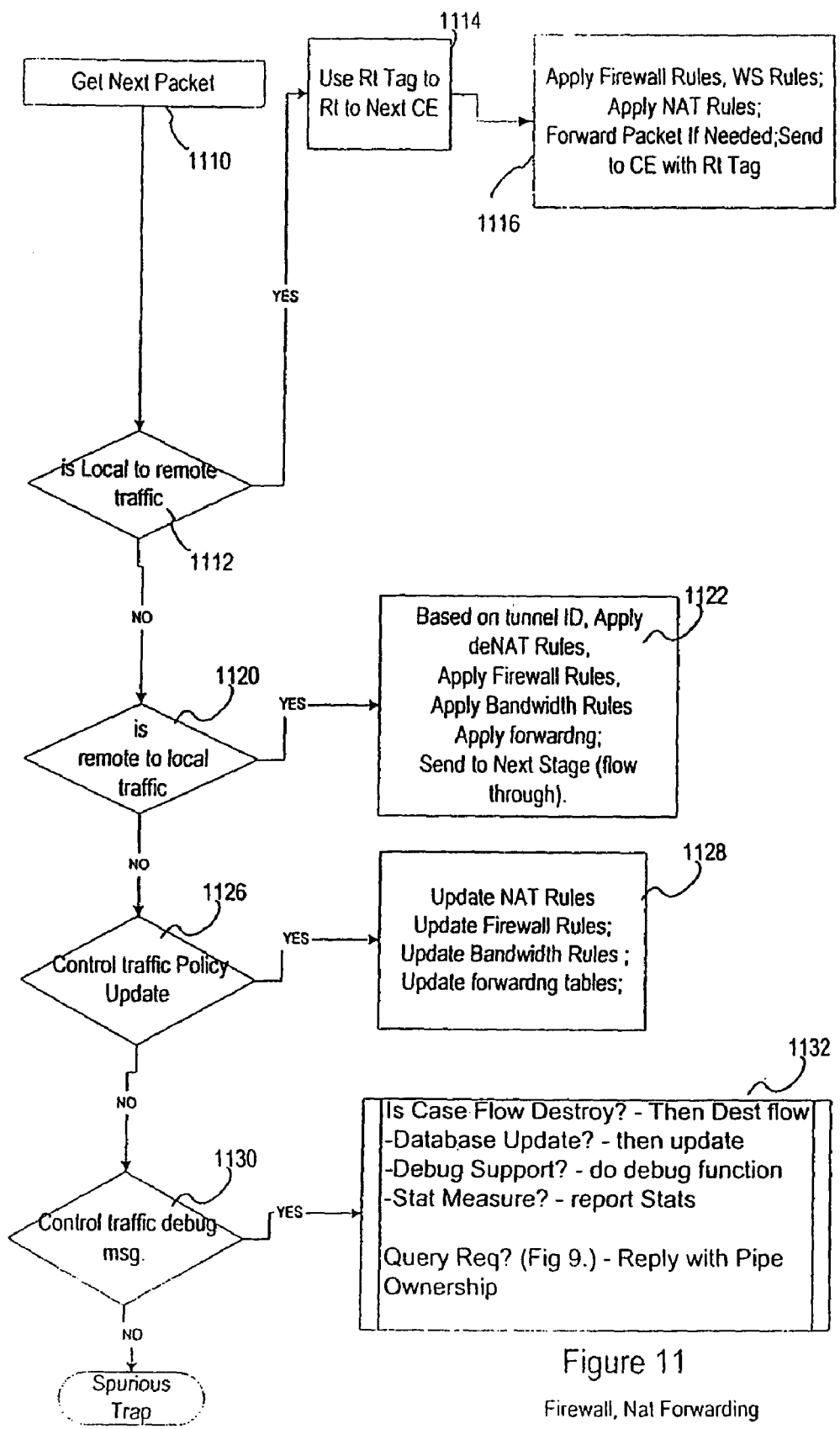
FIG. 11 is a flowchart depicting processing occurring in one pipeline of processing elements in accordance with the system of the present invention.

FIG. 11 illustrates operation of the Firewall stage. As each packet arrives at step 1110, a determination as to the source and destination of the traffic is made and if the packet is local to remote traffic, at steps 1112 and 1114, a second determination is made If the packet is local to remote traffic the route tag is used to route the packet to the next available compute element and Firewall, web switching and NAT rules are applied. The packet is forwarded to other compute elements, if needed, for additional service processing, and routed to the crossbar switch with a route tag at 1116

If the packet is remote to local traffic at step 1120, based on the tunnel ID of the packet, NAT lookups and mappings are applied (deNat), firewall, subscriber bandwidth (QOS) and forwarding rules are applied and the packet is passed to the next stage in flow through mode.

If the packet is control traffic indicating a policy update, NAT, Firewall, or bandwidth rules are updated, or the forwarding tables are updated at 1128.

Finally, if the traffic is a control message at 1130, the particular control instruction is run at 1132. If the packet is none of the foregoing, a spurious trap is generated.

H. Routing

In a further aspect of the present invention, the architecture provides a number of routing functions, both internally and for routing between subscribers and the Internet (or other public addresses). The system supports Open Shorted Path First (OSPF) routing protocol.

Figure 15A:
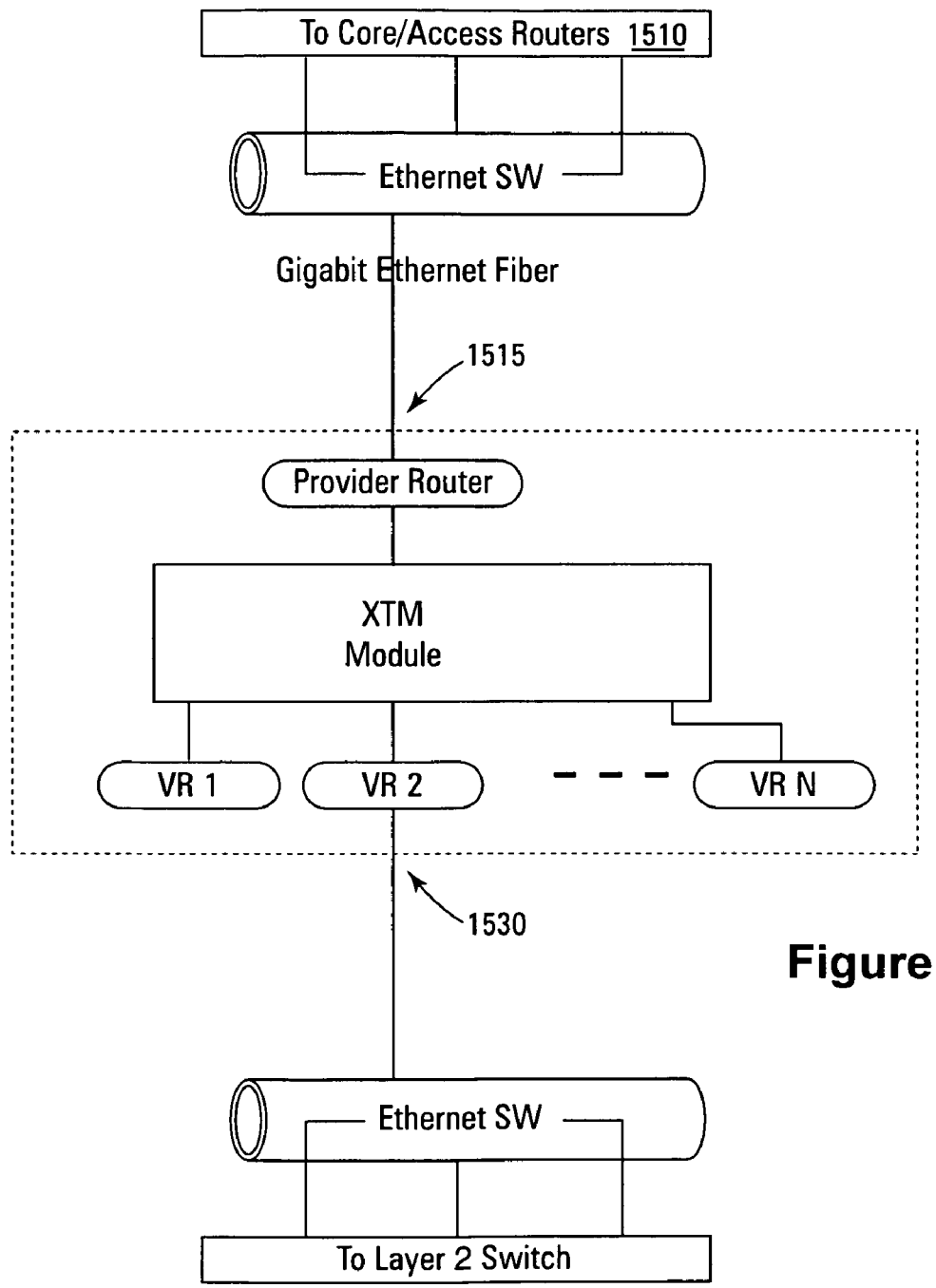
FIG. 15a is a diagram illustrating the virtual routing functions of the system of the present invention.

FIG. 15a illustrates a general overview of the routing architecture of the content services aggregator of the present invention. As noted above, physical interface ports of the content services aggregator are labeled as either trusted or untrusted. The untrusted interfaces typically connect to a core or access router used in the data center. The trusted interfaces are further divided into sub-interfaces by the use of 801.1Q VLAN tags. These sub-interfaces provide the fanout into end-customer equipment via layer 2 VLAN switches.

A virtual router handles routing for each subscriber. These virtual routers send the public addresses present in the subscriber's router to the provider router. The subscriber router is responsible for finding a path to the subscriber nodes. The provider routers forward the traffic appropriately upstream to the public addresses. The virtual router also routes traffic from the Internet downstream to the appropriate subscriber. Public addresses in the subscribers are learned at the provider router by injecting the filtered subscriber routes from the virtual router to the provider router.

The virtual private routed network (VPRN) setup from the virtual router's point of view is done through static routers. IKE tunnels are defined first and these correspond to unnumbered point-to-point interfaces for the router. The sub-nets/hosts reachable via such an interface is configured as static routes.

Security of subscriber traffic is maintained by using VLAN tagging. Each subscriber is assigned a unique VLAN tag. The traffic from the subscribers is separated out using this VLAN tag. The tagging is actually done at the port of the downstream L2 switch based on ports. The upstream traffic is tagged according to the subscriber it is destined to and sent downstream to the L2 switch. The VLAN table reflects tags at the downstream L2 switch and is configured at the aggregator by the operator.

The router function is provided by a series of modules. To implement OSPF virtual routers, provider router and steering function, a Routing Information Base (RIB), Routing Table Manager (RTM), External Table Manager (XTM), OSPF stack, and Forwarding Table Manager (FTM). A virtualization module and interface state handler are also provided. To implement forwarding table distribution and integration to other modules, a Forwarding Table Manager (FTM) including a Subscriber Tree, Forwarding Tree, and Next hop block are utilized. A VPN table configuration and routing module, a VLAN configuration and handling module, MIBs and an access function and debugging module are also provided.

The content services aggregator is capable of running a plurality of virtual routers. In one embodiment, one virtual router is designated to peer with the core routers 1510 through the un-trusted interfaces 1515, providing transit traffic capabilities. A separate virtual router VR1-VRn is also provided for each of a number of secure content domains (SCD) and covers a subset of the trusted sub-interfaces 1530. Each virtual router is capable of supporting connected and static routes, as well as dynamic routing through the OSPF routing protocol.

Each virtual router can be thought of as a router at the edge of each SCD's autonomous system (AS). As is well known in OSPF parlance, an AS is the largest entity within which the OSPF protocol can operate within a hierarchy. Instead of using boarder gateway protocol (BGP) to peer with other virtual routers within the AS, the routing table of a virtual router includes routes learned or configured from other virtual routers. These routes may be announced to the routing domain associated with a virtual router through redistribution to the OSPF process.

The content services aggregator maintains a separate routing table for each virtual router in the system. Because every virtual router peers with every other virtual router in the system, a consistent routing view is maintained even across SCDs.

The one exception to this is in the implementation of private routes. Any route (connected, static or OSPF) that is originated within a specific virtual router may be marked as private. Private routes stay within the context of the originating virtual router and do not get reflected in the routing tables of other virtual routers. This makes it possible for administrators to maintain separate addressing and routing contexts for different SCDs.

In one embodiment, the a routing stack supports: dynamic and static ARP entries; static route entries (with dynamic resolution); routing and ARP table debugging; dynamic reconfiguration; Out-of-band configuration and private route selection. The OSPF Routing Protocol supports: RFC2328 OSPF Version 2; clear text and cryptographic authentication; debugging output; dynamic reconfiguration through the CLI; route redistribution selection using route-maps and access-lists; and private route selection using route-maps and access-lists.

The OSPF components of the routers run on the Control Authority compute element and build up the XTM. The XTM module is then used to build the RTM which contains the best route across all routing protocols. The RTM module is then used to build the forwarding table, that, in turn, add appropriate routes.

The forwarding table is built in the Control Authority and then distributed across to the compute elements on the processing pipelines. The forwarding table contains the routes learned via OSPF and static routes. The forwarding table is used on the route lookups at the processing pipelines. The forwarding table manager handles fast path forwarding, equal-cost multi-path, and load balancing. Load balancing for equal cost paths is achieved by rotating the path used for each flow through the contending paths for the flow. The flow table has pointers to the forwarding table for the routes that have been looked up.

The VPN table consists of the IP addresses in the subscriber's VPN context. These addresses are sent on the IPSec tunnel providing secure routing across Internet for the VPN set up for the distributed VPN subnets. This IPSec tunnel consists of the end-to-end tunnels between the local and remote gateways. The operator setting up the VPN configures the SPD information.

Where two aggregators are used as a failover pair, a failover module provides failure recovery between a pair of content service aggregators. The master content aggregation device is elected by a leader election protocol based first on priority and secondly on IP address. The backup is the next best switch based on these two parameters. In one embodiment, only one backup is configured and used. Traffic from the subscribers is associated with a virtual router which in turn is associated with a single master/provider router living on a content service device. On failure of the content service aggregator, the backup takes up the functionality of the master. The master alive sent out periodically by the elected master to the other content service in the replication configuration. Failure of the master is detected by absence of a master alive signal or the volunteer release of ownership as master by sending a priority zero master alive to other content service aggregator. The master alive is sent on all the ports on the replication master switch. Also periodically, the OSPF virtual routers' state information, Firewall, NAT and VPN state information is sent across the Failure link directly to the failure links of the other content service aggregators(s). Only the master responds to the packets destined for the subscribers it is currently managing. On the failure of the master, the backup takes over as the master.

The operator configures VLAN table information by copying the tag mapping on the downstream L2 switch. The port tagging is configured on the downstream switch. The VLAN tag is stripped out at the virtual router before sending up the IP stack. Incoming packets from upstream are sent to the public destination address by the provider router. VPN addresses are tunneled through the appropriate IPSec tunnel. The tunnel information is used to figure out the correct subscriber and thus its VLAN tag is read from the VLAN table. This tag is inserted in the Ethernet packet before sending out downstream.

I. SSL

In a manner similar to other services provided herein, the SSL module cooperates with the flow stage and the Control Authority to provide SSL encryption and decryption services. In one embodiment, the SSL method employed may be those specified in co-pending U.S. patent application Ser. No. 09/900,515, filed Jul. 6, 2001 by Michael Freed, Elango Gannesan and Praveen Patnala, entitled SECURE SOCKETS LAYER PROTOCOL CUT THROUGH ARCHITECTURE inventors Michael Freed and Elango Ganesen, and hereby fully incorporated by reference herein.

In general, the flow stage will broadcast a send/request query to determine which processing pipeline is able to handle the SSL processing flow. The Control Authority receiving the queues will verify load on all CPUs in the compute elements and determine whether the SSL flows exist for same IP pair, and then select a CPU to perform the SSL. An entry in the flow table is then made and a response to the Control Authority with a flow hint is made. The flow hint contains information about the flow state, the corresponding CPU's ID and index to the SSL Certificate Base. Next, the CPU calculates a hash value for the Virtual ID's Certificate, saves it into SSL Certificate Base and pre-fetches the Certificate's hash entry.

The flow stage will then send the IP packet with hint information in the crossbar switch header to the compute engine. In one embodiment, this means sending the packet to the compute element's MAC which will extract the CPU_ID from the hint. If the CPU_ID is not null, it will put the packet in a particular CPU's queue. If the CPU_ID does not exist, a selection process to select an appropriate CPU may be implemented.

In the implementation using multi-processor 2010, as described below, for compute elements, each CPU will pass through its CPU input queue to obtain a number of entries and issue pre-fetches for packets. This will remove a packet entry from the input queue and add it to a packet pre-fetch waiting queue. As the CPU is going through packet pre-fetch waiting queue, it will get the packet entry, verify the hint, issue pre-fetch for the SSL Certificate Base (if it is a first SSL packet, then calculate Cert Hash and issue pre-fetch for it), move it to SSL Certificate Base waiting queue. Finally it will retrieve the packet.

The system must respond to the SSL handshake sequence before proceeding with description. The "threeway handshake" is the procedure used to establish a TCP/IP connection. This procedure normally is initiated by one TCP device (the client) and responded to by another TCP device (the server). The procedure also works if two TCP simultaneously initiate the procedure.

The simplest TCP/IP three-way handshake begins by the client sending a SYN segment indicating that it will use sequence numbers starting with some sequence number, for example sequence number 100. Subsequently, the server sends a SYN and an ACK, which acknowledges the SYN it received from the client. Note that the acknowledgment field indicates the server is now expecting to hear sequence 101, acknowledging the SYN which occupied sequence 100. The client responds with an empty segment containing an ACK for the server's SYN; the client may now send encrypted data.

In the system of the present invention, the flow stage will send a SYN packet with Hint information in Mercury header to SSL's MAC CPU, which extract CPU ID from the hint and if it not 0, then put packet to particular CPU's queue. If CPU_ID not exist (0) then MAC CPU use a round-robin type process to select appropriate CPU.

In response the client Hello in the SSL sequence, the system prepares to perform SSL. In the implementation of the present invention, the CPU receives Client Hello and issues a pre-fetch for the security certificate. In response to the Client Hello, the system prepares the compute element for the SHA calculation and the MD5 calculations. Next, an ACK will be sent back to the server using the system architecture TCP. Next, a Server Hello is prepared, and any necessary calculations made using the compute element dedicated to this task. The Control Authority then prepares the server certificate message and sets the compute element for the server certificate message. Finally a server hello done message is prepared with the necessary calculations being made by the compute element and the server hello done is sent.

Next, the client key exchange occurs and the RSA and SHA calculations are performed by the compute element.

When the RSA exponentiation is finished, the handshake hash calculation is performed using the compute element and the master secret is decrypted. The pre-shared keys are derived from the master secret and a finished message is prepared. The packet can then be sent to the processing pipeline for SSL processing. Once the computations are finished, the packed may be forwarded.

When the client is finished sending data, handshake calculations are preformed by the compute element and compared by the Control Authority with the calculated hashes for verification. Alerts may be generated if they do not match.

It will be recognized that other services can be provided in accordance with the present invention in a similar manner of distributing the computational aspects of each service to a compute element and the managerial aspects to a Control Authority. In this manner, the number of flows can be scaled by increasing the number of processing pipelines without departing from the scope of the present invention. These services include Web switching, QOS and bandwidth management.

In addition, it should be recognized that the system of the present invention can be managed using the management system defined in U.S. patent application Ser. No. 09/900, 482, filed Jul. 6, 2001 by Elango Gannesan, Taqi Hasan, Allen B. Rochkind and Sagar Golla, entitled NETWORK MANAGEMENT SYSTEM and U.S. patent application Ser. No. 10/190,036, filed Jul. 5, 2002 by Taqi Hasan and Elango Gannesan, entitled INTEGRATED RULE NETWORK MANAGEMENT SYSTEM. In that system, a virtual management system for a data center, and includes a management topology presenting devices, facilities, subscribers and services as objects to an administrative interface; and a configuration manager implementing changes to objects in the topology responsive to configuration input from an administrator via the administrative interface. A graphical user interface designed to work in a platform independent environment may be used to manage the system.

II. Multi-Processor Hardware Platform

A. Multi-Processing Unit

Figure 16:
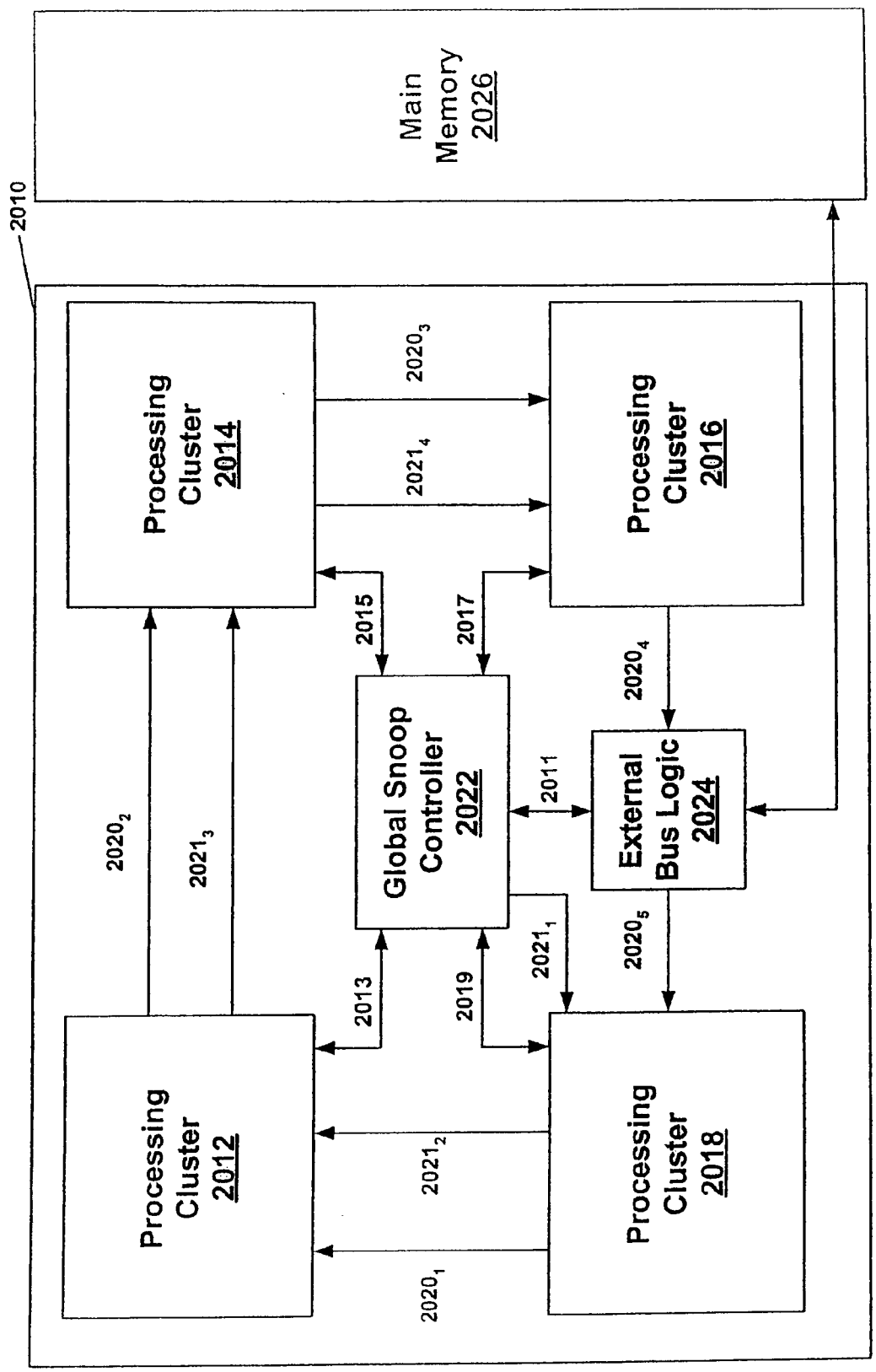
FIG. 16 illustrates a multi-processor unit in accordance with the present invention.

FIG. 16 illustrates a multi-processor unit (MPU) in accordance with the present invention. In one embodiment, each processing element 100 appearing in FIG. 4 above is MPU 2010. MPU 2010 includes processing clusters 2012, 2014, 2016, and 2018, which perform application processing for MPU 2010. Each processing cluster 2012, 2014, 2016, and 2018 includes at least one compute engine (not shown) coupled to a set of cache memory (not shown). The compute engine processes applications, and the cache memory maintains data locally for use during those applications. MPU 2010 assigns applications to each processing cluster and makes the necessary data available in the associated cache memory.

MPU 2010 overcomes drawbacks of traditional multi-processor systems. MPU 2010 assigns tasks to clusters based on the applications they perform. This allows MPU 2010 to utilize engines specifically designed to perform their assigned tasks. MPU 2010 also reduces time consuming accesses to main memory 2026 by passing cache data between clusters 2012, 2014, 2016, and 2018. The local proximity of the data, as well as the application specialization, expedites processing.

Global snoop controller 2022 manages data sharing between clusters 2012, 2014, 2016, and 2018 and main memory 2026. Clusters 2012, 2014, 2016, and 2018 are each coupled to provide memory requests to global snoop controller 2022 via point-to-point connections. Global snoop controller 2022 issues snoop instructions to clusters 2012, 2014, 2016, and 2018 on a snoop ring.

In one embodiment, as shown in FIG. 16, clusters 2012, 2014, 2016, and 2018 are coupled to global snoop controller 2022 via point-to-point connections 2013, 2015, 2017, and 2019, respectively. A snoop ring includes coupling segments $2021_{1-4}$, which will be collectively referred to as snoop ring 2021. Segment $2021_1$ couples global snoop controller 2022 to cluster 2018. Segment $2021_2$ couples cluster 2018 to cluster 2012. Segment $2021_3$ couples cluster 2012 to cluster 2014. Segment $2021_4$ couples cluster 2014 to cluster 2016. The interaction between global snoop controller 2022 and clusters 2012, 2014, 2016, and 2018 will be described below in greater detail.

Global snoop controller 2022 initiates accesses to main memory 2026 through external bus logic (EBL) 2024, which couples snoop controller 2022 and clusters 2012, 2014, 2016, and 2018 to main memory 2026. EBL 2024 transfers data between main memory 2026 and clusters 2012, 2014, 2016, and 2018 at the direction of global snoop controller 2022. EBL 2024 is coupled to receive memory transfer instructions from global snoop controller 2022 over point-to-point link 2011.

EBL 2024 and processing clusters 2012, 2014, 2016, and 2018 exchange data with each other over a logical data ring. In one embodiment of the invention, MPU 2010 implements the data ring through a set of point-to-point connections. The data ring is schematically represented in FIG. 16 as coupling segments $2020_{1-5}$ and will be referred to as data ring 2020. Segment $2020_1$ couples cluster 2018 to cluster 2012. Segment $2020_2$ couples cluster 2012 to cluster 2014. Segment $2020_3$ couples cluster 2014 to cluster 2016. Segment $2020_4$ couples cluster 2016 to EBL 2024, and segment $2020_5$ couples EBL 2024 to cluster 2018. Further details regarding the operation of data ring 2020 and EBL 2024 appear below.

Figure 17:
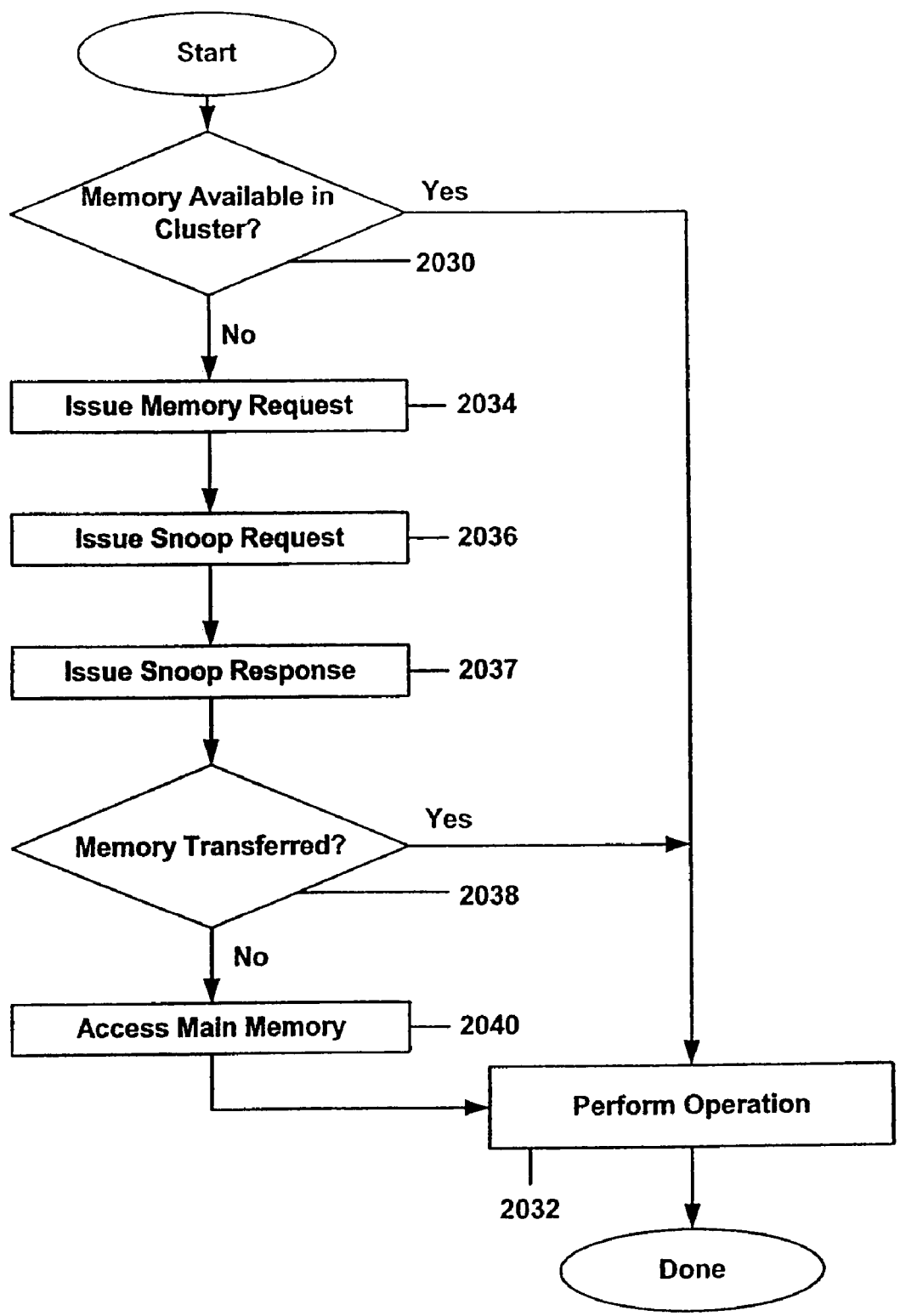
FIG. 17 illustrates a process employed by the multi-processor unit in FIG. 16 to exchange data in accordance with the present invention.

FIG. 17 illustrates a process employed by MPU 2010 to transfer data and memory location ownership in one embodiment of the present invention. For purposes of illustration, FIG. 17 demonstrates the process with cluster 2012—the same process is applicable to clusters 2014, 2016, and 2018.

Processing cluster 2012 determines whether a memory location for an application operation is mapped into the cache memory in cluster 2012 (step 2030). If cluster 2012 has the location, then cluster 2012 performs the operation (step 2032). Otherwise, cluster 2012 issues a request for the necessary memory location to global snoop controller 2022 (step 2034). In one embodiment, cluster 2012 issues the request via point-to-point connection 2013. As part of the request, cluster 2012 forwards a request descriptor that instructs snoop controller 2022 and aids in tracking a response to the request.

Global snoop controller 2022 responds to the memory request by issuing a snoop request to clusters 2014, 2016, and 2018 (step 2036). The snoop request instructs each cluster to transfer either ownership of the requested memory location or the location's content to cluster 2012. Clusters 2014, 2016, and 2018 each respond to the snoop request by performing the requested action or indicating it does not possess the requested location (step 2037). In one embodiment, global snoop controller 2022 issues the request via snoop ring 2021, and clusters 2014, 2016, and 2018 perform requested ownership and data transfers via snoop ring 2021. In addition to responding on snoop ring 2021, clusters acknowledge servicing the snoop request through their point-to-point links with snoop controller 2022. Snoop request processing will be explained in greater detail below.

If one of the snooped clusters possesses the requested memory, the snooped cluster forwards the memory to cluster 2012 using data ring 2020 (step 2037). In one embodiment, no data is transferred, but the requested memory location's ownership is transferred to cluster 2012. Data and memory location transfers between clusters will be explained in greater detail below.

Global snoop controller 2022 analyzes the clusters' snoop responses to determine whether the snooped clusters owned and transferred the desired memory (step 2038). If cluster 2012 obtained access to the requested memory location in response to the snoop request, cluster 2012 performs the application operations (step 2032). Otherwise, global snoop controller 2022 instructs EBL 2024 to carry out an access to main memory 2026 (step 2040). EBL 2024 transfers data between cluster 2012 and main memory 2026 on data ring 2020. Cluster 2012 performs the application operation once the main memory access is completed (step 2032).

B. Processing Cluster

In one embodiment of the present invention, a processing cluster includes a single compute engine for performing applications. In alternate embodiments, a processing cluster employs multiple compute engines. A processing cluster in one embodiment of the present invention also includes a set of cache memory for expediting application processing. Embodiments including these features are described below.

1. Processing Cluster—Single Compute Engine

Figure 18:
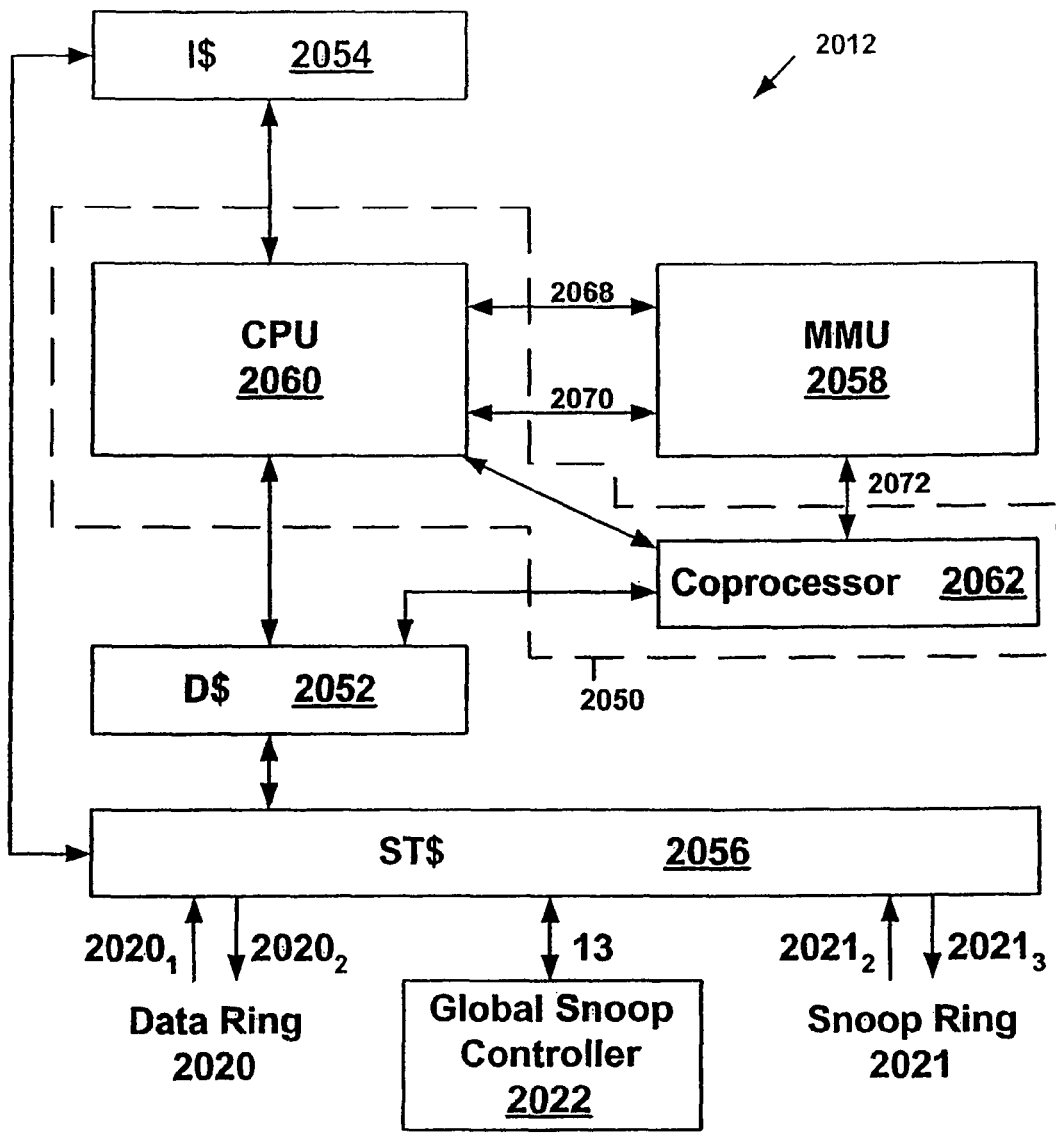
FIG. 18 shows a processing cluster employed in one embodiment of the multi-processor unit in FIG. 16.

FIG. 18 shows one embodiment of a processing cluster in accordance with the present invention. For purposes of illustration, FIG. 18 shows processing cluster 2012. In some embodiments of the present invention, the circuitry shown in FIG. 18 is also employed in clusters 2014, 2016, and 2018.

Cluster 2012 includes compute engine 2050 coupled to first tier data cache 2052, first tier instruction cache 2054, second tier cache 2056, and memory management unit (MMU) 2058. Both instruction cache 2054 and data cache 2052 are coupled to second tier cache 2056, which is coupled to snoop controller 2022, snoop ring 2021, and data ring 2020. Compute engine 2050 manages a queue of application requests, each requiring an application to be performed on a set of data.

When compute engine 2050 requires access to a block of memory, compute engine 2050 converts a virtual address for the block of memory into a physical address. In one embodiment of the present invention, compute engine 2050 internally maintains a limited translation buffer (not shown). The internal translation buffer performs conversions within compute engine 2050 for a limited number of virtual memory addresses.

Compute engine 2050 employs MMU 2058 for virtual memory address conversions not supported by the internal translation buffer. In one embodiment, compute engine 2050 has separate conversion request interfaces coupled to MMU 2058 for data accesses and instruction accesses. As shown in FIG. 18, compute engine 2050 employs request interfaces 2070 and 2072 for data accesses and request interface 2068 for instruction access.

In response to a conversion request, MMU 2058 provides either a physical address and memory block size or a failed access response. The failed access responses include: 1) no corresponding physical address exists; 2) only read access is allowed and compute engine 2050 is attempting to write; or 3) access is denied.

After obtaining a physical address, compute engine 2050 provides the address to either data cache 2052 or instruction cache 2054—data accesses go to data cache 2052, and instruction accesses go to instruction cache 2054. In one embodiment, first tier caches 2052 and 2054 are 4K direct-mapped caches, with data cache 2052 being write-through to second tier cache 2056. In an alternate embodiment, caches 2052 and 2054 are 8K 2-way set associative caches.

A first tier cache (2052 or 2054) addressed by compute engine 2050 determines whether the addressed location resides in the addressed first tier cache. If so, the cache allows compute engine 2050 to perform the requested memory access. Otherwise, the first tier cache forwards the memory access of compute engine 2050 to second tier cache 2056. In one embodiment second tier cache 2056 is a 64K 4-way set associative cache.

Second tier cache 2056 makes the same determination as the first tier cache. If second tier cache 2056 contains the requested memory location, compute engine 2050 exchanges information with second tier cache 2056 through first tier cache 2052 or 2054. Instructions are exchanged through instruction cache 2054, and data is exchanged through data cache 2052. Otherwise, second tier cache 2056 places a memory request to global snoop controller 2022, which performs a memory retrieval process. In one embodiment, the memory retrieval process is the process described above with reference to FIG. 17. Greater detail and embodiments addressing memory transfers will be described below.

Cache 2056 communicates with snoop controller 2022 via point-to-point link 2013 and snoop ring interfaces 2021₁ and 2021₃, as described in FIG. 16. Cache 2056 uses link 2013 to request memory accesses outside cluster 2012. Second tier cache 2056 receives and forwards snoop requests on snoop ring interfaces 2021₂ and 2021₃. Cache 2056 uses data ring interface segments 2020₁ and 2020₂ for exchanging data on data ring 2020, as described above with reference to FIGS. 16 and 17.

In one embodiment, compute engine 2050 contains CPU 2060 coupled to coprocessor 2062. CPU 2060 is coupled to MMU 2058, data cache 2052, and instruction cache 2054. Instruction cache 2054 and data cache 2052 couple CPU 2060 to second tier cache 2056. Coprocessor 2062 is coupled to data cache 2052 and MMU 2058. First tier data cache 2052 couples coprocessor 2062 to second tier cache 2056.

Coprocessor 2062 helps MPU 2010 overcome processor utilization drawbacks associated with traditional multi-processing systems. Coprocessor 2062 includes application specific processing engines designed to execute applications assigned to compute engine 2050. This allows CPU 2060 to offload application processing to coprocessor 2062, so CPU 2060 can effectively manage the queue of assigned application.

In operation, CPU 2060 instructs coprocessor 2062 to perform an application from the application queue. Coprocessor 2062 uses its interfaces to MMU 2058 and data cache 2052 to obtain access to the memory necessary for performing the application. Both CPU 2060 and coprocessor 2062 perform memory accesses as described above for compute engine 2050, except that coprocessor 2062 doesn't perform instruction fetches.

In one embodiment, CPU 2060 and coprocessor 2062 each include limited internal translation buffers for converting virtual memory addresses to physical addresses. In one such embodiment, CPU 2060 includes 2 translation buffer entries for instruction accesses and 3 translation buffer entries for data accesses. In one embodiment, coprocessor 2062 includes 4 translation buffer entries.

Coprocessor 2062 informs CPU 2060 once an application is complete. CPU 2060 then removes the application from its queue and instructs a new compute engine to perform the next application—greater details on application management will be provided below.

2. Processing Cluster—Multiple Compute Engines

Figure 19:
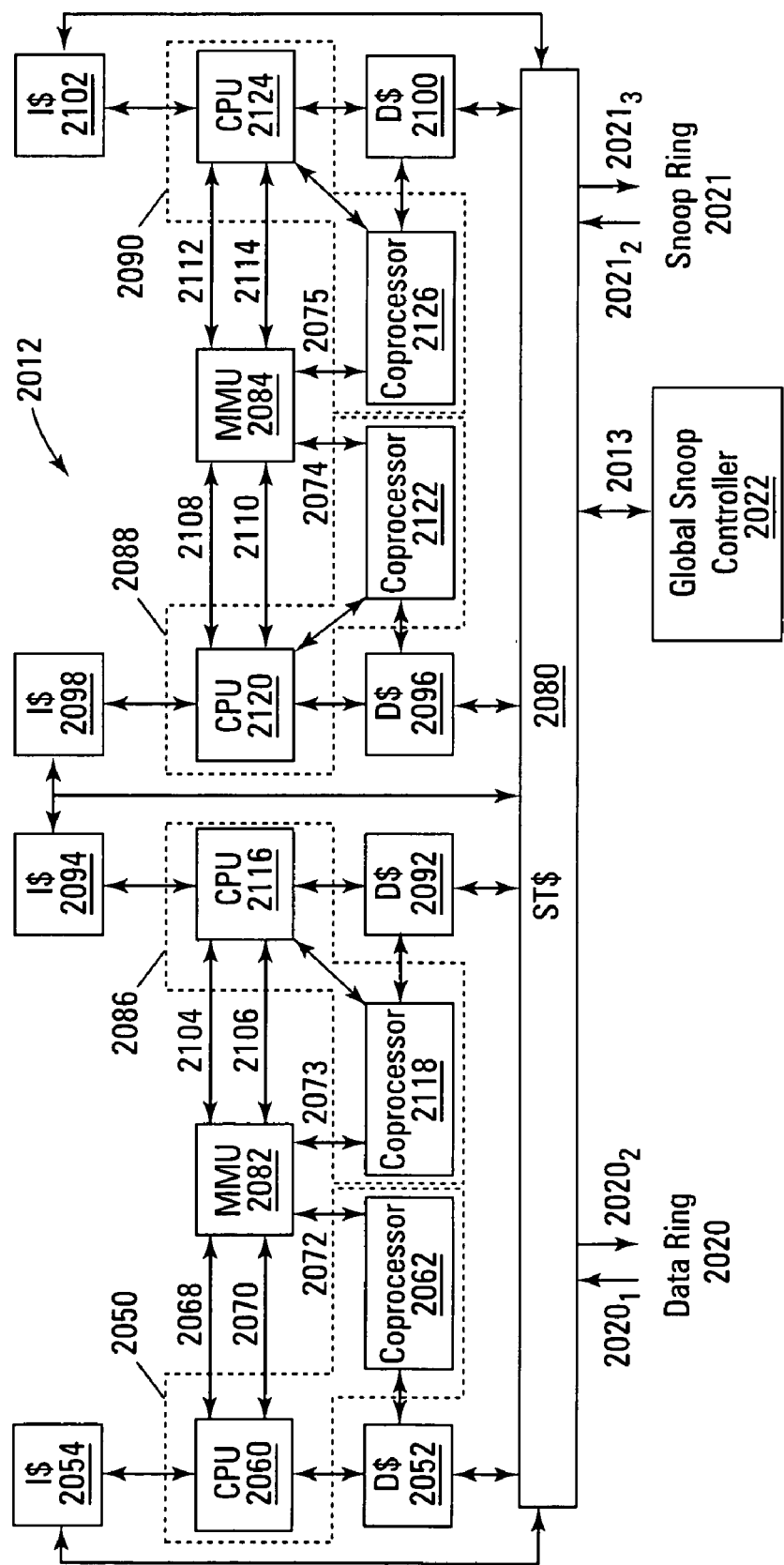
FIG. 19 shows a processing cluster employed in another embodiment of the multi-processor unit in FIG. 16.

FIG. 19 illustrates an alternate embodiment of processing cluster 2012 in accordance with the present invention. In FIG. 19, cluster 2012 includes multiple compute engines operating the same as above-described compute engine 2050. Cluster 2012 includes compute engine 2050 coupled to data cache 2052, instruction cache 2054, and MMU 2082. Compute engine 2050 includes CPU 2060 and coprocessor 2062 having the same coupling and operation described above in FIG. 18. In fact, all elements appearing in FIG. 19 with the same numbering as in FIG. 18 have the same operation as described in FIG. 18.

MMU 2082 and MMU 2084 operate the same as MMU 2058 in FIG. 18, except MMU 2082 and MMU 2084 each support two compute engines. In an alternate embodiment, cluster 2012 includes 4 MMUs, each coupled to a single compute engine. Second tier cache 2080 operates the same as second tier cache 2056 in FIG. 18, except second tier cache 2080 is coupled to and supports data caches 2052, 2092, 2096, and 2100 and instruction caches 2054, 2094, 2098, and 2102. Data caches 2052, 2092, 2096, and 2100 in FIG. 19 operate the same as data cache 2052 in FIG. 18, and instruction caches 2054, 2094, 2098, and 2102 operate the same as instruction cache 2054 in FIG. 18. Compute engines 2050, 2086, 2088, and 2090 operate the same as compute engine 2050 in FIG. 18.

Each compute engine (2050, 2086, 2088, and 2090) also includes a CPU (2060, 2116, 2120, and 2124, respectively) and a coprocessor (2062, 2118, 2122, and 2126, respectively) coupled and operating the same as described for CPU 2060 and coprocessor 2062 in FIG. 18. Each CPU (2060, 2116, 2120, and 2124) is coupled to a data cache (2052, 2092, 2096, and 2100, respectively), instruction cache (2054, 2094, 2098, and 2102, respectively), and MMU (2082 and 2084). Each coprocessor (2062, 2118, 2122, and 2126, respectively) is coupled to a data cache (2052, 2092, 2096, and 2100, respectively) and MMU (2082 and 2084). Each CPU (2060, 2116, 2120, and 2124) communicates with the MMU (2082 and 2084) via separate conversion request interfaces for data (2070, 20106, 2110, and 2114, respectively) and instructions (2068, 20104, 20108, and 20112, respectively) accesses. Each coprocessor (2062, 20118, 20122, and 20126) communicates with the MMU (2082 and 2084) via a conversion request interface (2072, 2073, 2074, and 2075) for data accesses.

In one embodiment, each coprocessor (2062, 2118, 2122, and 2126) includes four internal translation buffers, and each CPU (2060, 2116, 2120, and 2124) includes 5 internal translation buffers, as described above with reference to FIG. 18. In one such embodiment, translation buffers in coprocessors coupled to a common MMU contain the same address conversions.

In supporting two compute engines, MMU 2082 and MMU 2084 each provide arbitration logic to chose between requesting compute engines. In one embodiment, MMU 2082 and MMU 2084 each arbitrate by servicing competing compute engines on an alternating basis when competing address translation requests are made. For example, in such an embodiment, MMU 2082 first services a request from compute engine 2050 and then services a request from compute engine 2086, when simultaneous translation requests are pending.

3. Processing Cluster Memory Management

The following describes a memory management system for MPU 2010 in one embodiment of the present invention. In this embodiment, MPU 2010 includes the circuitry described above with reference to FIG. 19.

a. Data Ring

Data ring 2020 facilitates the exchange of data and instructions between clusters 2012, 2014, 2016, and 2018 and EBL 2024. Data ring 2020 carries packets with both header information and a payload. The payload contains either data or instructions from a requested memory location. In operation, either a cluster or EBL 2024 places a packet on a segment of data ring 2020. For example, cluster 2018 drives data ring segment 2020, into cluster 2012. The header information identifies the intended target for the packet. The EBL and each cluster pass the packet along data ring 2020 until the packet reaches the intended target. When a packet reaches the intended target (EBL 2024 or cluster 2012, 2014, 2016, or 2018) the packet is not transferred again.

In one embodiment of the present invention, data ring 2020 includes the following header signals: 1) Validity—indicating whether the information on data ring 2020 is valid; 2) Cluster—identifying the cluster that issues the memory request leading to the data ring transfer; 3) Memory Request—identifying the memory request leading to the data ring transfer; 4) MESI—providing ownership status; and 5) Transfer Done—indicating whether the data ring transfer is the last in a connected series of transfers. In addition to the header, data ring 2020 includes a payload. In one embodiment, the payload carries 32 bytes. In alternate embodiments of the present invention, different fields can be employed on the data ring.

In some instances, a cluster needs to transfer more bytes than a single payload field can store. For example, second tier cache 2080 typically transfers an entire 64 byte cache line. A transfer of this size is made using two transfers on data ring 2020—each carrying a 32 byte payload. By using the header information, multiple data ring payload transfers can be concatenated to create a single payload in excess of 32 bytes. In the first transfer, the Transfer Done field is set to indicate the transfer is not done. In the second transfer, the Transfer Done field indicates the transfer is done.

The MESI field provides status about the ownership of the memory location containing the payload. A device initiating a data ring transfer sets the MESI field, along with the other header information. The MESI field has the following four states: 1) Modified; 2) Exclusive; 3) Shared; and 4) Invalid. A device sets the MESI field to Exclusive if the device possesses sole ownership of the payload data prior to transfer on data ring 2020. A device sets the MESI field to Modified if the device modifies the payload data prior to transfer on data ring 2020—only an Exclusive or Modified owner can modify data. A device sets the MESI field to Shared if the data being transferred onto data ring 2020 currently has a Shared or Exclusive setting in the MESI field and another entity requests ownership of the data. A device sets the MESI field to Invalid if the data to be transferred on data ring 2020 is invalid. Examples of MESI field setting will be provided below.

b. First Tier Cache Memory

Figure 20A:
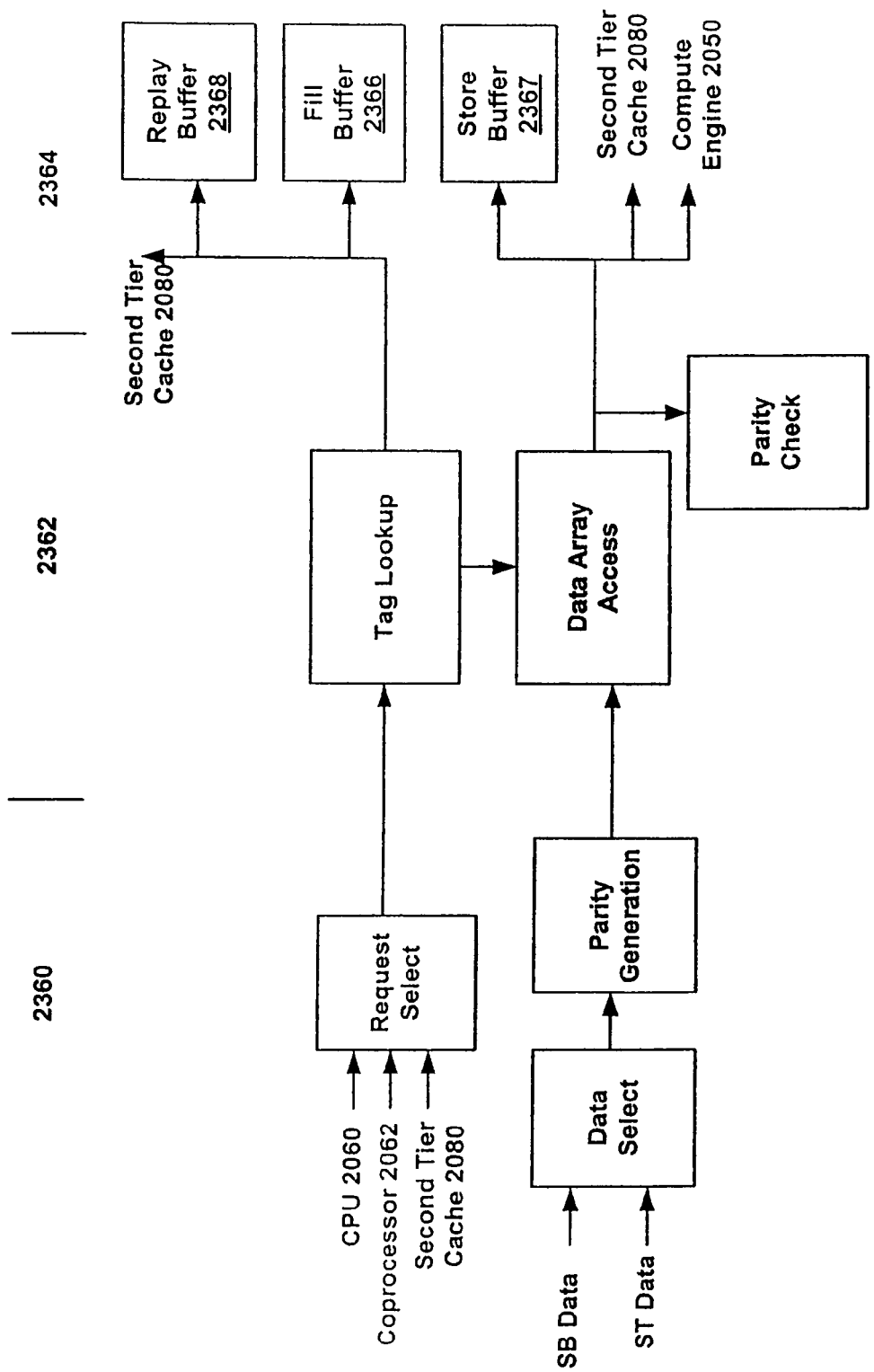
FIG. 20a illustrates a first tier data cache pipeline in one embodiment of the present invention.

FIG. 20a illustrates a pipeline of operations performed by first tier data caches 2052, 2092, 2096, 2100, in one embodiment of the present invention. For ease of reference, FIG. 20 is explained with reference to data cache 2052, although the implementation shown in FIG. 20 is applicable to all first tier data caches.

In stage 2360, cache 2052 determines whether to select a memory access request from CPU 2060, coprocessor 2062, or second tier cache 2080. In one embodiment, cache 2052 gives cache 2080 the highest priority and toggles between selecting the CPU and coprocessor. As will be explained below, second tier cache 2080 accesses first tier cache 2052 to provide fill data when cache 2052 has a miss.

In stage 2362, cache 2052 determines whether cache 2052 contains the memory location for the requested access. In one embodiment, cache 2052 performs a tag lookup using bits from the memory address of the CPU, coprocessor, or second tier cache. If cache 2052 detects a memory location match, the cache's data array is also accessed in stage 2362 and the requested operation is performed.

In the case of a load operation from compute engine 2050, cache 2052 supplies the requested data from the cache's data array to compute engine 2050. In the case of a store operation, cache 2052 stores data supplied by compute engine 2050 in the cache's data array at the specified memory location. In one embodiment of the present invention, cache 2052 is a write-through cache that transfers all stores through to second tier cache 2080. The store operation only writes data into cache 2052 after a memory location match—cache 2052 is not filled after a miss. In one such embodiment, cache 2052 is relieved of maintaining cache line ownership.

In one embodiment of the present invention, cache 2052 implements stores using a read-modify-write protocol. In such an embodiment, cache 2052 responds to store operations by loading the entire data array cache line corresponding to the addressed location into store buffer 2367. Cache 2052 modifies the data in store buffer 2367 with data from the store instruction issued by compute engine 2050. Cache 2052 then stores the modified cache line in the data array when cache 2052 has a free cycle. If a free cycle doesn't occur before the next write to store buffer 2367, cache 2052 executes the store without using a free cycle.

In an alternate embodiment, the store buffer is smaller than an entire cache line, so cache 2052 only loads a portion of the cache line into the store buffer. For example, in one embodiment cache 2052 has a 64 byte cache line and a 16 byte store buffer. In load operations, data bypasses store buffer 2367.

Cache 2052 also provides parity generation and checking. When cache 2052 writes the data array, a selection is made in stage 2360 between using store buffer data (SB Data) and second tier cache fill data (ST Data). Cache 2052 also performs parity generation on the selected data in stage 2360 and writes the data array in stage 2362. Cache 2052 also parity checks data supplied from the data array in stage 2362.

If cache 2052 does not detect an address match in stage 2362, then cache 2052 issues a memory request to second tier cache 2080. Cache 2052 also issues a memory request to cache 2080 if cache 2052 recognizes a memory operation as non-cacheable.

Other memory related operations issued by compute engine 2050 include pre-fetch and store-create. A pre-fetch operation calls for cache 2052 to ensure that an identified cache line is mapped into the data array of cache 2052. Cache 2052 operates the same as a load operation of a full cache line, except no data is returned to compute engine 2050. If cache 2052 detects an address match in stage 2362 for a pre-fetch operation, no further processing is required. If an address miss is detected, cache 2052 forwards the pre-fetch request to cache 2080. Cache 2052 loads any data returned by cache 2080 into the cache 2052 data array.

A store-create operation calls for cache 2052 to ensure that cache 2052 is the sole owner of an identified cache line, without regard for whether the cache line contains valid data. In one embodiment, a predetermined pattern of data is written into the entire cache line. The predetermined pattern is repeated throughout the entire cache line. Compute engine 2050 issues a store-create command as part of a store operand for storing data into an entire cache line. All store-create requests are forwarded to cache 2080, regardless of whether an address match occurs.

In one embodiment, cache 2052 issues memory requests to cache 2080 over a point-to-point link, as shown in FIGS. 18 and 19. This link allows cache 2080 to receive the request and associated data and respond accordingly with data and control information. In one such embodiment, cache 2052 provides cache 2080 with a memory request that includes the following fields: 1) Validity—indicating whether the request is valid; 2) Address—identifying the memory location requested; and 3) Opcode—identifying the memory access operation requested.

After receiving the memory request, cache 2080 generates the following additional fields: 4) Dependency—identifying memory access operations that must be performed before the requested memory access; 5) Age—indicating the time period the memory request has been pending; and 6) Sleep—indicating whether the memory request has been placed in sleep mode, preventing the memory request from being reissued. Sleep mode will be explained in further detail below. Cache 2080 sets the Dependency field in response to the Opcode field, which identifies existing dependencies.

In one embodiment of the present invention, cache 2052 includes fill buffer 2366 and replay buffer 2368. Fill buffer 2366 maintains a list of memory locations from requests transferred to cache 2080. The listed locations correspond to requests calling for loads. Cache 2052 employs fill buffer 2366 to match incoming fill data from second tier cache 2080 with corresponding load commands. The corresponding load command informs cache 2052 whether the incoming data is a cacheable load for storage in the cache 2052 data array or a non-cacheable load for direct transfer to computer engine 2050.

As an additional benefit, fill buffer 2366 enables cache 2052 to avoid data corruption from an overlapping load and store to the same memory location. If compute engine 2050 issues a store to a memory location listed in fill buffer 2366, cache 2052 will not write data returned by cache 2080 for the memory location to the data array. Cache 2052 removes a memory location from fill buffer 2366 after cache 2080 services the associated load. In one embodiment, fill buffer 2366 contains 5 entries.

Replay buffer 2368 assists cache 2052 in transferring data from cache 2080 to compute engine 2050. Replay buffer 368 maintains a list of load requests forwarded to cache 2080. Cache 2080 responds to a load request by providing an entire cache line—up to 64 bytes in one embodiment. When a load request is listed in replay buffer 2368, cache 2052 extracts the requested load memory out of the returned cache line for compute engine 2050. This relieves cache 2052 from retrieving the desired memory from the data array after a fill completes.

Cache 2052 also uses replay buffer 2368 to perform any operations necessary before transferring the extracted data back to compute engine 2050. For example, cache 2080 returns an entire cache line of data, but in some instances compute engine 2050 only requests a portion of the cache line. Replay buffer 2368 alerts cache 2052, so cache 2052 can realign the extracted data to appear in the data path byte positions desired by compute engine 2050. The desired data operations, such as realignments and rotations, are stored in replay buffer 2368 along with their corresponding requests.

Figure 20B:
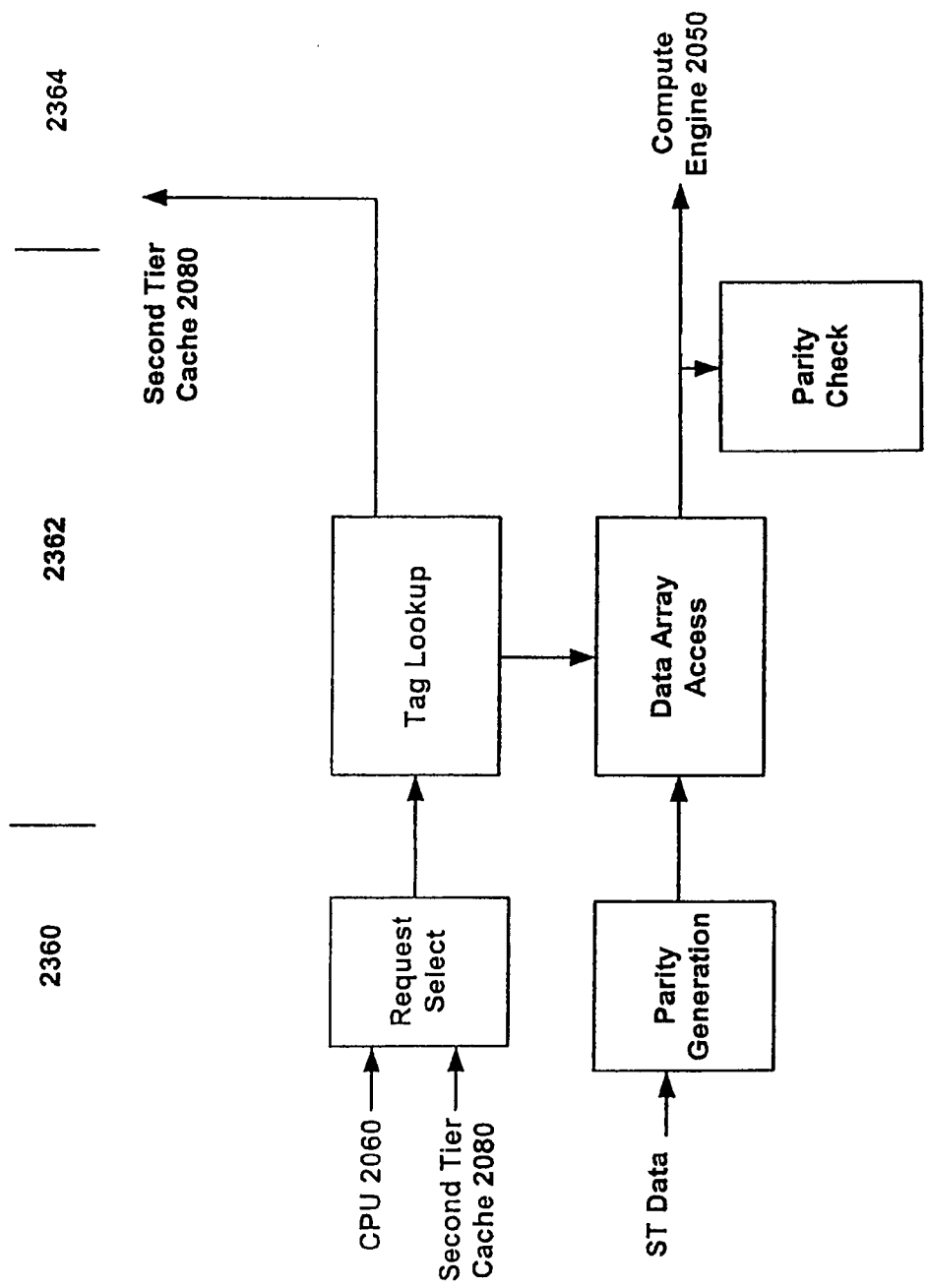
FIG. 20b illustrates a first tier instruction cache pipeline in one embodiment of the present invention.

FIG. 20b shows a pipeline of operations for first tier instructions caches 2054, 2094, 2098, and 2102 in one embodiment of the present invention. The pipeline shown in FIG. 20b is similar to the pipeline shown in FIG. 20a, with the following exceptions. A coprocessor does not access a first tier instruction cache, so the cache only needs to select between a CPU and second tier cache in stage 2360. A CPU does not write to an instruction cache, so only second tier data (ST Data) is written into the cache's data array in step 2362. An instruction cache does not include either a fill buffer, replay buffer, or store buffer.

c. Second Tier Cache Memory

Figure 21:
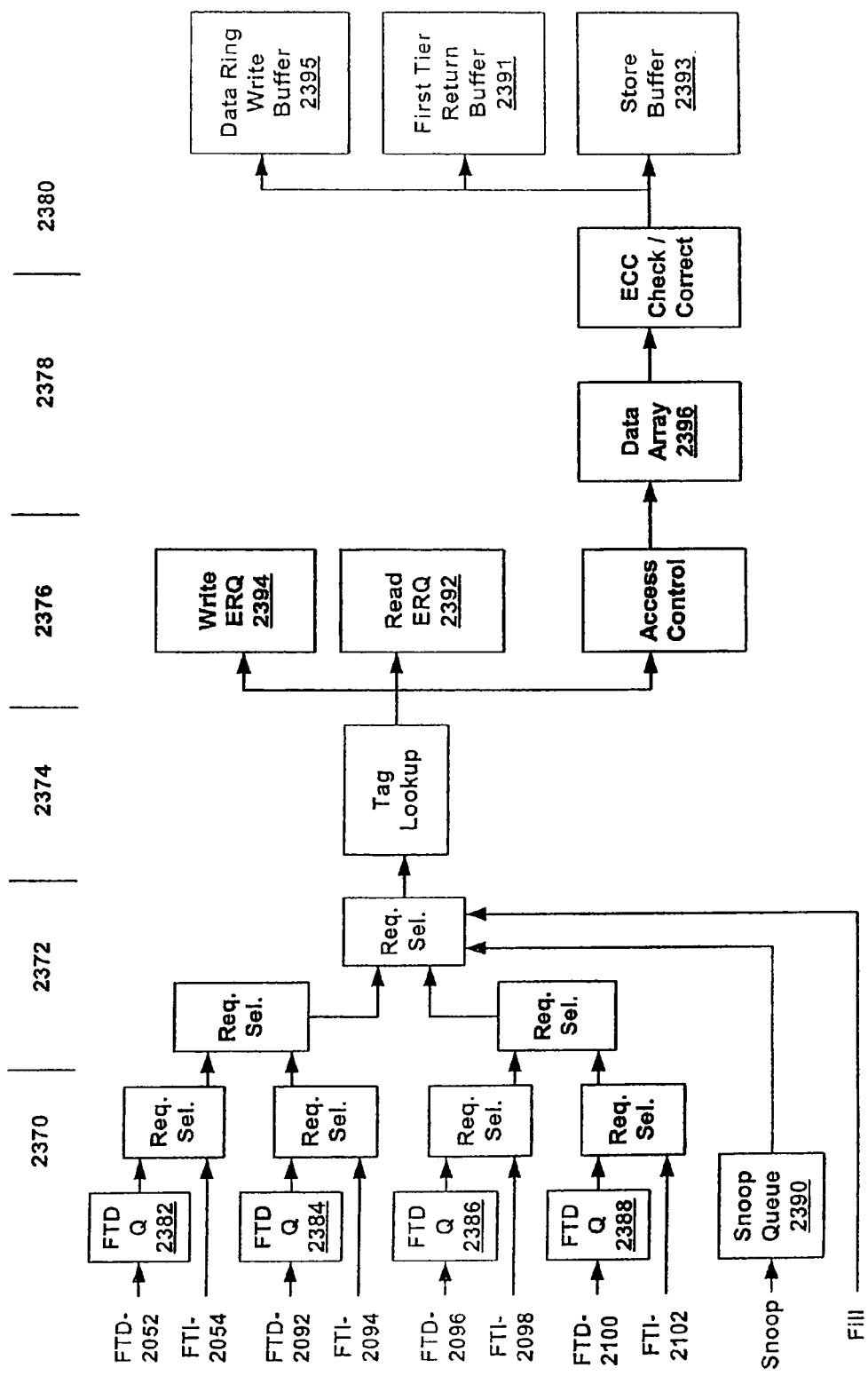
FIG. 21 illustrates a second tier cache pipeline in one embodiment of the present invention.

FIG. 21 illustrates a pipeline of operations implemented by second tier cache 2080 in one embodiment of the present invention. In stage 2370, cache 2080 accepts memory requests. In one embodiment, cache 2080 is coupled to receive memory requests from external sources (Fill), global snoop controller 2022 (Snoop), first tier data caches 2052, 2092, 2096, and 2100 (FTD-2052; FTD-2092; FTD-2096; FTD-2100), and first tier instruction caches 2054, 2094, 2098, and 2102 (FTI-2054; FTI-2094; FTI-2098; FTI-2102). In one embodiment, external sources include external bus logic 2024 and other clusters seeking to drive data on data ring 20.

As shown in stage 2370, cache 2080 includes memory request queues 2382, 2384, 2386, and 2388 for receiving and maintaining memory requests from data caches 2054, 2052, 2092, 2096, and 2100, respectively. In one embodiment, memory request queues 2382, 2384, 2386, and 2388 hold up to 8 memory requests. Each queue entry contains the above-described memory request descriptor, including the Validity, Address, Opcode, Dependency, Age, and Sleep fields. If a first tier data cache attempts to make a request when its associated request queue is full, cache 2080 signals the first tier cache that the request cannot be accepted. In one embodiment, the first tier cache responds by submitting the request later. In an alternate embodiment, the first tier cache kills the requested memory operation.

Cache 2080 also includes snoop queue 2390 for receiving and maintaining requests from snoop ring 2021. Upon receiving a snoop request, cache 2080 buffers the request in queue 2390 and forwards the request to the next cluster on snoop ring 2021. In one embodiment of the present invention, global snoop controller 2022 issues the following types of snoop requests: 1) Own—instructing a cluster to transfer exclusive ownership of a memory location and transfer its content to another cluster after performing any necessary coherency updates; 2) Share—instructing a cluster to transfer shared ownership of a memory location and transfer its contents to another cluster after performing any necessary coherency updates; and 3) Kill—instructing a cluster to release ownership of a memory location without performing any data transfers or coherency updates.

In one such embodiment, snoop requests include descriptors with the following fields: 1) Validity—indicating whether the snoop request is valid; 2) Cluster—identifying the cluster that issued the memory request leading to the snoop request; 3) Memory Request—identifying the memory request leading to the snoop request; 4) ID—an identifier global snoop controller 2022 assigns to the snoop request; 5) Address—identifying the memory location requested; and 5) Opcode—identifying the type of snoop request.

Although not shown, cache 2080 includes receive data buffers, in addition to the request queues shown in stage 2370. The receive data buffers hold data passed from cache 2052 for use in requested memory operations, such as stores. In one embodiment, cache 2080 does not contain the receive data buffers for data received from data ring 2020 along with Fill requests, since Fill requests are serviced with the highest priority.

Cache 2080 includes a scheduler for assigning priority to the above-described memory requests. In stage 2370, the scheduler begins the prioritization process by selecting requests that originate from snoop queue 390 and each of compute engines 2050, 2086, 2088, and 2090, if any exist. For snoop request queue 2390, the scheduler selects the first request with a Validity field showing the request is valid. In one embodiment, the scheduler also selects an entry before it remains in queue 2390 for a predetermined period of time.

For each compute engine, the scheduler gives first tier instruction cache requests (FTI) priority over first tier data cache requests (FTD). In each data cache request queue (2382, 2384, 2386, and 2388), the scheduler assigns priority to memory requests based on predetermined criteria. In one embodiment, the predetermined criteria are programmable. A user can elect to have cache 2080 assign priority based on a request's Opcode field or the age of the request. The scheduler employs the above-described descriptors to make these priority determinations.

For purposes of illustration, the scheduler's programmable prioritization is described with reference to queue 2382. The same prioritization process is performed for queues 2384, 2386, and 2388. In one embodiment, priority is given to load requests. The scheduler in cache 2080 reviews the Opcode fields of the request descriptors in queue 2382 to identify all load operations. In an alternate embodiment, store operations are favored. The scheduler also identifies these operations by employing the Opcode field.

In yet another embodiment, cache 2080 gives priority to the oldest requests in queue 2382. The scheduler in cache 2080 accesses the Age field in the request descriptors in queue 2382 to determine the oldest memory request. Alternative embodiments also provide for giving priority to the newest request. In some embodiments of the present invention, prioritization criteria are combined. For example, cache 2080 gives priority to load operations and a higher priority to older load operations. Those of ordinary skill in the art recognize that many priority criteria combinations are possible.

In stage 2372, the scheduler selects a single request from the following: 1) the selected first tier cache requests; 2) the selected snoop request from stage 2370; and 3) Fill. In one embodiment, the scheduler gives Fill the highest priority, followed by Snoop, which is followed by the first tier cache requests. In one embodiment, the scheduler in cache 2080 services the first tier cache requests on a round robin basis.

In stage 2374, cache 2080 determines whether it contains the memory location identified in the selected request from stage 2372. If the selected request is Fill from data ring 2020, cache 2080 uses information from the header on data ring 2020 to determine whether the cluster containing cache 2080 is the target cluster for the data ring packet. Cache 2080 examines the header's Cluster field to determine whether the Fill request corresponds to the cluster containing cache 2080.

If any request other than Fill is selected in stage 2372, cache 2080 uses the Address field from the corresponding request descriptor to perform a tag lookup operation. In the tag lookup operation, cache 2080 uses one set of bits in the request descriptor's Address field to identify a targeted set of ways. Cache 2080 then compares another set of bits in the Address field to tags for the selected ways. If a tag match occurs, the requested memory location is in the cache 2080 data array. Otherwise, there is a cache miss. In one such embodiment, cache 2080 is a 64K 4-way set associative cache with a cache line size of 64 bytes.

In one embodiment, as shown in FIG. 21, cache 2080 performs the tag lookup or Cluster field comparison prior to reading any data from the data array in cache 2080. This differs from a traditional multiple-way set associate cache. A traditional multiple-way cache reads a line of data from each addressed way at the same time a tag comparison is made. If there is not a match, the cache discards all retrieved data. If there is a match, the cache employs the retrieved data from the selected way. Simultaneously retrieving data from multiple ways consumes considerable amounts of both power and circuit area.

Conserving both power and circuit area are important considerations in manufacturing integrated circuits. In one embodiment, cache 2080 is formed on a single integrated circuit. In another embodiment, MPU 2010 is formed on a single integrated circuit. Performing the lookups before retrieving cache memory data makes cache 2080 more suitable for inclusion on a single integrated circuit.

In stage 2376, cache 2080 responds to the cache address comparison performed in stage 2374. Cache 2080 contains read external request queue ("read ERQ") 2392 and write external request queue ("write ERQ") 2394 for responding to hits and misses detected in stage 2374. Read ERQ 2392 and write ERQ 2394 allow cache 2080 to forward memory access requests to global snoop controller 2022 for further processing.

In one embodiment, read ERQ 2392 contains 16 entries, with 2 entries reserved for each compute engine. Read ERQ 2392 reserves entries, because excessive pre-fetch operations from one compute engine may otherwise consume the entire read ERQ. In one embodiment, write ERQ 2394 includes 4 entries. Write ERQ 2394 reserves one entry for requests that require global snoop controller 2022 to issue snoop requests on snoop ring 2021.

Processing First Tier Request Hits: Once cache 2080 detects an address match for a first tier load or store request, cache 2080 accesses internal data array 2396, which contains all the cached memory locations. The access results in data array 2396 outputting a cache line containing the addressed memory location in stage 2378. In one embodiment, the data array has a 64 byte cache line and is formed by 8 8K buffers, each having a data path 8 bytes wide. In such an embodiment, cache 2080 accesses a cache line by addressing the same offset address in each of the 8 buffers.

An Error Correcting Code ("ECC") check is performed on the retrieved cache line to check and correct any cache line errors. ECC is a well-known error detection and correction operation. The ECC operation overlaps between stages 2378 and 2380.

If the requested operation is a load, cache 2080 supplies the cache line contents to first tier return buffer 2391. First tier return buffer 2391 is coupled to provide the cache line to the requesting first tier cache. In one embodiment of the present invention, cache 2080 includes multiple first tier return buffers (not shown) for transferring data back to first tier caches. In one such embodiment, cache 2080 includes 4 first tier return buffers.

If the requested operation is a store, cache 2080 performs a read-modify-write operation. Cache 2080 supplies the addressed cache line to store buffer 2393 in stage 2380. Cache 2080 modifies the store buffer bytes addressed by the first tier memory request. Cache 2080 then forwards the contents of the store buffer to data array 2396. Cache 2080 makes this transfer once cache 2080 has an idle cycle or a predetermined period of time elapses. For stores, no data is returned to first tier data cache 2052.

Figure 22:
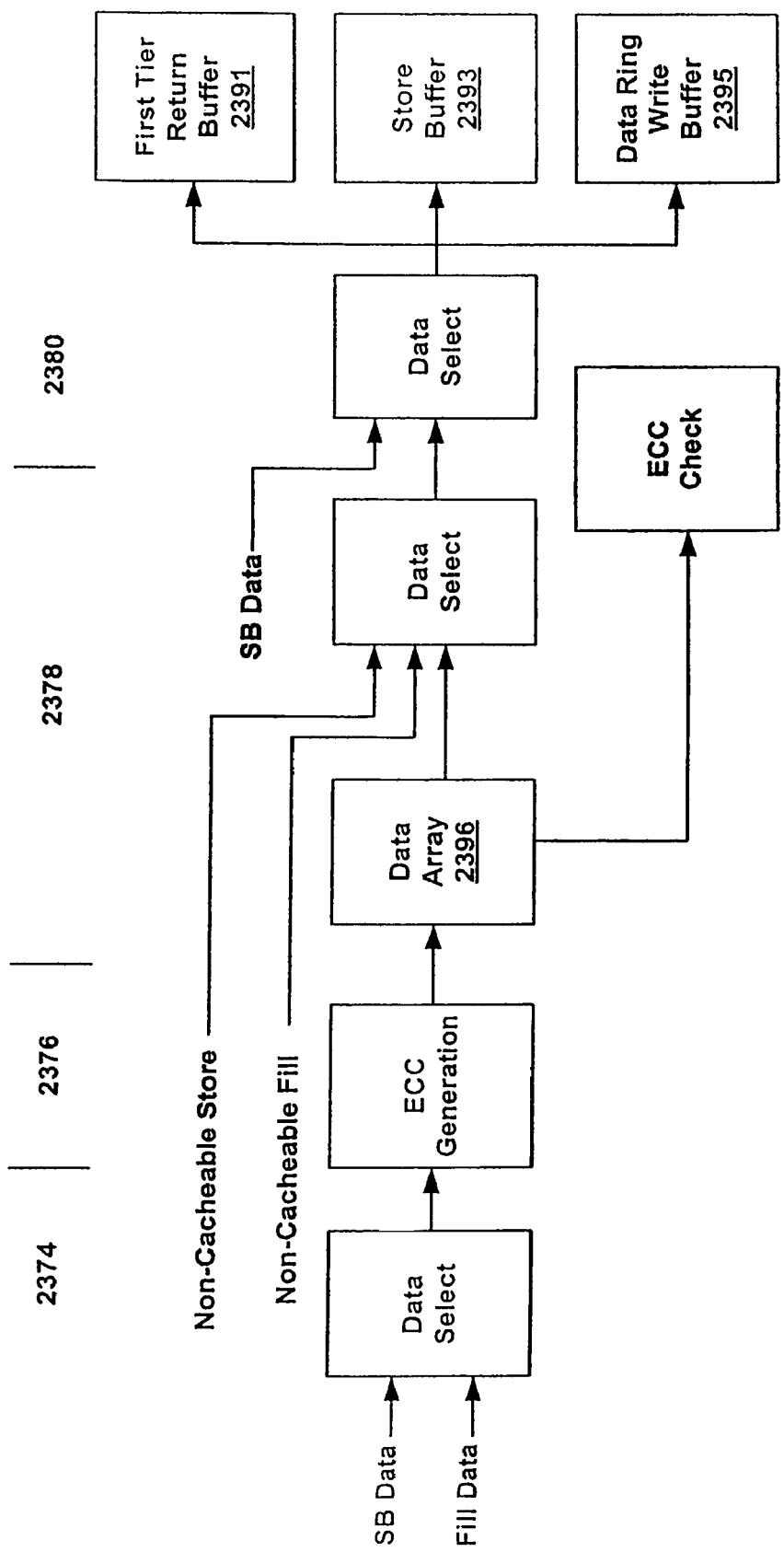
FIG. 22 illustrates further details of the second tier pipeline shown in FIG. 21.

FIG. 22 illustrates the pipeline stage operations employed by cache 2080 to transfer the cache line in a store buffer to data array 2396 and first tier return buffer 2393. This process occurs in parallel with the above-described pipeline stages. In stage 2374, cache 2080 selects between pending data array writes from store buffer 2393 and data ring 2020 via Fill requests. In one embodiment, Fill requests take priority. In one such embodiment, load accesses to data array 2396 have priority over writes from store buffer 2393. In alternate embodiments, different priorities are assigned.

In stage 2376, cache 2080 generates an ECC checksum for the data selected in stage 2374. In stage 2378, cache 2080 stores the modified store buffer data in the cache line corresponding to the first tier request's Address field. Cache 2080 performs an ECC check between stages 2378 and 2380. Cache 2080 then passes the store buffer data to first return buffer 2391 in stage 2380 for return to the first tier cache.

If the hit request is a pre-fetch, cache 2080 operates the same as explained above for a load.

Processing First Tier Request Misses: If the missed request's Opcode field calls for a non-cacheable load, cache 2080 forwards the missed request's descriptor to read ERQ 2392. Read ERQ forwards the request descriptor to global snoop controller 2022, which initiates retrieval of the requested data from main memory 2026 by EBL 2024.

If the missed request's Opcode field calls for a cacheable load, cache 2080 performs as described above for a non-cacheable load with the following modifications. Global snoop controller 2022 first initiates retrieval of the requested data from other clusters by issuing a snoop-share request on snoop ring 2021. If the snoop request does not return the desired data, then global snoop controller 2022 initiates retrieval from main memory 2026 via EBL 2024. Cache 2080 also performs an eviction procedure. In the eviction procedure, cache 2080 selects a location in the data array for a cache line of data containing the requested memory location. If the selected data array location contains data that has not been modified, cache 2080 overwrites the selected location when the requested data is eventually returned on data ring 2020.

If the selected data array location has been modified, cache 2080 writes the cache line back to main memory 2026 using write ERQ 2394 and data ring 2020. Cache 2080 submits a request descriptor to write ERQ 2394 in stage 2376. The request descriptor is in the format of a first tier descriptor. Write ERQ 2394 forwards the descriptor to global snoop controller 2022. Snoop controller 2022 instructs external bus logic 2024 to capture the cache line off data ring 2020 and transfer it to main memory 2026. Global snoop controller 2022 provides external bus logic 2024 with descriptor information that enables logic 2024 to recognize the cache line on data ring 2020. In one embodiment, this descriptor includes the above-described information found in a snoop request descriptor.

Cache 2080 accesses the selected cache line in data array 2396, as described above, and forwards the line to data ring write buffer 2395 in stages 2376 through 2380 (FIG. 21). Data ring write buffer 2395 is coupled to provide the cache line on data ring 2020. In one embodiment, cache 2080 includes 4 data ring write buffers. Cache 2080 sets the data ring header information for two 32 byte payload transfers as follows: 1) Validity—valid; 2) Cluster—External Bus Logic 2024; 3) Memory Request Indicator—corresponding to the request sent to write ERQ 2394; 4) MESI—Invalid; and 5) Transfer Done—set to "not done" for the first 32 byte transfer and "done" for the second 32 byte transfer. The header information enables EBL 2024 to capture the cache line off data ring 2020 and transfer it to main memory 2026.

Cache 2080 performs an extra operation if a store has been performed on the evicted cache line and the store buffer data has not been written to the data array 2396. In this instance, cache 2080 utilizes the data selection circuitry from stage 2380 (FIG. 22) to transfer the data directly from store buffer 2393 to data ring write buffer 2395.

If the missed request's Opcode field calls for a non-cacheable store, cache 2080 forwards the request to write ERQ 2394 in stage 2376 for submission to global snoop controller 2022. Global snoop controller 2022 provides a main memory write request to external bus logic 2024, as described above. In stage 2378 (FIG. 22), cache controller 2080 selects the data from the non-cacheable store operation. In stage 2380, cache 2080 forwards the data to data ring write buffer 2395. Cache 2080 sets the data ring header as follows for two 32 byte payload transfers: 1) Validity—valid; 2) Cluster—External Bus Logic 2024; 3) Memory Request—corresponding to the request sent to write ERQ 2394; 4) MESI—Invalid; and 5) Transfer Done—set to "not done" for the first 32 byte transfer and "done" for the second 32 byte transfer.

If the missed request's Opcode field calls for a cacheable store, cache 2080 performs the same operation as explained above for a missed cacheable load. This is because cache 2080 performs stores using a read-modify-write operation. In one embodiment, snoop controller 2022 issues a snoop-own request in response to the read ERQ descriptor for cache 2080.

If the missed request's Opcode field calls for a pre-fetch, cache 2080 performs the same operation as explained above for a missed cacheable load.

Processing First Tier Requests for Store-Create Operations: When a request's Opcode field calls for a store-create operation, cache 2080 performs an address match in storage 2374. If there is not a match, cache 2080 forwards the request to global snoop controller 2022 through read ERQ 2392 in stage 2376. Global snoop controller 2022 responds by issuing a snoop-kill request on snoop ring 2021. The snoop-kill request instructs all other clusters to relinquish control of the identified memory location. Second tier cache responses to snoop-kill requests will be explained below.

If cache 2080 discovers an address match in stage 2374, cache 2080 determines whether the matching cache line has an Exclusive or Modified MESI state. In either of these cases, cache 2080 takes no further action. If the status is Shared, then cache 2080 forwards the request to snoop controller 2022 as described above for the non-matching case.

Processing Snoop Request Hits: If the snoop request Opcode field calls for an own operation, cache 2080 relinquishes ownership of the addressed cache line and transfers the line's contents onto data ring 2020. Prior to transferring the cache line, cache 2080 updates the line, if necessary.

Cache 2080 accesses data array 2396 in stage 2378 (FIG. 21) to retrieve the contents of the cache line containing the desired data—the Address field in the snoop request descriptor identifies the desired cache line. This access operates the same as described above for first tier cacheable load hits. Cache 2080 performs ECC checking and correction is stages 2378 and 2380 and writes the cache line to data ring write buffer 2395. Alternatively, if the retrieved cache line buffer needs to be updated, cache 2080 transfers the contents of store buffer 2393 to data ring write buffer 2395 (FIG. 22).

Cache 2080 provides the following header information to the data ring write buffer along with the cache line: 1) Validity—valid; 2) Cluster—same as in the snoop request; 3) Memory Request—same as in the snoop request; 4) MESI—Exclusive (if the data was never modified while in cache 2080) or Modified (if the data was modified while in cache 2080); and 5) Transfer Done—"not done", except for the header connected with the final payload for the cache line. Cache 2080 then transfers the contents of data ring write buffer 2395 onto data ring 2020.

Cache 2080 also provides global snoop controller 2022 with an acknowledgement that cache 2080 serviced the snoop request. In one embodiment, cache 2080 performs the acknowledgement via the point-to-point link with snoop controller 2022.

If the snoop request Opcode field calls for a share operation, cache 2080 performs the same as described above for a read operation with the following exceptions. Cache 2080 does not necessarily relinquish ownership. Cache 2080 sets the MESI field to Shared if the requested cache line's current MESI status is Exclusive or Shared. However, if the current MESI status for the requested cache line is Modified, then cache 2080 sets the MESI data ring field to Modified and relinquishes ownership of the cache line. Cache 2080 also provides global snoop controller 2022 with an acknowledgement that cache 2080 serviced the snoop request, as described above.

If the snoop request Opcode field calls for a kill operation, cache 2080 relinquishes ownership of the addressed cache line and does not transfer the line's contents onto data ring 2020. Cache 2080 also provides global snoop controller 2022 with an acknowledgement that cache 2080 serviced the snoop request, as described above.

Processing Snoop Request Misses: If the snoop request is a miss, cache 2080 merely provides an acknowledgement to global snoop controller 2022 that cache 2080 serviced the snoop request.

Processing Fill Requests With Cluster Matches: If a Fill request has a cluster match, cache 2080 retrieves the original request that led to the incoming data ring Fill request. The original request is contained in either read ERQ 2392 or write ERQ 2394. The Memory Request field from the incoming data ring header identifies the corresponding entry in read ERQ 2392 or write ERQ 2394. Cache 2080 employs the Address and Opcode fields from the original request in performing further processing.

If the original request's Opcode field calls for a cacheable load, cache 2080 transfers the incoming data ring payload data into data array 2396 and first tier return buffer 2391. In stage 2374, (FIG. 22) cache 2080 selects the Fill Data, which is the payload from data ring 2020. In stage 2376, cache 2080 performs ECC generation. In stage 2378, cache 2080 accesses data array 2396 and writes the Fill Data into the addressed cache line. Cache 2080 performs the data array access based on the Address field in the original request descriptor. As explained above, cache 2080 previously assigned the Address field address a location in data array 2396 before forwarding the original request to global snoop controller 2022. The data array access also places the Fill Data into first tier return buffer 2391. Cache 2080 performs ECC checking in stages 2378 and 2380 and loads first tier return buffer 2391.

If the original request's Opcode field calls for a non-cacheable load, cache 2080 selects Fill Data in stage 2378 (FIG. 22). Cache 2080 then forwards the Fill Data to first tier return buffer 2391 in stage 2380. First tier return buffer 2391 passes the payload data back to the first tier cache requesting the load.

If the original request's Opcode field calls for a cacheable store, cache 2080 responds as follows in one embodiment. First, cache 2080 places the Fill Data in data array 2396—cache 2080 performs the same operations described above for a response to a cacheable load Fill request. Next, cache 2080 performs a store using the data originally supplied by the requesting compute engine—cache 2080 performs the same operations as described above for a response to a cacheable store first tier request with a hit.

In an alternate embodiment, cache 2080 stores the data originally provided by the requesting compute engine in store buffer 2393. Cache 2080 then compares the store buffer data with the Fill Data—modifying store buffer 2393 to include Fill Data in bit positions not targeted for new data storage in the store request. Cache 2080 writes the contents of store buffer 2393 to data array 2396 when there is an idle cycle or another access to store buffer 2393 is necessary, whichever occurs first.

If the original request's Opcode field calls for a pre-fetch, cache 2080 responds the same as for a cacheable load Fill request.

Processing Fill Requests Without Cluster Matches: If a Fill request does not have a cluster match, cache 2080 merely places the incoming data ring header and payload back onto data ring 2020.

Cache 2080 also manages snoop request queue 2390 and data cache request queues 2382, 2384, 2386, and 2388. Once a request from snoop request queue 2390 or data cache request queue 2382, 2384, 2386 or 2388 is sent to read ERQ 2392 or write ERQ 2394, cache 2080 invalidates the request to make room for more requests. Once a read ERQ request or write ERQ request is serviced, cache 2080 removes the request from the ERQ. Cache 2080 removes a request by setting the request's Validity field to an invalid status.

In one embodiment, cache 2080 also includes a sleep mode to aid in queue management. Cache 2080 employs sleep mode when either read ERQ 2392 or write ERQ 2394 is full and cannot accept another request from a first tier data cache request queue or snoop request queue. Instead of refusing service to a request or flushing the cache pipeline, cache 2080 places the first tier or snoop request in a sleep mode by setting the Sleep field in the request descriptor. When read ERQ 2392 or write ERQ 2394 can service the request, cache 2080 removes the request from sleep mode and allows it to be reissued in the pipeline.

In another embodiment of the invention, the scheduler in cache 2080 filters the order of servicing first tier data cache requests to ensure that data is not corrupted. For example, CPU 2060 may issue a load instruction for a memory location, followed by a store for the same location. The load needs to occur first to avoid loading improper data. Due to either the CPU's pipeline or a reprioritization by cache 2080, the order of the load and store commands in the above example can become reversed.

Processors traditionally resolve the dilemma in the above example by issuing no instructions until the load in the above example is completed. This solution, however, has the drawback of slowing processing speed—instruction cycles go by without the CPU performing any instructions.

In one embodiment of the present invention, the prioritization filter of cache 2080 overcomes the drawback of the traditional processor solution. Cache 2080 allows memory requests to be reordered, but no request is allowed to precede another request upon which it is dependent. For example, a set of requests calls for a load from location A, a store to location A after the load from A, and a load from memory location B. The store to A is dependent on the load from A being performed first. Otherwise, the store to A corrupts the load from A. The load from A and load from B are not dependent on other instructions preceding them. Cache 2080 allows the load from A and load from B to be performed in any order, but the store to A is not allowed to proceed until the load from A is complete. This allows cache 2080 to service the load from B, while waiting for the load from A to complete. No processing time needs to go idle.

Cache 2080 implements the prioritization filter using read ERQ 2392, write ERQ 2394, and the Dependency field in a first tier data cache request descriptor. The Dependency field identifies requests in the first tier data cache request queue that must precede the dependent request. Cache 2080 does not select the dependent request from the data cache request queue until all the dependent requests have been serviced. Cache 2080 recognizes a request as serviced once the request's Validity field is set to an invalid state, as described above.

C. Global Snoop Controller

Global snoop controller 2022 responds to requests issued by clusters 2012, 2014, 2016, and 2018. As demonstrated above, these requests come from read ERQ and write ERQ buffers in second tier caches. The requests instruct global snoop controller 2022 to either issue a snoop request or an access to main memory. Additionally, snoop controller 2022 converts an own or share snoop request into a main memory access request to EBL 2024 when no cluster performs a requested memory transfer. Snoop controller 2022 uses the above-described acknowledgements provided by the clusters' second tier caches to keep track of memory transfers performed by clusters.

D. Application Processing

Figure 23A:
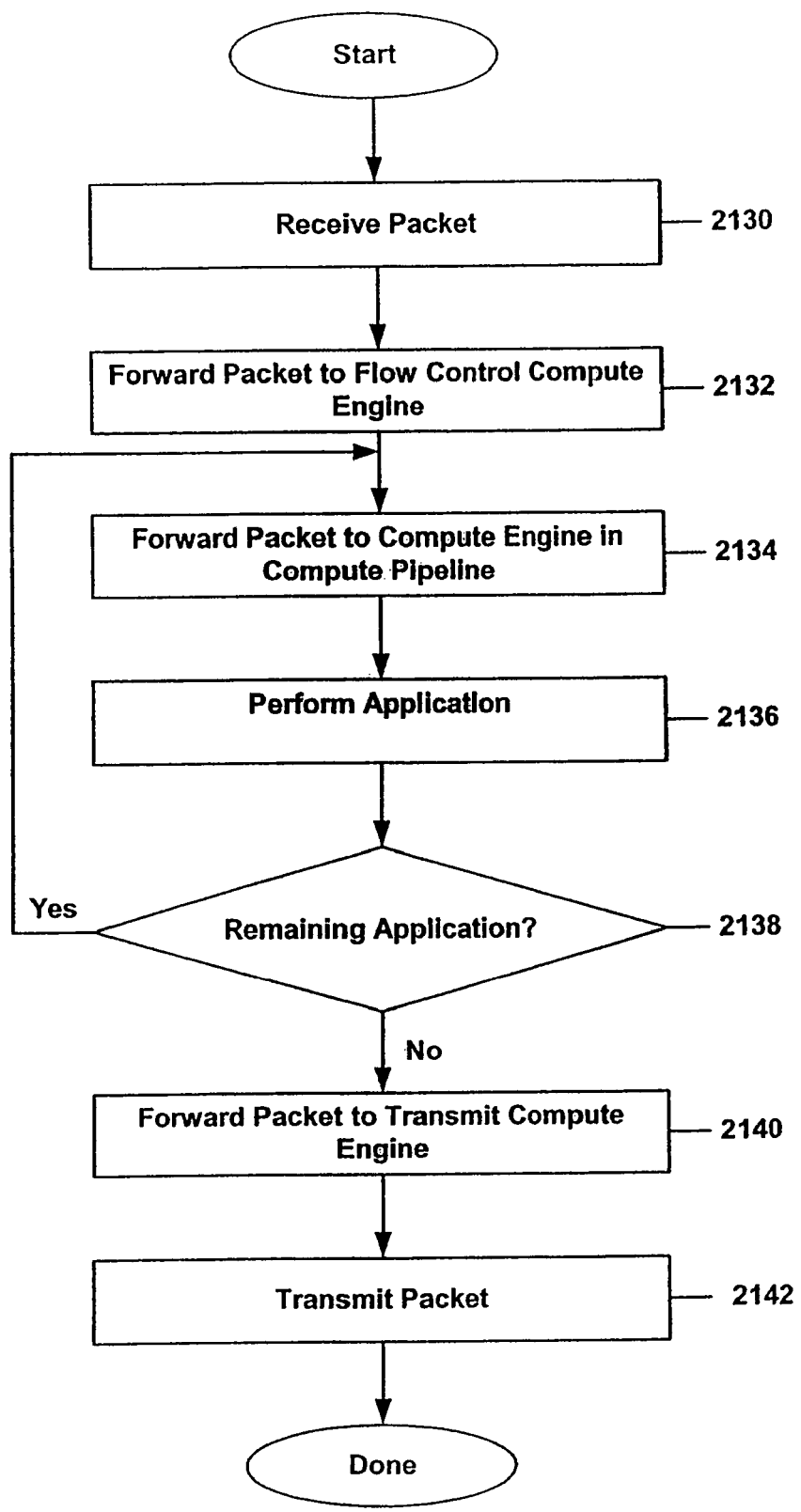
FIG. 23a illustrates a series of operations for processing network packets in one embodiment of the present invention.

FIG. 23a illustrates a process employed by MPU 2010 for executing applications in one embodiment of the present invention. FIG. 23a illustrates a process in which MPU 2010 is employed in an application-based router in a communications network. Generally, an application-based router identifies and executes applications that need to be performed on data packets received from a communication medium. Once the applications are performed for a packet, the router determines the next network destination for the packet and transfers the packet over the communications medium.

MPU 2010 receives a data packet from a communications medium coupled to MPU 2010 (step 2130). In one embodiment, MPU 2010 is coupled to an IEEE 802.3 compliant network running Gigabit Ethernet. In other embodiments, MPU 2010 is coupled to different networks and in some instances operates as a component in a wide area network. A compute engine in MPU 2010, such as compute engine 2050 in FIG. 19, is responsible for receiving packets. In such an embodiment, coprocessor 2062 includes application specific circuitry coupled to the communications medium for receiving packets. Coprocessor 2062 also includes application specific circuitry for storing the packets in data cache 2052 and second tier cache 2080. The reception process and related coprocessor circuitry will be described below in greater detail.

Compute engine 2050 transfers ownership of received packets to a flow control compute engine, such as compute engine 2086, 2088, or 2090 in FIG. 19 (step 2132). Compute engine 2050 transfers packet ownership by placing an entry in the application queue of the flow control compute engine.

The flow control compute engine forwards ownership of each packet to a compute engine in a pipeline set of compute engines (step 2134). The pipeline set of compute engines is a set of compute engines that will combine to perform applications required for the forwarded packet. The flow control compute engine determines the appropriate pipeline by examining the packet to identify the applications to be performed. The flow control compute engine transfers ownership to a pipeline capable of performing the required applications.

In one embodiment of the present invention, the flow control compute engine uses the projected speed of processing applications as a consideration in selecting a pipeline. Some packets require significantly more processing than others. A limited number of pipelines are designated to receive such packets, in order to avoid these packets consuming all of the MPU processing resources.

After the flow control compute engine assigns the packet to a pipeline (step 2134), a pipeline compute engine performs a required application for the assigned packet (step 2136). Once the application is completed, the pipeline compute engine determines whether any applications still need to be performed (step 2138). If more applications remain, the pipeline compute engine forwards ownership of the packet to another compute engine in the pipeline (step 2134) and the above-described process is repeated. This enables multiple services to be performed by a single MPU. If no applications remain, the pipeline compute engine forwards ownership of the packet to a transmit compute engine (step 2140).

The transmit compute engine transmits the data packet to a new destination of the network, via the communications medium (step 2142). In one such embodiment, the transmit compute engine includes a coprocessor with application specific circuitry for transmitting packets. The coprocessor also includes application specific circuitry for retrieving the packets from memory. The transmission process and related coprocessor circuitry will be described below in greater detail.

Figure 23B:
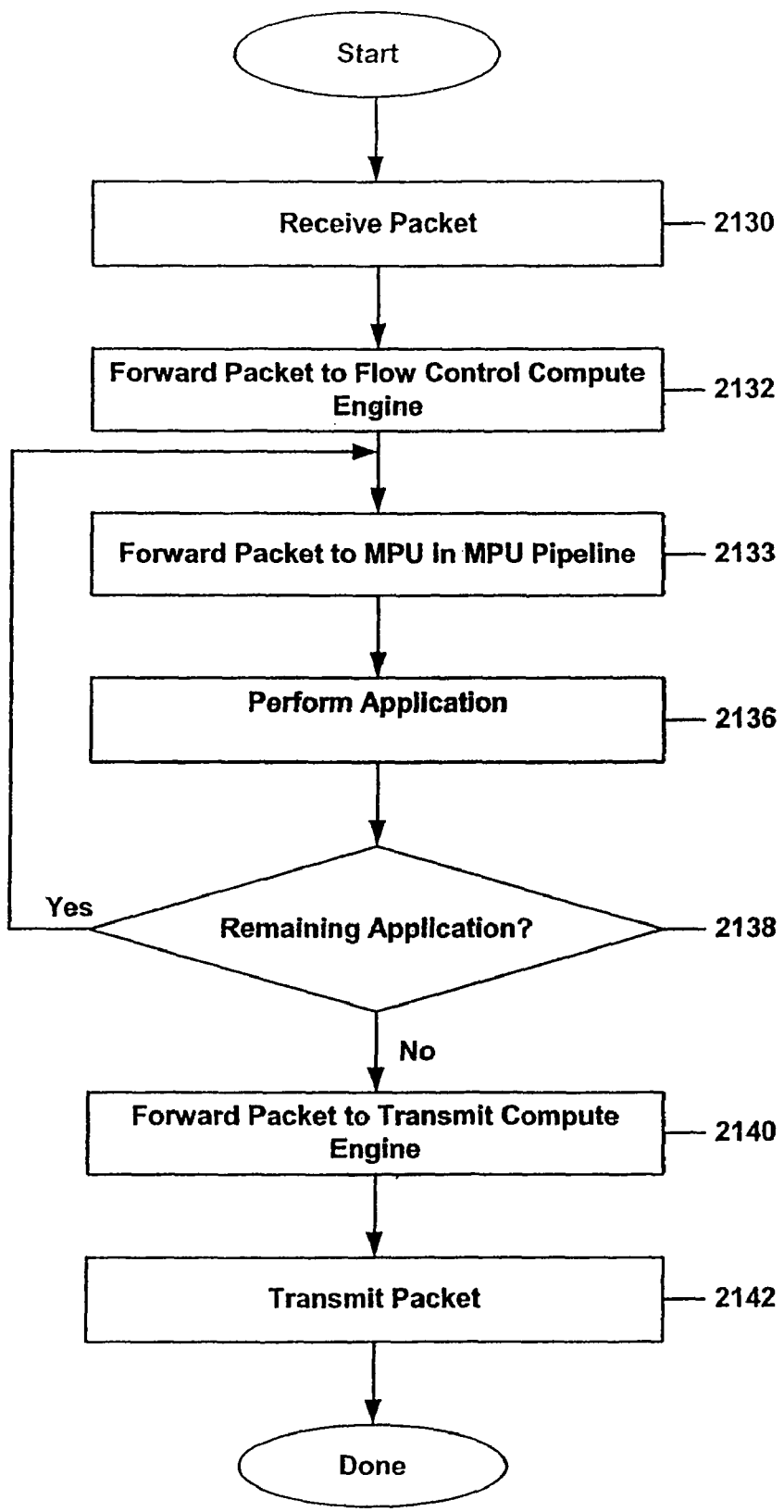
FIG. 23b illustrates a series of operations for processing network packets in an alternate embodiment of the present invention.

FIG. 23b illustrates a process for executing applications in an alternate embodiment of the present invention. This embodiment employs multiple multi-processor units, such as MPU 2010. In this embodiment, the multi-processor units are coupled together over a communications medium. In one version, the multi-processor units are coupled together by cross-bar switches, such as cross-bar switches 3010 and 3110 described below with reference to FIGS. 36-45.

In the embodiment shown in FIG. 23b, steps with the same reference numbers as steps in FIG. 23a operate as described for FIG. 23a. The difference is that packets are assigned to a pipeline set of multi-processor units, instead of a pipeline set of compute engines. Each multi-processor unit in a pipeline transfers packets to the next multi-processor unit in the pipeline via the communications medium (step 2133). In one such embodiment, each multi-processor unit has a compute engine coprocessor with specialized circuitry for performing communications medium receptions and transmissions, as well as exchanging data with cache memory. In one version of the FIG. 23b process, each multi-processor unit performs a dedicated application. In alternate embodiments, a multi-processor unit performs multiple applications.

E. Coprocessor

As described above, MPU 2010 employs coprocessors in cluster compute engines to expedite application processing. The following sets forth coprocessor implementations employed in one set of embodiments of the present invention. One of ordinary skill will recognize that alternate coprocessor implementations can also be employed in an MPU in accordance with the present invention.

1. Coprocessor Architecture and Operation

Figure 24A:
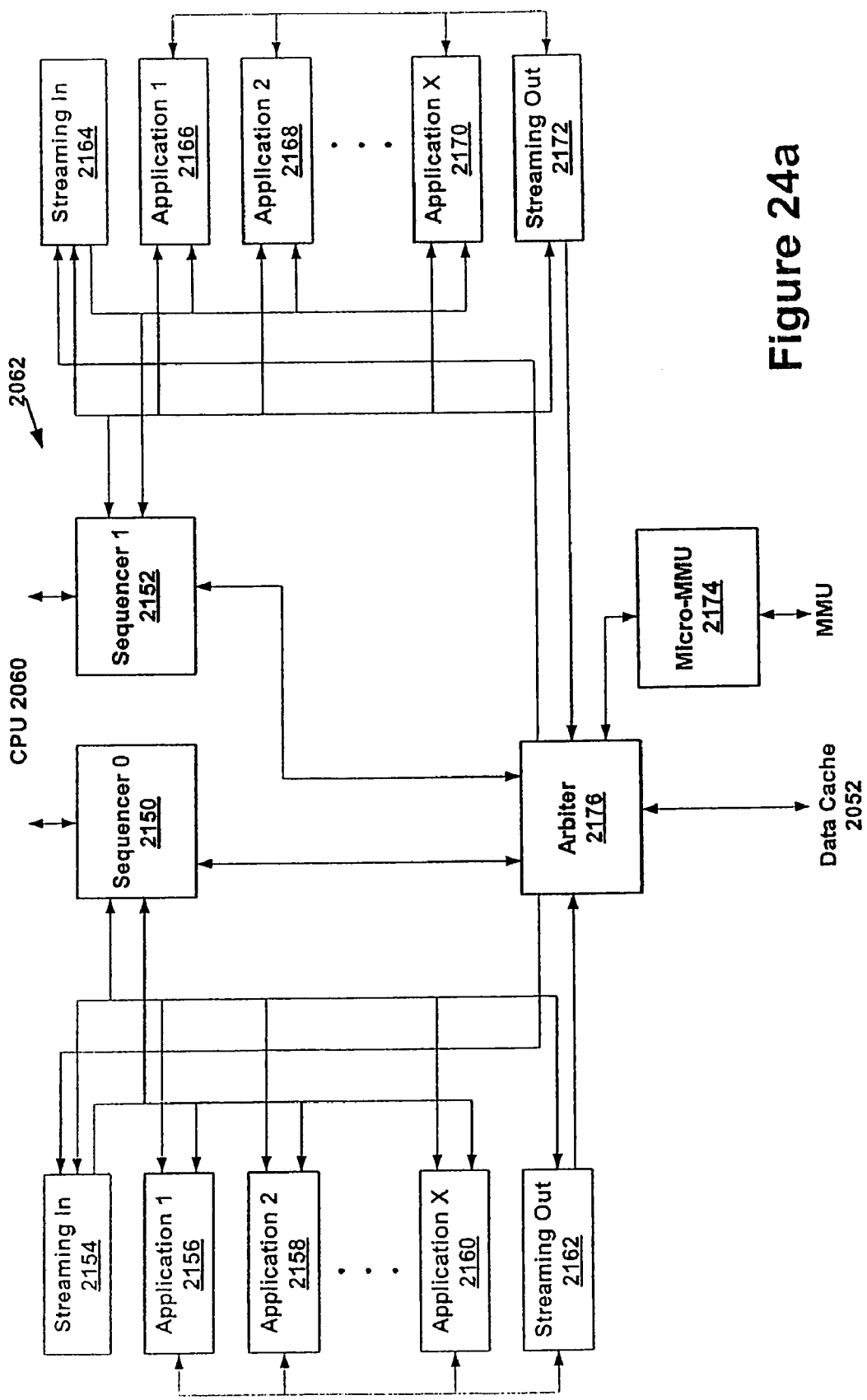
FIGS. 24a-24c show embodiments of a coprocessor for use in a processing cluster in accordance with the present invention.

FIG. 24a illustrates a coprocessor in one embodiment of the present invention, such as coprocessor 2062 from FIGS. 18 and 19. Coprocessor 2062 includes sequencers 2150 and 2152, each coupled to CPU 2060, arbiter 2176, and a set of application engines. The application engines coupled to sequencer 2150 include streaming input engine 2154, streaming output engine 2162, and other application engines 2156, 2158, and 2160. The application engines coupled to sequencer 2152 include streaming input engine 2164, streaming output engine 2172, and other application engines 2166, 2168, and 2170. In alternate embodiments any number of application engines are coupled to sequencers 2150 and 2152.

Sequencers 2150 and 2152 direct the operation of their respective coupled engines in response to instructions received from CPU 2060. In one embodiment, sequencers 2150 and 2152 are micro-code based sequencers, executing micro-code routines in response to instructions from CPU 2060. Sequencers 2150 and 2152 provide output signals and instructions that control their respectively coupled engines in response to these routines. Sequencers 2150 and 2152 also respond to signals and data provided by their respectively coupled engines. Sequencers 2150 and 2152 additionally perform application processing internally in response to CPU 2060 instructions.

Streaming input engines 2154 and 2164 each couple coprocessor 2062 to data cache 2052 for retrieving data. Streaming output engines 2162 and 2172 each couple coprocessor 2062 to data cache 2052 for storing data to memory. Arbiter 2176 couples streaming input engines 2154 and 2164, and streaming output engines 2162 and 2172, and sequencers 2150 and 2152 to data cache 2052. In one embodiment, arbiter 2176 receives and multiplexes the data paths for the entities on coprocessor 2062. Arbiter 2176 ensures that only one entity at a time receives access to the interface lines between coprocessor 62 and data cache 2051. MMU 2174 is coupled to arbiter 2176 to provide internal conversions between virtual and physical addresses. In one embodiment of the present invention, arbiter 2176 performs a round-robin arbitration scheme. Mirco-MMU 2174 contains the above-referenced internal translation buffers for coprocessor 2062 and provides coprocessor 2062's interface to MMU 2058 (FIG. 18) or 2082 (FIG. 19).

Application engines 2156, 2158, 2160, 2166, 2168, and 2170 each perform a data processing application relevant to the job being performed by MPU 2010. For example, when MPU 2010 is employed in one embodiment as an application based router, application engines 2156, 2158, 2160, 2166, 2168, and 2170 each perform one of the following: 1) data string copies; 2) polynomial hashing; 3) pattern searching; 4) RSA modulo exponentiation; 5) receiving data packets from a communications medium; 6) transmitting data packets onto a communications medium; and 7) data encryption and decryption.

Application engines 2156, 2158, and 2160 are coupled to provide data to streaming output engine 2162 and receive data from streaming input engine 2154. Application engines 2166, 2168, and 2170 are coupled to provide data to streaming output engine 2172 and receive data from streaming input engine 2164.

Figure 24B:
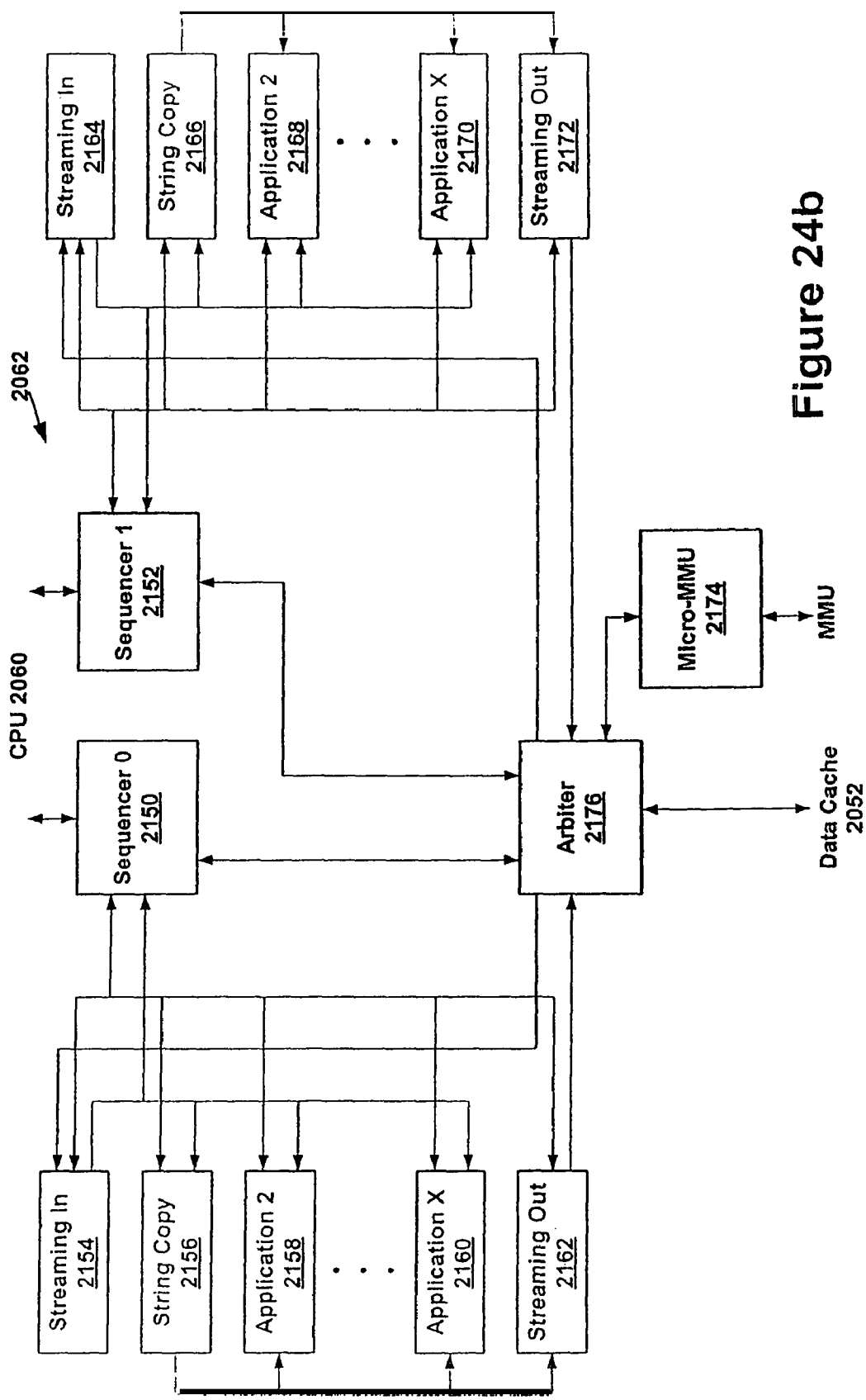
Figure 24C:
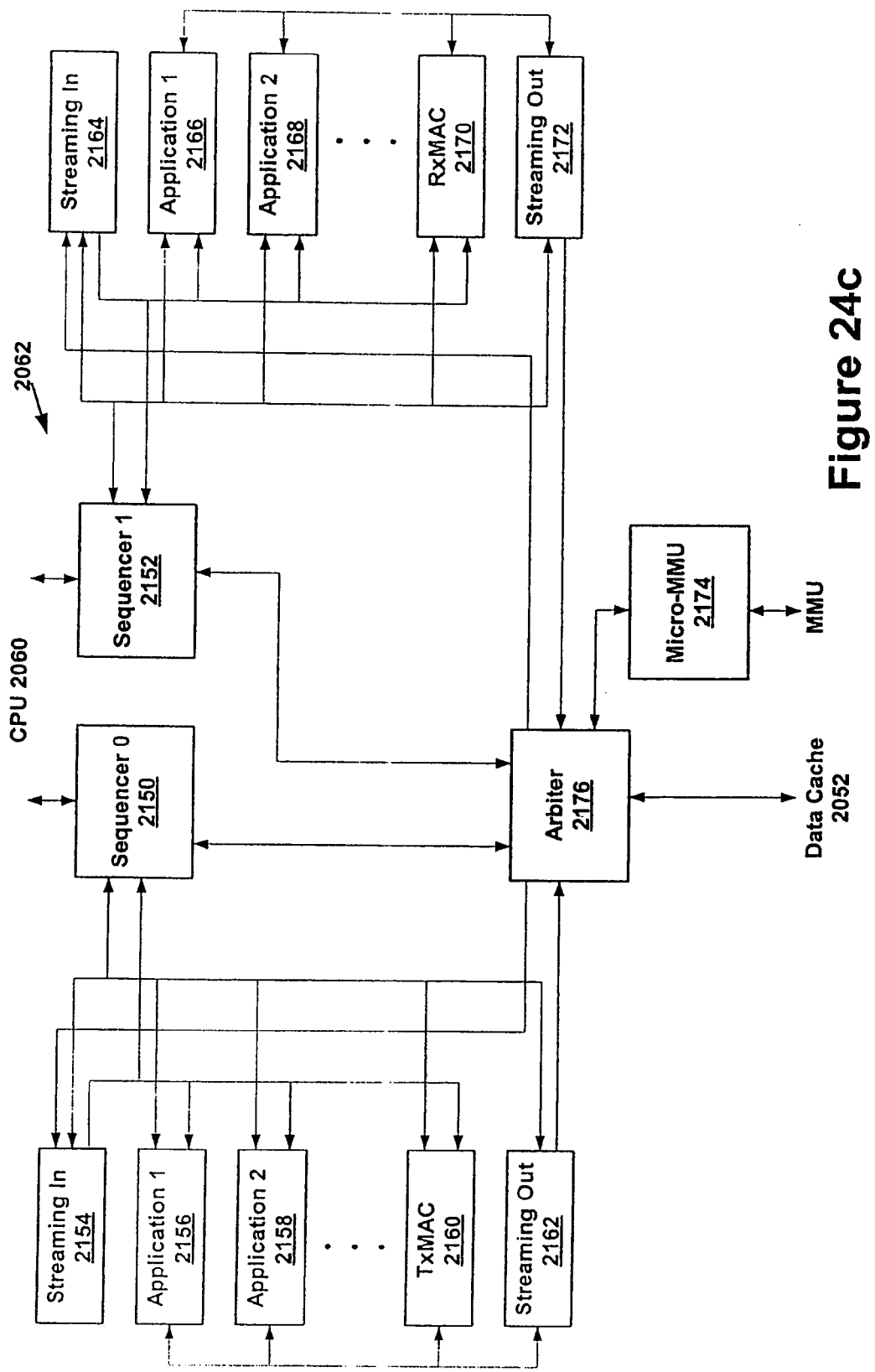

FIG. 24b shows an embodiment of coprocessor 2062 with application engines 2156 and 2166 designed to perform the data string copy application. In this embodiment, engines 2156 and 2166 are coupled to provide string copy output data to engine sets 2158, 2160, and 2162, and 2168, 2170, and 2172, respectively. FIG. 24c shows an embodiment of coprocessor 2062, where engine 2160 is a transmission media access controller ("TxMAC") and engine 2170 is a reception media access controller (RxMAC"). TxMAC 2160 transmits packets onto a communications medium, and RxMAC 2170 receives packets from a communications medium. These two engines will be described in greater detail below.

One advantage of the embodiment of coprocessor 2062 shown in FIGS. 24a-24c is the modularity. Coprocessor 2062 can easily be customized to accommodate many different applications. For example, in one embodiment only one compute engine receives and transmits network packets. In this case, only one coprocessor contains an RxMAC and TxMAC, while other coprocessors in MPU 2010 are customized with different data processing applications. Coprocessor 2062 supports modularity by providing a uniform interface to application engines, except streaming input engines 2154 and 2164 and streaming output engines 2162 and 2172.

2. Sequencer

Figure 25:
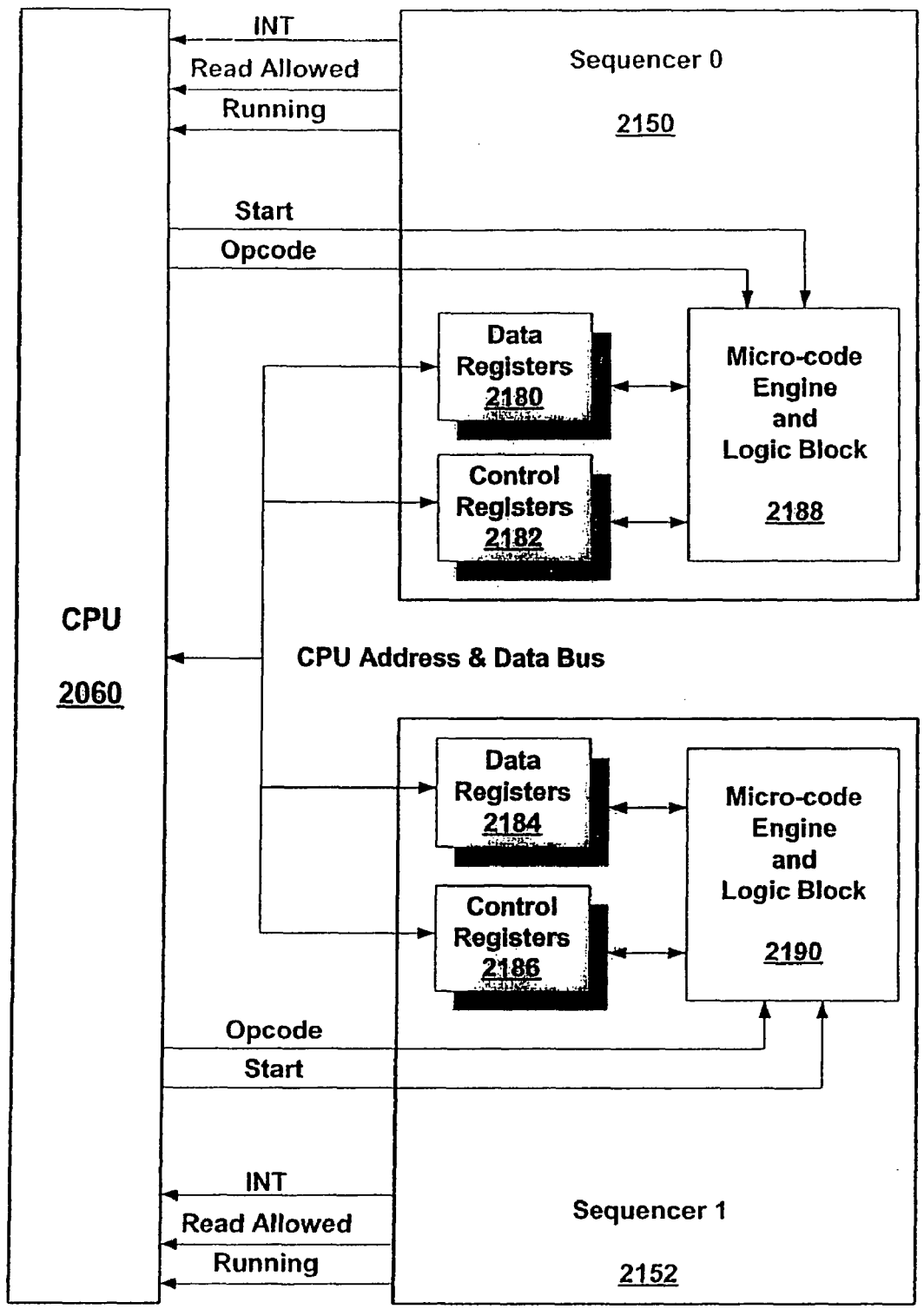
FIG. 25 shows an interface between a CPU and the coprocessors in FIGS. 24a-24c.

FIG. 25 shows an interface between CPU 2060 and sequencers 2150 and 2152 in coprocessor 2062 in one embodiment of the present invention. CPU 2060 communicates with sequencer 2150 and 2152 through data registers 2180 and 2184, respectively, and control registers 2182 and 2186, respectively. CPU 2060 has address lines and data lines coupled to the above-listed registers. Data registers 2180 and control registers 2182 are each coupled to exchange information with micro-code engine and logic block 2188. Block 2188 interfaces to the engines in coprocessor 2062. Data register 2184 and control registers 2186 are each coupled to exchange information with micro-code engine and logic block 2190. Block 2190 interfaces to the engines in coprocessor 2062.

CPU 2060 is coupled to exchange the following signals with sequencers 2150 and 2152: 1) Interrupt (INT)—outputs from sequencers 2150 and 2152 indicating an assigned application is complete; 2) Read Allowed—outputs from sequencers 2150 and 2152 indicating access to data and control registers is permissible; 3) Running—outputs from sequencers 2150 and 2152 indicating that an assigned application is complete; 4) Start—outputs from CPU 2060 indicating that sequencer operation is to begin; and 5) Opcode—outputs from CPU 2060 identifying the set of micro-code instructions for the sequencer to execute after the assertion of Start.

In operation, CPU 2060 offloads performance of assigned applications to coprocessor 2062. CPU 2060 instructs sequencers 2150 and 2152 by writing instructions and data into respective data registers 2180 and 2182 and control registers 2184 and 2186. The instructions forwarded by CPU 2060 prompt either sequencer 2150 or sequencer 2152 to begin executing a routine in the sequencer's micro-code. The executing sequencer either performs the application by running a micro-code routine or instructing an application engine to perform the offloaded application. While the application is running, the sequencer asserts the Running signal, and when the application is done the sequencer asserts the Interrupt signal. This allows CPU 2060 to detect and respond to an application's completion either by polling the Running signal or employing interrupt service routines.

Figure 26:
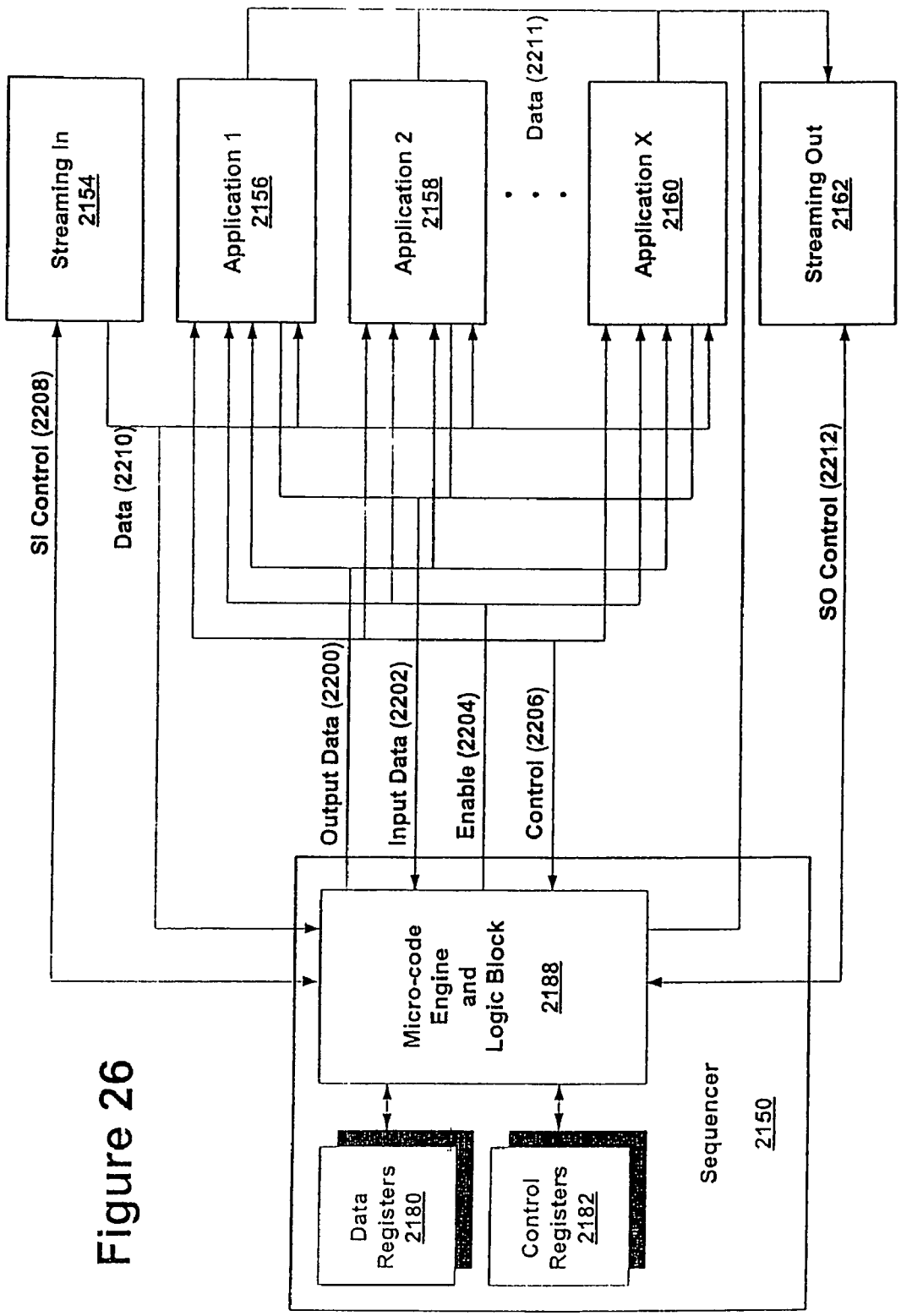
FIG. 26 shows an interface between a sequencer and application engines in the coprocessors in FIGS. 24a-24c.

FIG. 26 shows an interface between sequencer 2150 and its related application engines in one embodiment of the present invention. The same interface is employed for sequencer 2152.

Output data interface 2200 and input data interface 2202 of sequencer 2150 are coupled to engines 2156, 2158, and 2160. Output data interface 2200 provides data to engines 2156, 2158, and 2160, and input data interface 2202 retrieves data from engines 2156, 2158, and 2160. In one embodiment, data interfaces 2200 and 2202 are each 32 bits wide.

Sequencer 2150 provides enable output 2204 to engines 2156, 2158, and 2160. Enable output 2204 indicates which application block is activated. In one embodiment of the present invention, sequencer 2150 only activates one application engine at a time. In such an embodiment, application engines 2156, 2158, and 2160 each receive a single bit of enable output 2204—assertion of that bit indicates the receiving application engine is activated. In alternate embodiments, multiple application engines are activated at the same time.

Sequencer 2150 also includes control interface 2206 coupled to application engines 2156, 2158, and 2160. Control interface 2206 manages the exchange of data between sequencer 2150 and application engines 2156, 2158, and 2160. Control interface 2206 supplies the following signals:

1) register read enable—enabling data and control registers on the activated application engine to supply data on input data interface 2202;

2) register write enable—enabling data and control registers on the activated application engine to accept data on output data interface 2200;

3) register address lines—providing addresses to application engine registers in conjunction with the data and control register enable signals; and 4) arbitrary control signals—providing unique interface signals for each application engine. The sequencer's micro-code programs the arbitrary control bits to operate differently with each application engine to satisfy each engine's unique interface needs.

Once sequencer 2150 receives instruction from CPU 2060 to carry out an application, sequencer 2150 begins executing the micro-code routine supporting that application. In some instances, the micro-code instructions carry out the application without using any application engines. In other instances, the micro-code instructions cause sequencer 2150 to employ one or more application engines to carry out an application.

When sequencer 2150 employs an application engine, the micro-code instructions cause sequencer 2150 to issue an enable signal to the engine on enable interface 2204. Following the enable signal, the micro-code directs sequencer 2150 to use control interface 2206 to initialize and direct the operation of the application engine. Sequencer 2150 provides control directions by writing the application engine's control registers and provides necessary data by writing the application engine's data registers. The micro-code also instructs sequencer 2150 to retrieve application data from the application engine. An example of the sequencer-application interface will be presented below in the description of RxMAC 2170 and TxMAC 2160.

Sequencer 2150 also includes a streaming input (SI) engine interface 2208 and streaming output (SO) engine interface 2212. These interfaces couple sequencer 2150 to streaming input engine 2154 and streaming output engine 2162. The operation of these interfaces will be explained in greater detain below.

Streaming input data bus 2210 is coupled to sequencer 2150, streaming input engine 2154, and application engines 2156, 2158, and 2160. Streaming input engine 2154 drives bus 2210 after retrieving data from memory. In one embodiment, bus 2210 is 16 bytes wide. In one such embodiment, sequencer 2150 is coupled to retrieve only 4 bytes of data bus 2210.

Streaming output bus 2211 is coupled to sequencer 2150, streaming output engine 2162 and application engines 2156, 2158, and 2160. Application engines deliver data to streaming output engine 2162 over streaming output bus 2211, so streaming output engine 2162 can buffer the data to memory. In one embodiment, bus 2211 is 16 bytes wide. In one such embodiment, sequencer 2150 only drives 4 bytes on data bus 2211.

3. Streaming Input Engine

Figure 27:
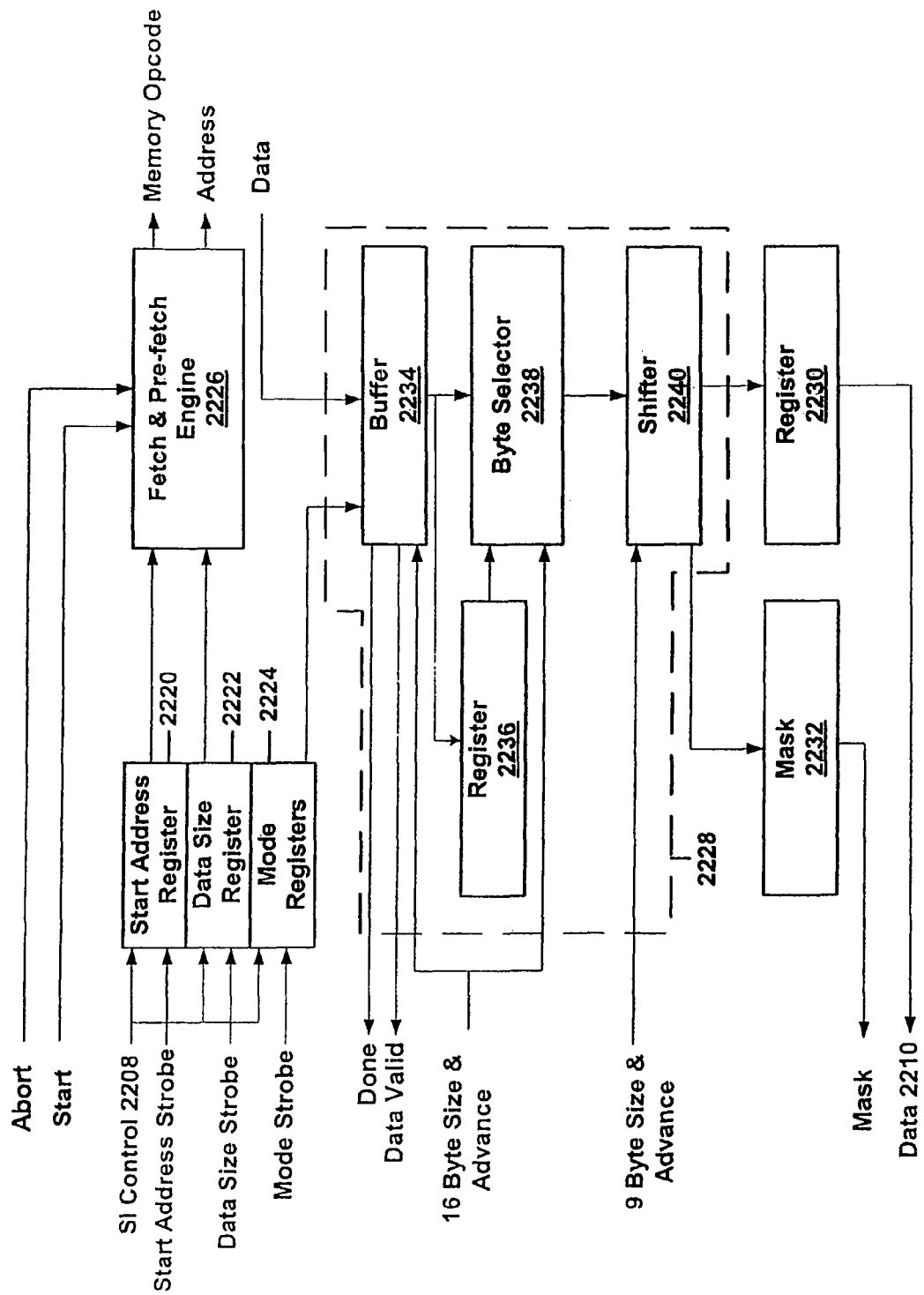
FIG. 27 shows one embodiment of a streaming input engine for the coprocessors shown in FIGS. 24a-24c.

FIG. 27 shows streaming input engine 2154 in one embodiment of the present invention. Streaming input engine 2154 retrieves data from memory in MPU 2010 at the direction of sequencer 2150. Sequencer 2150 provides streaming input engine 2154 with a start address and data size value for the block of memory to be retrieved. Streaming input engine 2154 responds by retrieving the identified block of memory and providing it on streaming data bus 2210 in coprocessor 2062. Streaming input engine 2154 provides data in programmable word sizes on bus 2210, in response to signals on SI control interface 2208.

Fetch and pre-fetch engine 2226 provides instructions (Memory Opcode) and addresses for retrieving data from memory. Alignment circuit 2228 receives the addressed data and converts the format of the data into the alignment desired on streaming data bus 2210. In one embodiment, engine 2226 and alignment circuit 2228 are coupled to first tier data cache 2052 through arbiter 2176 (FIGS. 24*a*-24*c*).

Alignment circuit 2228 provides the realigned data to register 2230, which forwards the data to data bus 2210. Mask register 2232 provides a mask value identifying the output bytes of register 2230 that are valid. In one embodiment, fetch engine 2226 addresses 16 byte words in memory, and streaming input engine 2154 can be programmed to provide words with sizes of either: 0, 1, 2, 3, 4, 5, 6, 7, 8, or 16 bytes.

Streaming input engine 2154 includes configuration registers 2220, 2222, and 2224 for receiving configuration data from sequencer 2150. Registers 2220, 2222, and 2224 are coupled to data signals on SI control interface 2208 to receive a start address, data size, and mode identifier, respectively. Registers 2220, 2222, and 2224 are also coupled to receive the following control strobes from sequencer 2150 via SI control interface 2208: 1) start address strobe—coupled to start address register 2220; 2) data size strobe—coupled to data size register 2222; and 3) mode strobe—coupled to mode register 2224. Registers 2220, 2222, and 2224 each capture the data on output data interface 2200 when sequencer 2150 asserts their respective strobes.

In operation, fetch engine 2226 fetches the number of bytes identified in data size register 2222, beginning at the start address in register 2220. In one embodiment, fetch engine 2226 includes a pre-fetch operation to increase the efficiency of memory fetches. Fetch engine 2226 issues pre-fetch instructions prior to addressing memory. In response to the pre-fetch instructions, MPU 2010 begins the process of mapping the memory block being accessed by fetch engine 2226 into data cache 2052 (See FIGS. 18 and 19).

In one embodiment, fetch engine 2226 calls for MPU 2010 to pre-fetch the first three 64 byte cache lines of the desired memory block. Next, fetch engine 2226 issues load instructions for the first 64 byte cache line of the desired memory block. Before each subsequent load instruction for the desired memory block, fetch engine 2226 issues pre-fetch instructions for the two cache lines following the previously pre-fetched lines. If the desired memory block is less than three cache lines, fetch engine 2226 only issues pre-fetch instructions for the number of lines being sought. Ideally, the pre-fetch operations will result in data being available in data cache 2052 when fetch engine 2226 issues load instructions.

SI control interface 2208 includes the following additional signals: 1) abort—asserted by sequencer 2150 to halt a memory retrieval operation; 2) start—asserted by sequencer 2150 to begin a memory retrieval operations; 3) done—asserted by streaming input engine 2154 when the streaming input engine is drained of all valid data; 4) Data Valid—asserted by streaming input engine 2154 to indicate engine 2154 is providing valid data on data bus 2210; 5) 16 Byte Size & Advance—asserted by sequencer 2150 to call for a 16 byte data output on data bus 210; and 6) 9 Byte Size & Advance—asserted by sequencer 2150 to call for either 0, 1, 2, 3, 4, 5, 6, 7, or 8 byte data output on data bus 2210.

In one embodiment, alignment circuit 2228 includes buffer 2234, byte selector 2238, register 2236, and shifter 2240. Buffer 2234 is coupled to receive 16 byte data words from data cache 2052 through arbiter 2176. Buffer 2234 supplies data words on its output in the order the data words were received. Register 2236 is coupled to receive 16 byte data words from buffer 2234. Register 2236 stores the data word that resided on the output of buffer 2234 prior to the word stored in register 2236.

Byte selector 2238 is coupled to receive the data word stored in register 2236 and the data word on the output of buffer 2234. Byte selector 2238 converts the 32 byte input into a 24 byte output, which is coupled to shifter 2240. The 24 bytes follow the byte last provided to register 2230. Register 2236 loads the output of buffer 2234 and buffer 2234 outputs the next 16 bytes, when the 24 bytes extends beyond the most significant byte on the output of buffer 2234. Shifter 2240 shifts the 24 byte input, so the next set of bytes to be supplied on data bus 2210 appear on the least significant bytes of the output of shifter 2240. The output of shifter 2240 is coupled to register 2230, which transfers the output of shifter 2240 onto data bus 2210.

Shifter 2240 is coupled to supply the contents of mask 2232 and receive the 9 Byte Size & Advance signal. The 9 Byte Size & Advance signal indicates the number of bytes to provide in register 2230 for transfer onto streaming data bus 2210. The 9 Byte Size & Advance signal covers a range of 0 to 8 bytes. When the advance bit of the signal is deasserted, the entire signal is ignored. Using the contents of the 9 Byte Size & Advance signal, shifter 2240 properly aligns data in register 2230 so the desired number of bytes for the next data transfer appear in register 2230 starting at the least significant byte.

The 16 Byte Size & Advance signal is coupled to buffer 2234 and byte selector 2238 to indicate that a 16 byte transfer is required on data bus 2210. In response to this signal, buffer 2234 immediately outputs the next 16 bytes, and register 2236 latches the bytes previously on the output of buffer 2234. When the advance bit of the signal is deasserted, the entire signal is ignored.

In one embodiment, mode register 2224 stores two mode bits. The first bit controls the assertion of the data valid signal. If the first bit is set, streaming input engine 2154 asserts the data valid signal once there is valid data in buffer 2234. If the first bit is not set, streaming input engine 2154 waits until buffer 2234 contains at least 32 valid bytes before asserting data valid. The second bit controls the deassertion of the data valid signal. When the second bit is set, engine 2154 deasserts data valid when the last byte of data leaves buffer 2234. Otherwise, engine 2154 deasserts data valid when buffer 2234 contains less than 16 valid data bytes.

4. Streaming Output Engine

Figure 28:
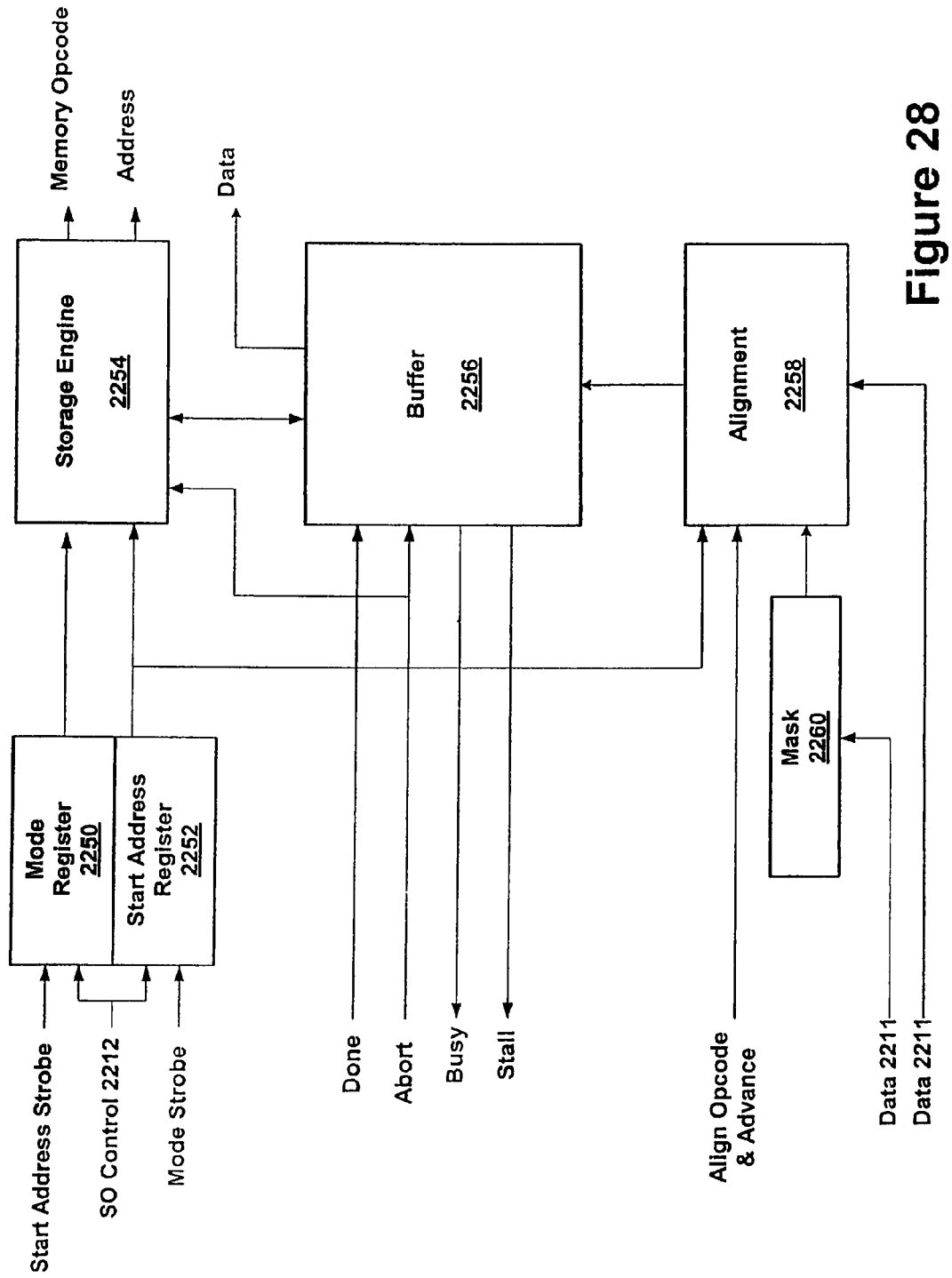
FIG. 28 shows one embodiment of a streaming output engine for the coprocessors shown in FIGS. 24a-24c.

FIG. 28 illustrates one embodiment of streaming output engine 2162 in coprocessor 2062. Streaming output engine 2162 receives data from streaming data bus 2211 and stores the data in memory in MPU 2010. Streaming data bus 2211 provides data to alignment block 2258 and mask signals to mask register 2260. The mask signals identify the bytes on streaming data bus 2211 that are valid. Alignment block 2258 arranges the incoming data into its proper position in a 16 byte aligned data word. Alignment block 2258 is coupled to buffer 2256 to provide the properly aligned data.

Buffer 2256 maintains the resulting 16 byte data words until they are written into memory over a data line output of buffer 2256, which is coupled to data cache 2052 via arbiter 2176. Storage engine 2254 addresses memory in MPU 2010 and provides data storage opcodes over its address and memory opcode outputs. The address and opcode outputs of storage engine 2254 are coupled to data cache 2052 via arbiter 2176. In one embodiment, storage engine 2254 issues 16 byte aligned data storage operations.

Streaming output buffer 2162 includes configuration registers 2250 and 2252. Registers 2250 and 2252 are coupled to receive data from sequencer 2150 on data signals in SO control interface 2212. Register 2250 is coupled to a start address strobe provided by sequencer 2150 on SO control interface 2212. Register 2250 latches the start address data presented on interface 2212 when sequencer 2150 asserts the start address strobe. Register 2252 is coupled to a mode address strobe provided by sequencer 2150 on SO control bus 2212. Register 2252 latches the mode data presented on interface 2212 when sequencer 2150 asserts the mode strobe.

In one embodiment, mode configuration register 2252 contains 2 bits. A first bit controls a cache line burst mode. When this bit is asserted, streaming output engine 2162 waits for a full cache line word to accumulate in engine 2162 before storing data to memory. When the first bit is not asserted, streaming output engine 2162 waits for at least 16 bytes to accumulate in engine 2162 before storing data to memory.

The second bit controls assertion of the store-create instruction by coprocessor 2062. If the store-create mode bit is not asserted, then coprocessor 2062 doesn't assert the store-create opcode. If the store-create bit is asserted, storage engine 2254 issues the store-create opcode under the following conditions: 1) If cache line burst mode is enabled, streaming output engine 2162 is storing the first 16 bytes of a cache line, and engine 2162 has data for the entire cache line; and 2) If cache line burst mode is not enabled, streaming output engine 2162 is storing the first 16 bytes of a cache line, and engine 2162 has 16 bytes of data for the cache line.

SO control interface 2212 includes the following additional signals: 1) Done—asserted by sequencer 2150 to instruct streaming output engine 2162 that no more data is being provided on data bus 2210; 2) Abort—provided by sequencer 2150 to instruct streaming output engine 2162 to flush buffer 2256 and cease issuing store opcodes; 3) Busy—supplied by streaming output engine 2162 to indicate there is data in buffer 2256 to be transferred to memory; 4) Align Opcode & Advance—supplied by sequencer 2150 to identify the number of bytes transferred in a single data transfer on data bus 2211. The align opcode can identify 4, 8 or 16 byte transfers in one embodiment. When the advance bit is deasserted, the align opcode is ignored by streaming output engine 2162; and 5) Stall—supplied by streaming output engine 2162 to indicate buffer 2256 is full. In response to receiving the Stall signal, sequencer 2150 stalls data transfers to engine 2162.

Figure 29:
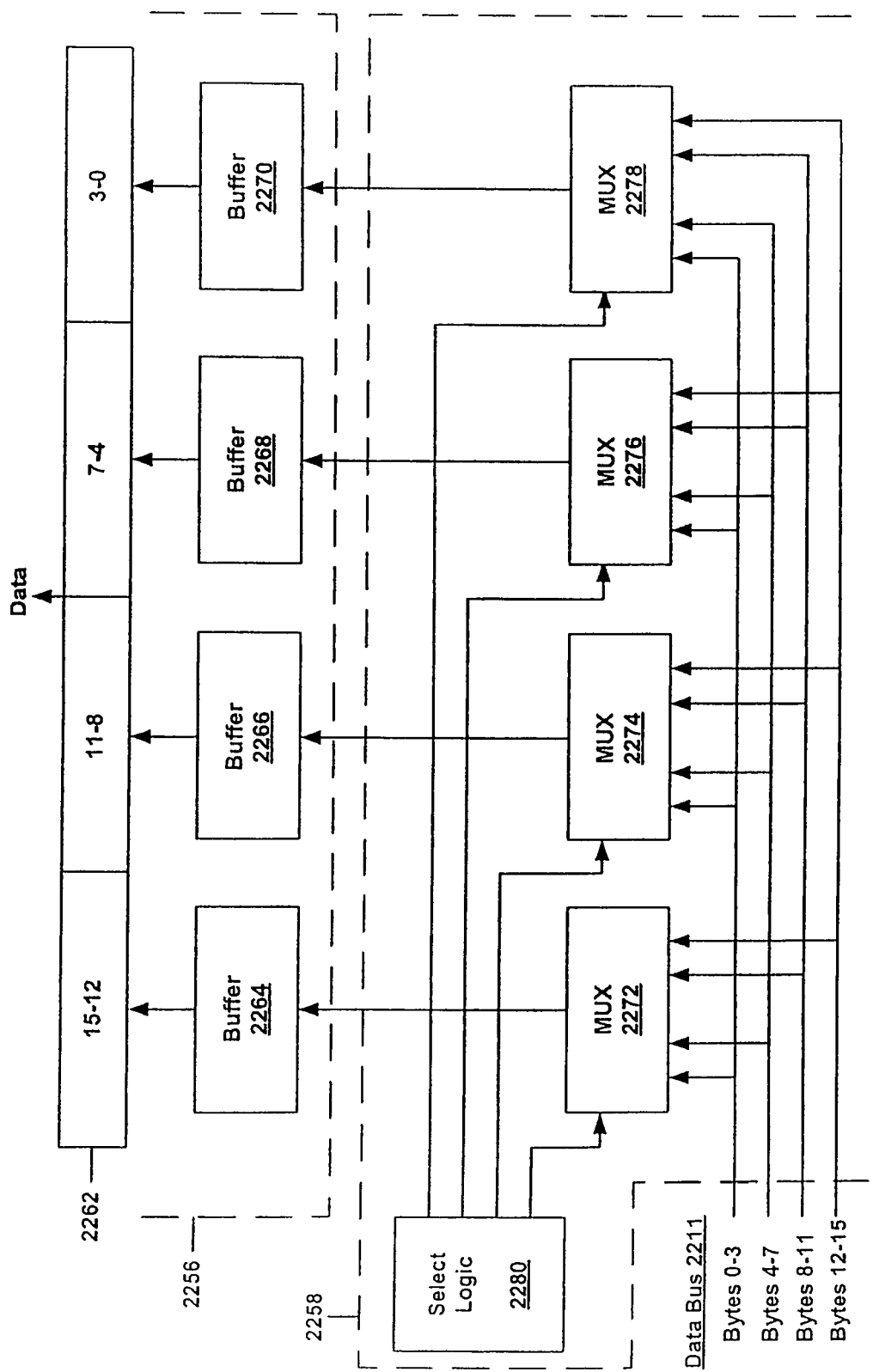
FIG. 29 shows one embodiment of alignment circuitry for use in the streaming output engine shown in FIG. 28.

Alignment block 2258 aligns incoming data from streaming data bus 2211 in response to the alignment opcode and start address register value. FIG. 29 shows internal circuitry for buffer 2256 and alignment block 2258 in one embodiment of the invention. Buffer 2256 supplies a 16 byte aligned word from register 2262 to memory on the output data line formed by the outputs of register 2262. Buffer 2256 internally maintains 4 buffers, each storing 4 byte data words received from alignment block 2256. Data buffer 2270 is coupled to output word register 2262 to provide the least significant 4 bytes (0-3). Data buffer 2268 is coupled to output word register 2262 to provide bytes 4-7. Data buffer 2266 is coupled to output word register 2262 to provide bytes 8-11. Data buffer 2264 is coupled to output word register 2262 to provide the most significant bytes (12-15).

Alignment block 2258 includes multiplexers 2272, 2274, 2276, and 2278 to route data from streaming data bus 2211 to buffers 2264, 2266, 2268, and 2270. Data outputs from multiplexers 2272, 2274, 2276, and 2278 are coupled to provide data to the inputs of buffers 2264, 2266, 2268, and 2270, respectively. Each multiplexer includes four data inputs. Each input is coupled to a different 4 byte segment of streaming data bus 2211. A first multiplexer data input receives bytes 0-3 of data bus 2211. A second multiplexer data input receives bytes 4-7 of data bus 2211. A third multiplexer input receives bytes 8-11 of data bus 2211. A fourth multiplexer data input receives bytes 12-15 of data bus 2211.

Each multiplexer also includes a set of select signals, which are driven by select logic 2280. Select logic 2280 sets the select signals for multiplexers 2272, 2274, 2276, and 2278, based on the start address in register 2252 and the Align Opcode & Advance Signal. Select logic 280 ensures that data from streaming data bus 2211 is properly aligned in output word register 2262.

For example, the start address may start at byte 4, and the Align Opcode calls for 4 byte transfers on streaming data bus 2211. The first 12 bytes of data received from streaming data bus 2211 must appear in bytes 4-15 of output register 2262.

When alignment block 2258 receives the first 4 byte transfer on bytes 0-3 of bus 2211, select logic 2280 enables multiplexer 2276 to pass these bytes to buffer 2268. When alignment block 2258 receives the second 4 byte transfer, also appearing on bytes 0-3 of bus 2211, select logic 2280 enables multiplexer 2274 to pass bytes 0-3 to buffer 2266. When alignment block 2258 receives the third 4 byte transfer, also appearing on bytes 0-3 of bus 2211, select logic 2280 enables multiplexer 2272 to pass bytes 0-3 to buffer 2264. As a result, when buffer 2256 performs its 16 byte aligned store to memory, the twelve bytes received from data bus 2211 appear in bytes 4-15 of the stored word.

In another example, the start address starts at byte 12, and the Align Opcode calls for 8 byte transfers on streaming data bus 2211. Alignment block 2258 receives the first 8 byte transfer on bytes 0-7 of bus 2211. Select logic 2080 enables multiplexer 2272 to pass bytes 0-3 of bus 2211 to buffer 2264 and enables multiplexer 2278 to pass bytes 4-7 of bus 2211 to buffer 2270. Alignment block 2258 receives the second 8 byte transfer on bytes 0-7 of bus 2211. Select logic 2080 enables multiplexer 2276 to pass bytes 0-3 of bus 2211 to buffer 2268 and enables multiplexer 2274 to pass bytes 4-7 of bus 2211 to buffer 2266. Register 2262 transfers the newly recorded 16 bytes to memory in 2 transfers. The first transfer presents the least significant 4 bytes of the newly received 16 byte transfer in bytes 12-15. The second transfer presents 12 bytes of the newly received data on bytes 0-11.

One of ordinary skill will recognize that FIG. 29 only shows one possible embodiment of buffer 2256 and alignment block 2258. Other embodiments are possible using well known circuitry to achieve the above-described functionality.

5. RxMAC and Packet Reception a. RxMAC

Figure 30:
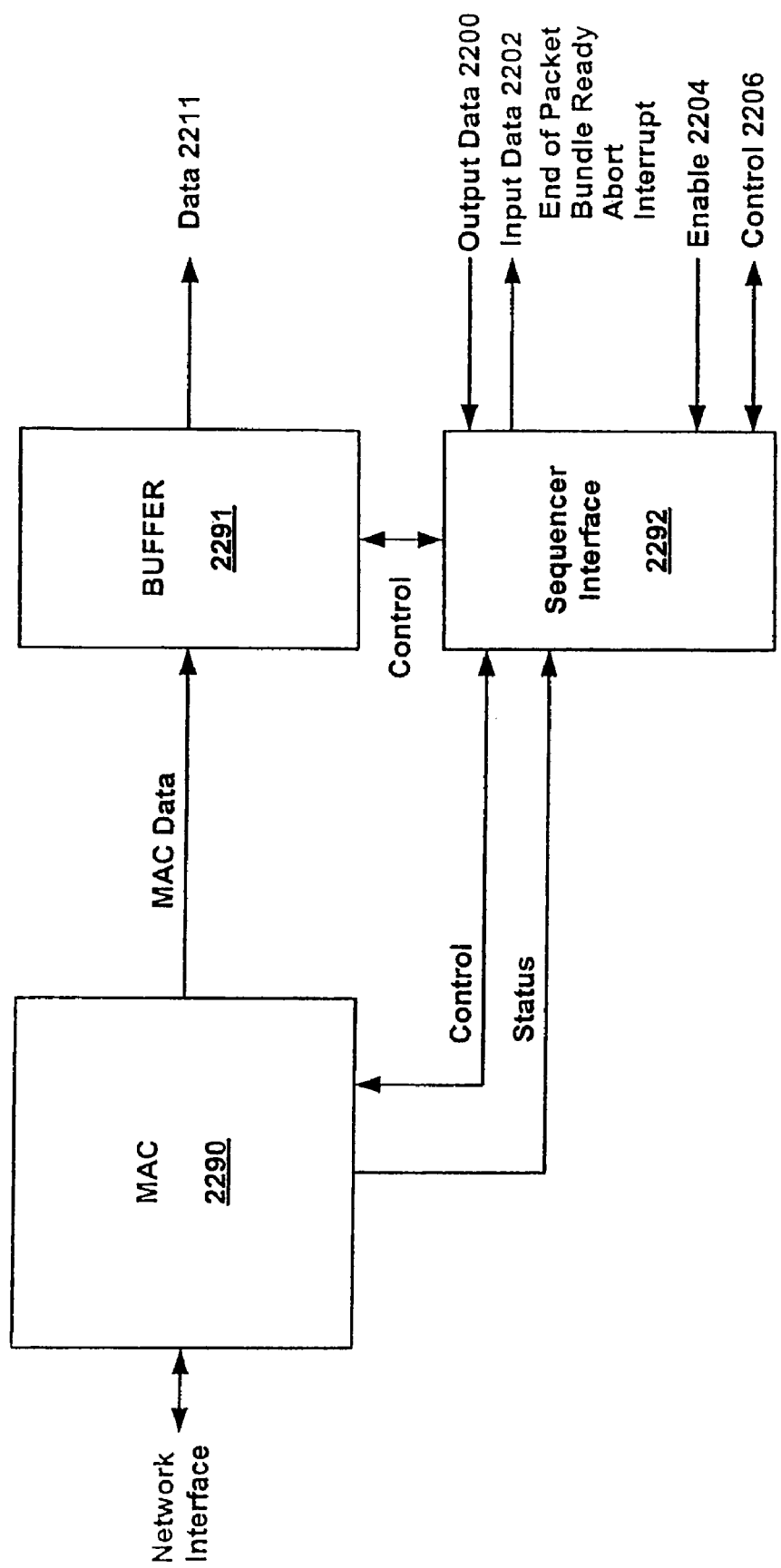
FIG. 30 shows one embodiment of a reception media access controller engine in the coprocessor shown in FIG. 24c.

FIG. 30 illustrates one embodiment of RxMAC 2170 in accordance with the present invention. RxMAC 2170 receives data from a network and forwards it to streaming output engine 2162 for storing in MPU 2010 memory. The combination of RxMAC 2170 and streaming output engine 2162 enables MPU 2010 to directly write network data to cache memory, without first being stored in main memory 2026.

RxMAC 2170 includes media access controller ("MAC") 2290, buffer 2291, and sequencer interface 2292. In operation, MAC 290 is coupled to a communications medium through a physical layer device (not shown) to receive network data, such as data packets. MAC 2290 performs the media access controller operations required by the network protocol governing data transfers on the coupled communications medium. Example of MAC operations include: 1) framing incoming data packets; 2) filtering incoming packets based on destination addresses; 3) evaluating Frame Check Sequence ("FCS") checksums; and 4) detecting packet reception errors.

In one embodiment, MAC 2290 conforms to the IEEE 802.3 Standard for a communications network supporting GMII Gigabit Ethernet. In one such embodiment, the MAC 2290 network interface includes the following signals from the IEEE 802.3z Standard: 1) RXD—an input to MAC 2290 providing 8 bits of received data; 2) RX_DV—an input to MAC 2290 indicating RXD is valid; 3) RX_ER—an input to MAC 2290 indicating an error in RXD; and 4) RX_CLK—an input to MAC 2290 providing a 125 MHz clock for timing reference for RXD.

One of ordinary skill will recognize that in alternate embodiments of the present invention MAC 2290 includes interfaces to physical layer devices conforming to different network standards. One such standard is the IEEE 802.3 standard for MII 100 megabit per second Ethernet.

In one embodiment of the invention, RxMAC 2170 also receives and frames data packets from a point-to-point link with a device that couples MPUs together. Two such devices are cross-bar switch 3010 and cross-bar switch 3110 described below with reference to FIGS. 36-45. In one such embodiment, the point-to-point link includes signaling that conforms to the IEEE 802.3 Standard for GMII Gigabit Ethernet MAC interface operation.

MAC 2290 is coupled to buffer 2291 to provide framed words (MAC Data) from received data packets. In one embodiment, each word contains 8 bits, while in other embodiments alternate size words can be employed. Buffer 2291 stores a predetermined number of framed words, then transfers the words to streaming data bus 2211. Streaming output engine 2162 stores the transferred data in memory, as will be described below in greater detail. In one such embodiment, buffer 2291 is a first-in-first-out ("FIFO") buffer.

As listed above, MAC 2290 monitors incoming data packets for errors. In one embodiment, MAC 2290 provides indications of whether the following occurred for each packet: 1) FCS error; 2) address mismatch; 3) size violation; 4) overflow of buffer 2291; and 5) RX_ER signal asserted. In one such embodiment, this information is stored in memory in MPU 2010, along with the associated data packet.

RxMAC 2170 communicates with sequencer 2150 through sequencer interface 2292. Sequencer interface 2292 is coupled to receive data on sequencer output data bus 2200 and provide data on sequencer input data bus 2202. Sequencer interface 2292 is coupled to receive a signal from enable interface 2204 to inform RxMAC 2170 whether it is activated.

Sequencer 2150 programs RxMAC 2170 for operation through control registers (not shown) in sequencer interface 2292. Sequencer 2150 also retrieves control information about RxMAC 2170 by querying registers in sequencer interface 2292. Sequencer interface 2292 is coupled to MAC 2290 and buffer 2291 to provide and collect control register information.

Control registers in sequencer interface 2292 are coupled to sequencer input data bus 2202 and output data bus 2200. The registers are also coupled to sequencer control bus 2206 to provide for addressing and controlling register store and load operations. Sequencer 2150 writes one of the control registers to define the mode of operation for RxMAC 2170. In one mode, RxMAC 2170 is programmed for connection to a communications network and in another mode RxMAC 2170 is programmed to the above-described point-to-point link to another device. Sequencer 2150 employs another set of control registers to indicate the destination addresses for packets that RxMAC 2170 is to accept.

Sequencer interface 2292 provides the following signals in control registers that are accessed by sequencer 2150: 1) End of Packet—indicating the last word for a packet has left buffer 2291; 2) Bundle Ready—indicating buffer 2291 has accumulated a predetermined number of bytes for transfer on streaming data bus 2210; 3) Abort—indicating an error condition has been detected, such as an address mismatch, FCS error, or buffer overflow; and 4) Interrupt—indicating sequencer 2150 should execute an interrupt service routine, typically for responding to MAC 2290 losing link to the communications medium. Sequencer interface 2292 is coupled to MAC 2290 and buffer 2291 to receive the information necessary for controlling the above-described signals.

Sequencer 2150 receives the above-identified signals in response to control register reads that access control registers containing the signals. In one embodiment, a single one bit register provides all the control signals in response to a series of register reads by sequencer 2150. In an alternate embodiment, the control signals are provided on control interface 2206. Sequencer 2150 responds to the control signals by executing operations that correspond to the signals—this will be described in greater detail below. In one embodiment, sequencer 2150 executes corresponding micro-code routines in response to the signals. Once sequencer 2150 receives and responds to one of the above-described signals, sequencer 2150 performs a write operation to a control register in sequencer interface 2292 to deassert the signal.

b. Packet Reception

Figure 31:
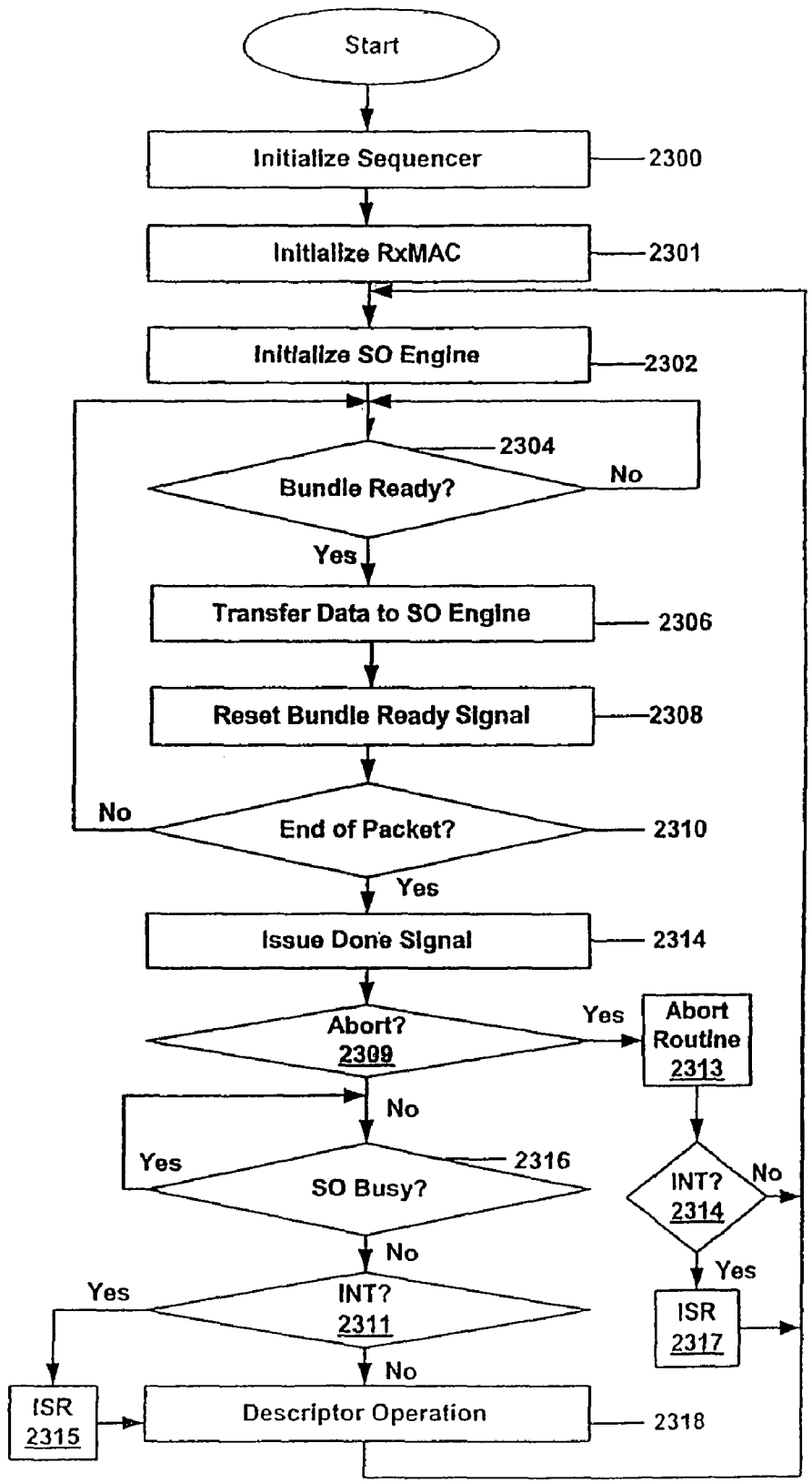
FIG. 31 illustrates a packet reception process in accordance with the present invention.

FIG. 31 illustrates a process for receiving data packets using coprocessor 2062 in one embodiment of the present invention. CPU 2060 initializes sequencer 2152 for managing packet receptions (step 300). CPU 2060 provides sequencer 2150 with addresses in MPU memory for coprocessor 2062 to store data packets. One data storage scheme for use with the present invention appears in detail below.

After being initialized by CPU 2060, sequencer 2152 initializes RxMAC 2170 (step 2301) and streaming output engine 2172 (step 2302). CPU 2060 provides RxMAC 2170 with an operating mode for MAC 2290 and the destination addresses for data packets to be received. CPU 2060 provides streaming output engine 2172 with a start address and operating modes. The starting address is the memory location where streaming output engine 2172 begins storing the next incoming packet. In one embodiment, sequencer 2152 sets the operating modes as follows: 1) the cache line burst mode bit is not asserted; and 2) the store-create mode bit is asserted. As described above, initializing streaming output engine 2172 causes it to begin memory store operations.

Once initialization is complete, sequencer 2152 determines whether data needs to be transferred out of RxMAC 2170 (step 2304). Sequencer 2152 monitors the bundle ready signal to make this determination. Once RxMAC 2170 asserts bundle ready, bytes from buffer 2291 in RxMAC 2170 are transferred to streaming output engine 2172 (step 2306).

Upon detecting the bundle ready signal (step 2304), sequencer 2152 issues a store opcode to streaming output engine 2172. Streaming output engine 2172 responds by collecting bytes from buffer 2291 on streaming data bus 2211 (step 2306). In one embodiment, buffer 2291 places 8 bytes of data on the upper 8 bytes of streaming data bus 2211, and the opcode causes engine 2172 to accept these bytes. Streaming output engine 2172 operates as described above to transfer the packet data to cache memory 2052 (step 2306).

Sequencer 2152 also resets the bundle ready signal (step 2308). Sequencer 2152 resets the bundle ready signal, so the signal can be employed again once buffer 2291 accumulates a sufficient number of bytes. Sequencer 2152 clears the bundle ready signal by performing a store operation to a control register in sequencer interface 2292 in RxMAC 2170.

Next, sequencer 2152 determines whether bytes remain to be transferred out of RxMAC 2170 (step 2310). Sequencer 2152 makes this determination by monitoring the end of packet signal from RxMAC 2170. If RxMAC 2170 has not asserted the end of packet signal, sequencer 2152 begins monitoring the bundle ready signal again (step 2304). If RxMAC 2170 has asserted the end of packet signal (step 2310), sequencer 2152 issues the done signal to streaming output engine 2172 (step 2314).

Once the done signal is issued, sequencer 2152 examines the abort signal in RxMAC 2170 (step 2309). If the abort signal is asserted, sequencer 2152 performs an abort operation (step 2313). After performing the abort operation, sequencer 2152 examines the interrupt signal in RxMAC 2170 (step 2314). If the interrupt signal is set, sequencer 2152 executes a responsive interrupt service routine ("ISR") (step 2317). After the ISR or if the interrupt is not set, sequencer 2152 returns to initialize the streaming output engine for another reception (step 2302).

If the abort signal was not set (step 2309), sequencer 2152 waits for streaming output engine 2172 to deassert the busy signal (step 2316). After sensing the busy signal is deasserted, sequencer 2152 examines the interrupt signal in RxMAC 2170 (step 2311). If the interrupt is asserted, sequencer 2152 performs a responsive ISR (step 2315). After the responsive ISR or if the interrupt was not asserted, sequencer 2152 performs a descriptor operation (step 2318). As part of the descriptor operation, sequencer 2152 retrieves status information from sequencer interface 2292 in RxMAC 2170 and writes the status to a descriptor field corresponding to the received packet, as will be described below. Sequencer 2152 also determines the address for the next receive packet and writes this value in a next address descriptor field. Once the descriptor operation is complete, sequencer 2152 initializes streaming output engine 2172 (step 2302) as described above. This enables MPU 2010 to receive another packet into memory.

Figure 32:
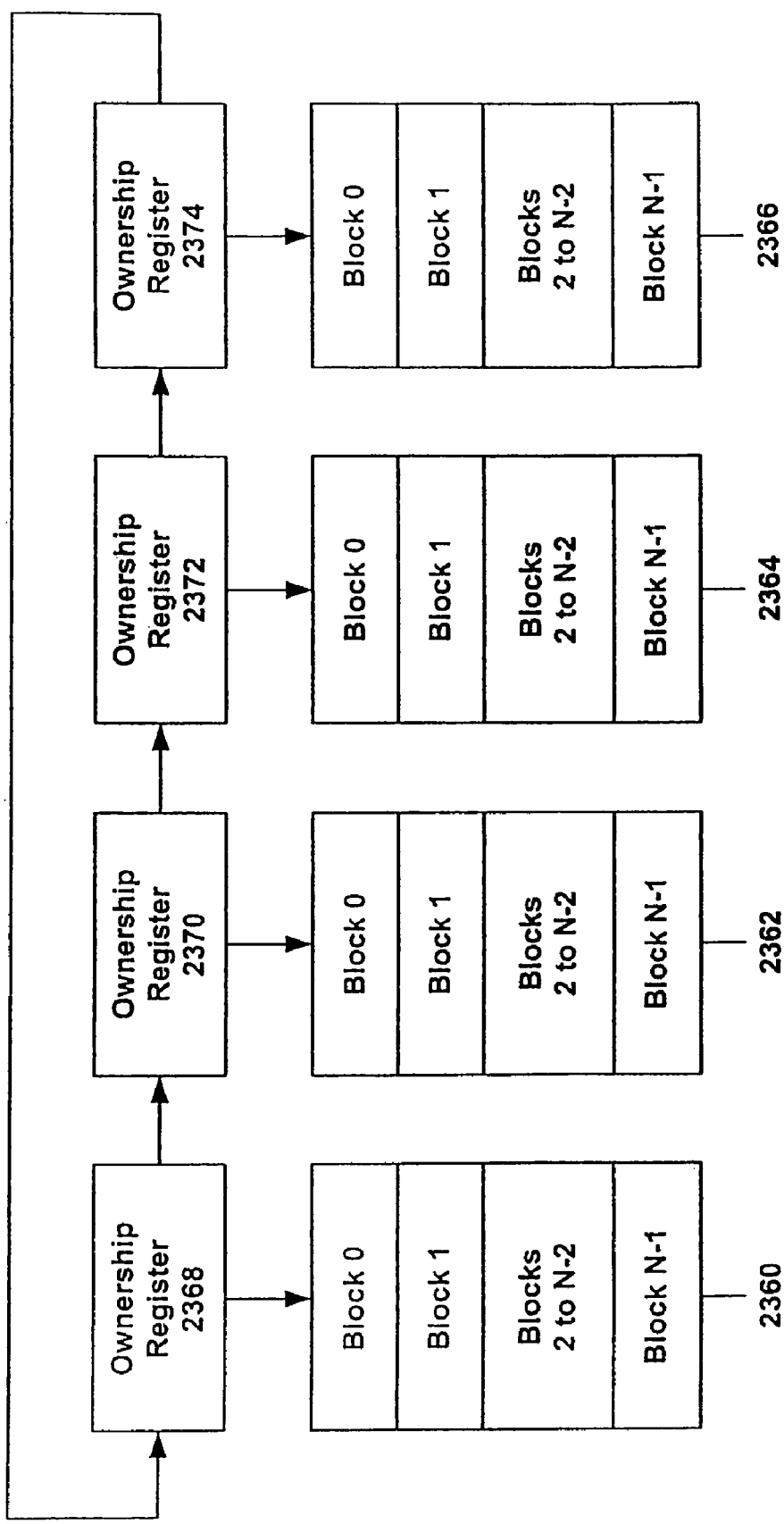
FIG. 32 shows a logical representation of a data management scheme for received data packets in one embodiment of the present invention.

FIG. 32 provides a logical representation of one data management scheme for use in embodiments of the present invention. During sequencer initialization (step 2300), the data structure shown in FIG. 32 is established. The data structure includes entries 2360, 2362, 2364, and 2366, which are mapped into MPU 2010 memory. Each entry includes N blocks of bytes. Sequencer 2152 maintains corresponding ownership registers 2368, 2370, 2372, and 2374 for identifying ownership of entries 2360, 2362, 2364, and 2366, respectively.

In one embodiment, each entry includes 32 blocks, and each block includes 512 bytes. In one such embodiment, blocks 0 through N−1 are contiguous in memory and entries 2360, 2362, 2364, and 2366 are contiguous in memory.

Streaming output engine 2172 stores data received from RxMAC 2170 in entries 2360, 2362, 2364, and 2366. CPU 2060 retrieves the received packets from these entries. As described with reference to FIG. 31, sequencer 2152 instructs streaming output engine 2172 where to store received data (step 2302). Sequencer 2152 provides streaming input engine 2172 with a start address offset from the beginning of a block in an entry owned by sequencer 2152. In one embodiment, the offset includes the following fields: 1) Descriptor—for storing status information regarding the received packet; and 2) Next Packet Pointer—for storing a pointer to the block that holds the next packet. In some instances reserved bytes are included after the Next Packet Pointer.

As described with reference to FIG. 31, sequencer 2152 performs a descriptor operation (step 2318) to write the Descriptor and Next Packet Pointer fields. Sequencer 2152 identifies the Next Packet Pointer by counting the number of bytes received by RxMAC 2170. This is achieved in one embodiment by counting the number of bundle ready signals (step 2304) received for a packet. In one embodiment, sequencer 152 ensures that the Next Packet Pointer points to the first memory location in a block. Sequencer 2152 retrieves information for the Descriptor field from sequencer interface 2292 in RxMAC 2170 (FIG. 30).

In one embodiment, the Descriptor field includes the following: 1) Frame Length—indicating the length of the received packet; 2) Frame Done—indicating the packet has been completed; 3) Broadcast Frame—indicating whether the packet has a broadcast address; 4) Multicast Frame—indicating whether the packet is a multicast packet supported by RxMAC 2170; 5) Address Match—indicating whether an address match occurred for the packet; 6) Frame Error—indicating whether the packet had a reception error; and 7) Frame Error Type—indicating the type of frame error, if any. In other embodiments, additional and different status information is included in the Descriptor field.

Streaming output engine 2172 stores incoming packet data into as many contiguous blocks as necessary. If the entry being used runs out of blocks, streaming output engine 2172 buffers data into the first block of the next entry, provided sequencer 2152 owns the entry. One exception to this operation is that streaming output engine 2172 will not split a packet between entry 2366 and 2360.

In one embodiment, 256 bytes immediately following a packet are left unused. In this embodiment, sequencer 2152 skips a block in assigning the next start address (step 2318 and step 2302) if the last block of a packet has less than 256 bytes unused.

After initialization (step 2300), sequencer 2152 possesses ownership of entries 2360, 2362, 2364, and 2366. After streaming output engine 2172 fills an entry, sequencer 2152 changes the value in the entry's corresponding ownership register to pass ownership of the entry to CPU 2060. Once CPU 2060 retrieves the data in an entry, CPU 2060 writes the entry's corresponding ownership register to transfer entry ownership to sequencer 2152. After entry 2366 is filled, sequencer 2152 waits for ownership of entry 360 to be returned before storing any more packets.

6. TxMAC and Packet Transmission a. TxMAC

Figure 33:
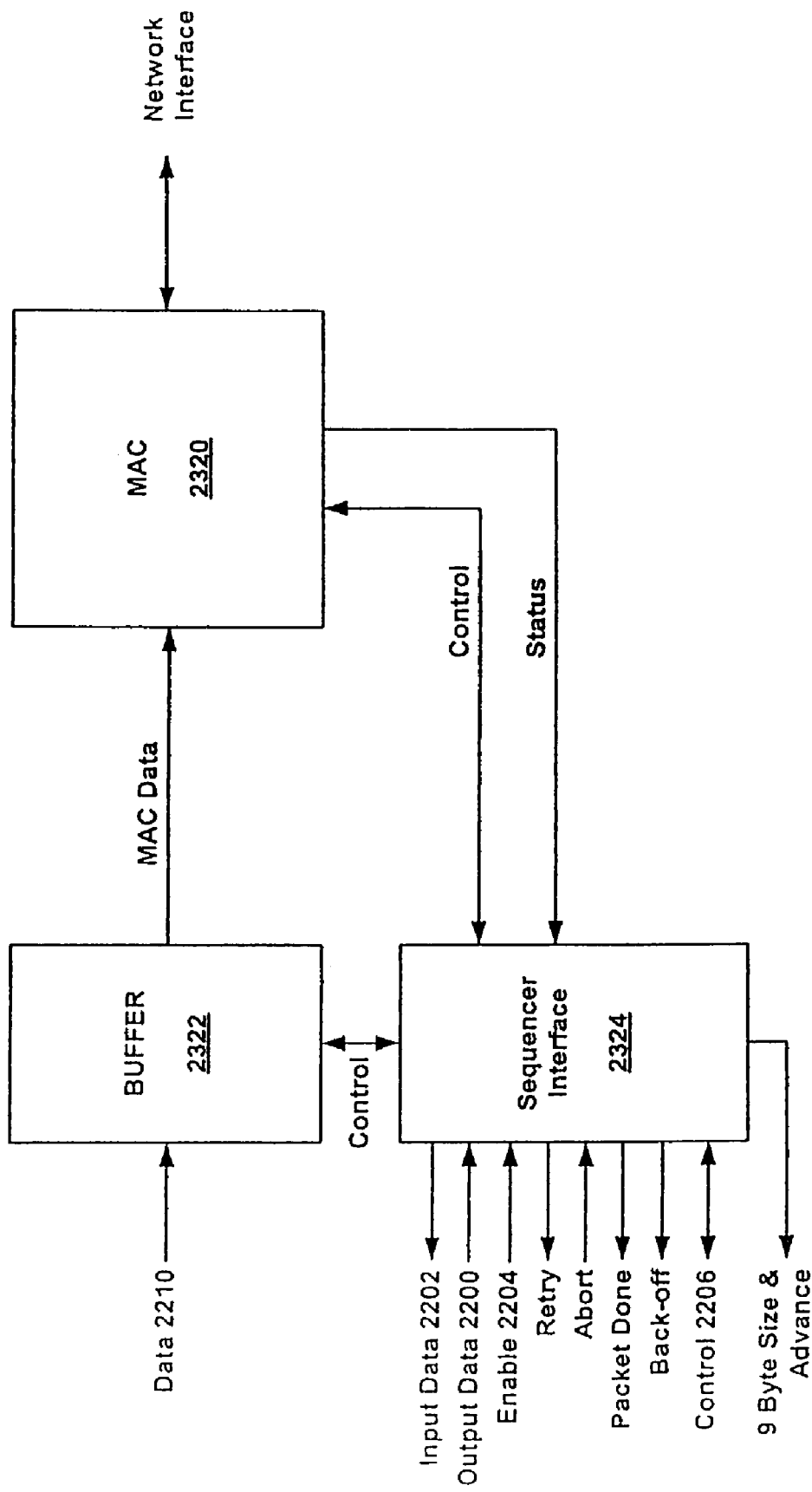
FIG. 33 shows one embodiment of a transmission media access controller engine in the coprocessors shown in FIG. 24c.

FIG. 33 illustrates one embodiment of TxMAC 2160 in accordance with the present invention. TxMAC 2160 transfers data from MPU 2010 to a network interface for transmission onto a communications medium. TxMAC 2160 operates in conjunction with streaming input engine 2154 to directly transfer data from cache memory to a network interface, without first being stored in main memory 2026.

TxMAC 2160 includes media access controller ("MAC") 2320, buffer 2322, and sequencer interface 2324. In operation, MAC 2320 is coupled to a communications medium through a physical layer device (not shown) to transmit network data, such as data packets. As with MAC 2290, MAC 2320 performs the media access controller operations required by the network protocol governing data transfers on the coupled communications medium. Example of MAC transmit operations include, 1) serializing outgoing data packets; 2) applying FCS checksums; and 3) detecting packet transmission errors.

In one embodiment, MAC 2320 conforms to the IEEE 802.3 Standard for a communications network supporting GMII Gigabit Ethernet. In one such embodiment, the MAC 3220 network interface includes the following signals from the IEEE 802.3z Standard: 1) TXD—an output from MAC 2320 providing 8 bits of transmit data; 2) TX_EN—an output from MAC 2320 indicating TXD has valid data; 3) TX_ER—an output of MAC 2320 indicating a coding violation on data received by MAC 2320; 4) COL—an input to MAC 2320 indicating there has been a collision on the coupled communications medium; 5) GTX_CLK—an output from MAC 2320 providing a 125 MHz clock timing reference for TXD; and 6) TX_CLK—an output from MAC 2320 providing a timing reference for TXD when the communications network operates at 10 megabits per second or 100 megabits per second.

One of ordinary skill will recognize that in alternate embodiments of the present invention MAC 2320 includes interfaces to physical layer devices conforming to different network standards. In one such embodiment, MAC 2320 implements a network interface for the IEEE 802.3 standard for MII 2100 megabit per second Ethernet.

In one embodiment of the invention, TxMAC 2160 also transmits data packets to a point-to-point link with a device that couples MPUs together, such as cross-bar switches 3010 and 3110 described below with reference to FIGS. 36-45. In one such embodiment, the point-to-point link includes signaling that conforms to the GMII MAC interface specification.

MAC 2320 is coupled to buffer 2322 to receive framed words for data packets. In one embodiment, each word contains 8 bits, while in other embodiments alternate size words are employed. Buffer 2322 receives data words from streaming data bus 2210. Streaming input engine 2154 retrieves the packet data from memory, as will be described below in greater detail. In one such embodiment, buffer 2322 is a first-in-first-out ("FIFO") buffer.

As explained above, MAC 2320 monitors outgoing data packet transmissions for errors. In one embodiment, MAC 2320 provides indications of whether the following occurred for each packet: 1) collisions; 2) excessive collisions; and 3) underflow of buffer 2322.

TxMAC 2160 communicates with sequencer 2150 through sequencer interface 2324. Sequencer interface 2324 is coupled to receive data on sequencer output bus 2200 and provide data on sequencer input bus 2202. Sequencer interface 2324 is coupled to receive a signal from enable interface 2204 to inform TxMAC 2160 whether it is activated.

Sequencer 2150 programs TxMAC 2160 for operation through control registers (not shown) in sequencer interface 2324. Sequencer 2150 also retrieves control information about TxMAC 2160 by querying these same registers. Sequencer interface 2324 is coupled to MAC 2320 and buffer 2322 to provide and collect control register information.

The control registers in sequencer interface 2324 are coupled to input data bus 2202 and output data bus 2200. The registers are also coupled to control interface 2206 to provide for addressing and controlling register store and load operations. Sequencer 2150 writes one of the control registers to define the mode of operation for TxMAC 2160. In one mode, TxMAC 2160 is programmed for connection to a communications network and in another mode TxMAC 2160 is programmed to the above-described point-to-point link to another device. Sequencer 2150 employs a register in TxMAC's set of control registers to indicate the number of bytes in the packet TxMAC 2160 is sending.

Sequencer interface 2324 provides the following signals to sequencer control interface 2206: 1) Retry—indicating a packet was not properly transmitted and will need to be resent; 2) Packet Done—indicating the packet being transmitted has left MAC 2320; and 3) Back-off—indicating a device connecting MPUs in the above-described point-to-point mode cannot receive a data packet at this time and the packet should be transmitted later.

Sequencer 2150 receives the above-identified signals and responds by executing operations that correspond to the signals—this will be described in greater detail below. In one embodiment, sequencer 2150 executes corresponding microcode routines in response to the signals. Once sequencer 2150 receives and responds to one of the above-described signals, sequencer 2150 performs a write operation to a control register in sequencer interface 2320 to deassert the signal.

Sequencer 2324 receives an Abort signal from sequencer control interface 2206. The Abort signal indicates that excessive retries have been made in transmitting a data packet and to make no further attempts to transmit the packet. Sequencer interface 2324 is coupled to MAC 2320 and buffer 2322 to receive information necessary for controlling the above-described signals and forwarding instructions from sequencer 2150.

In one embodiment, sequencer interface 2324 also provides the 9 Byte Size Advance signal to streaming input engine 2154.

b. Packet Transmission

Figure 34:
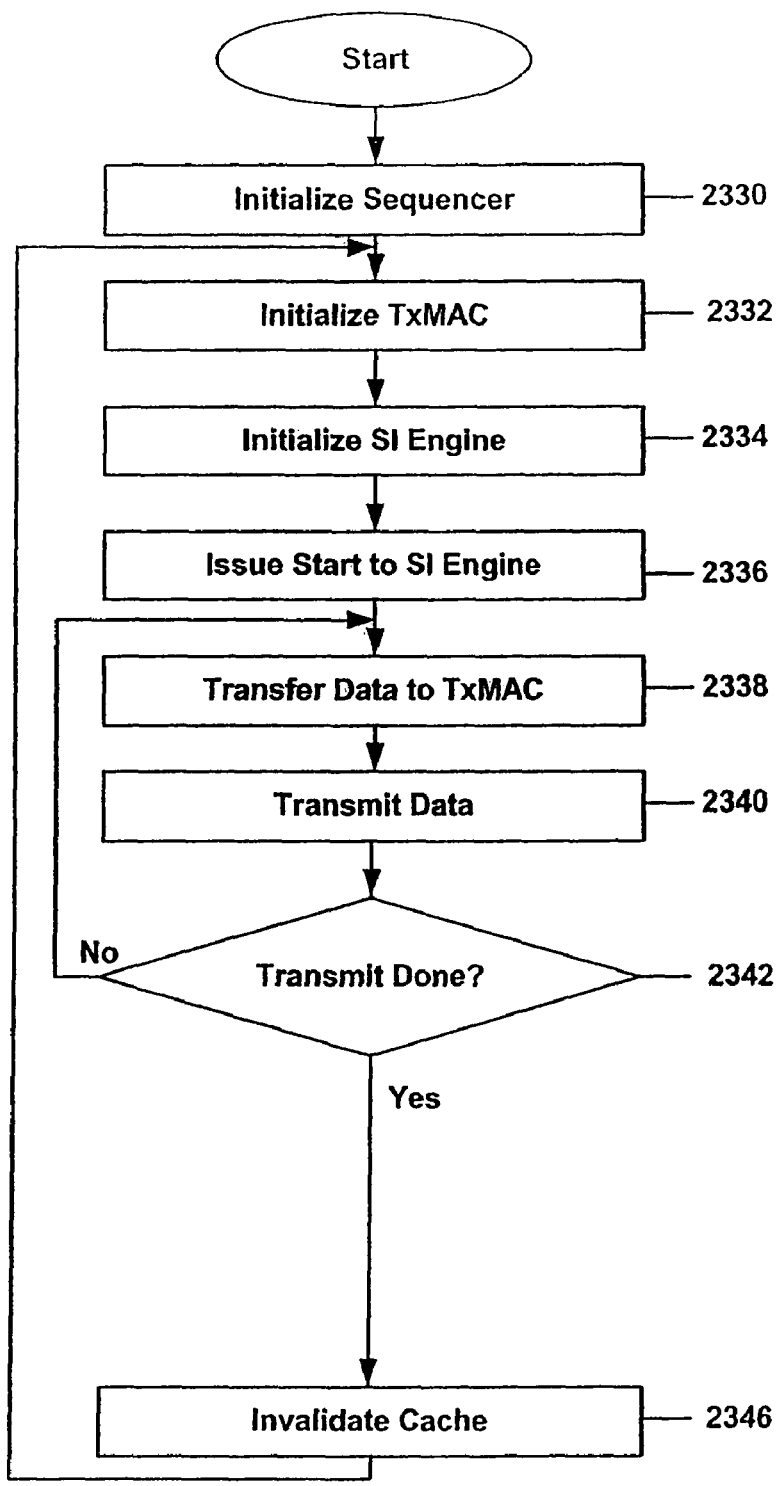
FIG. 34 illustrates a packet transmission process in accordance with one embodiment of the present invention.

FIG. 34 illustrates a process MPU 2010 employs in one embodiment of the present invention to transmit packets. At the outset, CPU 2060 initializes sequencer 2150 (step 2330). CPU 2060 instructs sequencer 2150 to transmit a packet and provides sequencer 2150 with the packet's size and address in memory. Next, sequencer 2150 initializes TxMAC 2160 (step 2332) and streaming input engine 2154 (step 2334).

Sequencer 2150 writes to control registers in sequencer interface 2324 to set the mode of operation and size for the packet to be transmitted. Sequencer 2150 provides the memory start address, data size, and mode bits to streaming input engine 2154. Sequencer 2150 also issues the Start signal to streaming input engine 2154 (step 2336), which results in streaming input engine 2154 beginning to fetch packet data from data cache 2052.

Sequencer 2150 and streaming input engine 2154 combine to transfer packet data to TxMAC 2160 (step 2338). TxMAC 160 supplies the 9 Byte Size Signal to transfer data one byte at a time from streaming input engine 2154 to buffer 2322 over streaming data bus 2210. Upon receiving these bytes, buffer 2322 begins forwarding the bytes to MAC 2320, which serializes the bytes and transmits them to a network interface (step 2340). As part of the transmission process, TxMAC 2160 decrements the packet count provided by sequencer 2150 when a byte is transferred to buffer 2322 from streaming input engine 2154. In an alternate embodiment, sequencer 150 provides the 9 Byte Size Signal.

During the transmission process, MAC 2320 ensures that MAC level operations are performed in accordance with appropriate network protocols, including collision handling. If a collision does occur, TxMAC 2320 asserts the Retry signal and the transmission process restarts with the initialization of TxMAC 2160 (step 2332) and streaming input engine 2154 (step 2334).

While TxMAC 2160 is transmitting, sequencer 2150 waits for TxMAC 2160 to complete transmission (step 2342). In one embodiment, sequencer 2150 monitors the Packet Done signal from TxMAC 2160 to determine when transmission is complete. Sequencer 2150 can perform this monitoring by polling the Packet Done signal or coupling it to an interrupt input.

Once Packet Done is asserted, sequencer 2150 invalidates the memory location where the packet data was stored (step 2346). This alleviates the need for MPU 2010 to update main memory when reassigning the cache location that stored the transmitted packet. In one embodiment, sequencer 2150 invalidates the cache location by issuing a line invalidation instruction to data cache 2052.

After invalidating the transmit packet's memory location, sequencer 2150 can transmit another packet. Sequencer 2150 initializes TxMAC 2160 (step 2332) and streaming input engine 2154 (step 2334) and the above-described transmission process is repeated.

In one embodiment of the invention, the transmit process employs a bandwidth allocation procedure for enhancing quality of service. Bandwidth allocation allows packets to be assigned priority levels having a corresponding amount of allocated bandwidth. In one such embodiment, when a class exhausts its allocated bandwidth no further transmissions may be made from that class until all classes exhaust their bandwidth—unless the exhausted class is the only class with packets awaiting transmission.

Figure 35:
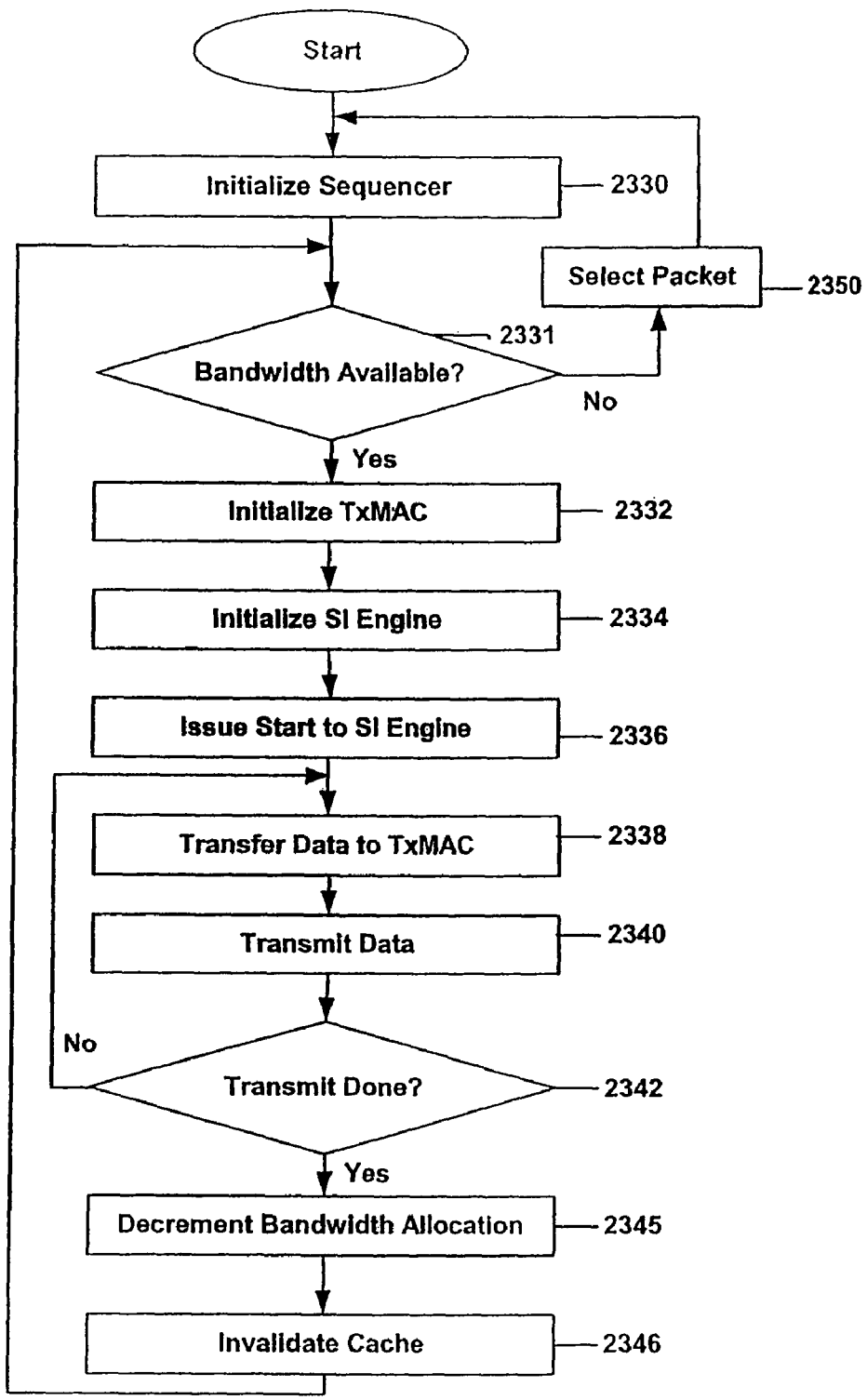
FIG. 35 illustrates a packet transmission process in accordance with an alternate embodiment of the present invention.

Implementing such an embodiment can be achieved by making the following additions to the process described in FIG. 34, as shown in FIG. 35. When CPU 2060 initializes sequencer 2150 (step 2330), CPU 2060 assigns the packet to a bandwidth class. Sequencer 2150 determines whether there is bandwidth available to transmit a packet with the assigned class (step 2331). If not, sequencer 2150 informs CPU 2060 to select a packet from another class because the packet's bandwidth class is oversubscribed. The packet with the oversubscribed bandwidth class is selected at a later time (step 2350). If bandwidth is available for the assigned class, sequencer 2150 continues the transmission process described for FIG.

34 by initializing TxMAC 2160 and streaming input engine 2154. After transmission is complete sequencer 2150 decrements an available bandwidth allocation counter for the transmitted packet's class (step 2345).

In one embodiment, MPU 2010 employs 4 bandwidth classes, having initial bandwidth allocation counts of 128, 64, 32, and 16. Each count is decremented by the number of 16 byte segments in a transmitted packet from the class (step 2345). When a count reaches or falls below zero, no further packets with the corresponding class are transmitted—unless no other class with a positive count is attempting to transmit a packet. Once all the counts reach zero or all classes attempting to transmit reach zero, sequencer 2150 resets the bandwidth allocation counts to their initial count values.

E. Connecting Multiple MPU Engines

In one embodiment of the invention, MPU 2010 can be connected to another MPU using TxMAC 2160 or RxMAC 2170. As described above, in one such embodiment, TxMAC 2160 and RxMAC 2170 have modes of operation supporting a point-to-point link with a cross-bar switch designed to couple MPUs. Two such cross-bar switches are cross-bar switch 3010 and cross-bar switch 3110 disclosed below with reference to FIGS. 36-45. In alternate embodiments, RxMAC 2170 and TxMAC 2160 support interconnection with other MPUs through bus interfaces and other well know linking schemes.

In one point-to-point linking embodiment, the network interfaces of TxMAC 2160 and RxMAC 2170 are modified to take advantage of the fact that packet collisions don't occur on a point-to-point interface. Signals specified by the applicable network protocol for collision, such as those found in the IEEE 802.3 Specification, are replaced with a hold-off signal.

In such an embodiment, RxMAC 2170 includes a hold-off signal that RxMAC 2170 issues to the interconnect device to indicate RxMAC 2170 cannot receive more packets. In response, the interconnect device will not transmit any more packets after the current packet, until hold-off is deasserted. Other than this modification, RxMAC 2170 operates the same as described above for interfacing to a network.

Similarly, TxMAC 2160 includes a hold-off signal input in one embodiment. When TxMAC 2160 receives the hold-off signal from the interconnect device, TxMAC halts packet transmission and issues the Back-off signal to sequencer 2150. In response, sequencer 2150 attempts to transmit the packet at a later time. Other than this modification, TxMAC 2160 operates the same as described above for interfacing to a network.

III. Cross Bar Switch

A. System Employing a Cross-Bar Switch

Figure 36:
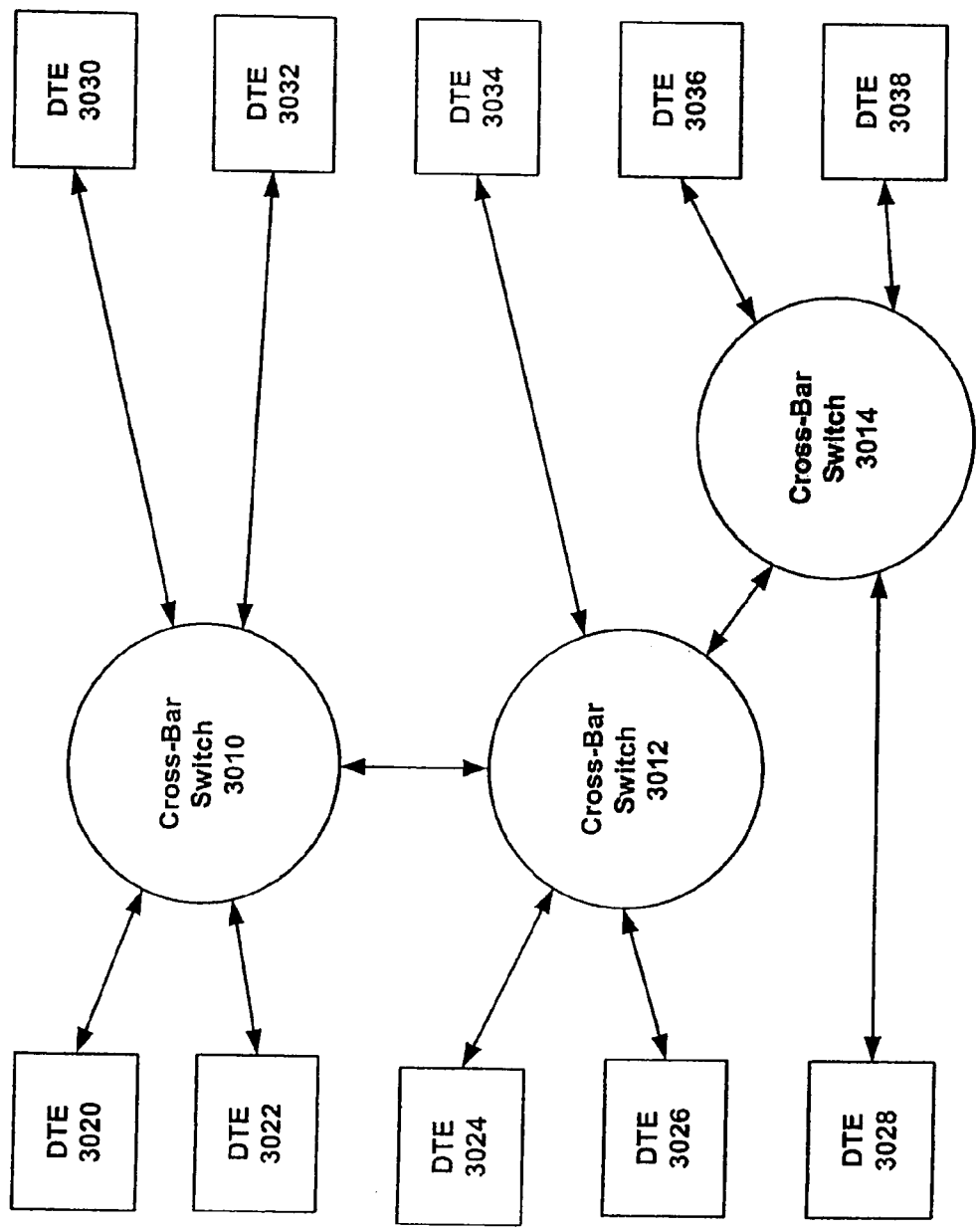
FIG. 36 depicts a system employing cross-bar switches in accordance with the present invention.

FIG. 36 illustrates a system employing cross-bar switches 3010, 3012, and 3014, which operate in accordance with the present invention. Cross-bar switch 3010 is coupled to transfer packets between cross-bar switch 3012 and data terminal equipment ("DTE") 3020, 3022, 3030 and 3032. Cross-bar switch 3012 is coupled to transfer packets between cross-bar switches 3010 and 3014 and DTE 3024, 3026, and 3034. Cross-bar switch 3014 is coupled to transfer packets between cross-bar switch 3012 and DTE 3028, 3036, and 3038. In one embodiment of the present invention, switch elements 200 in FIG. 4 are cross-bar switches 3010.

DTE is a generic name for a computing system including a processing engine, ranging from a complex multi-processor computer system to a stand-alone processing engine. At least one example of a DTE is multi-processor unit 2010 described above with reference to FIGS. 16-25.

In one embodiment, all of the elements appearing in FIG. 36 reside in the same system and are coupled together by intra-system communications links. Alternatively, the elements in FIG. 36 are located in separate systems and coupled together over a communications network. An example of one such communications network is a network conforming to the Institute of Electrical and Electronic Engineers ("IEEE") 802.3 Standard employing GMII Gigabit Ethernet signaling. Intra-system communications links employing such signaling standards can also be employed.

B. Cross-Bar Switch

Figure 37:
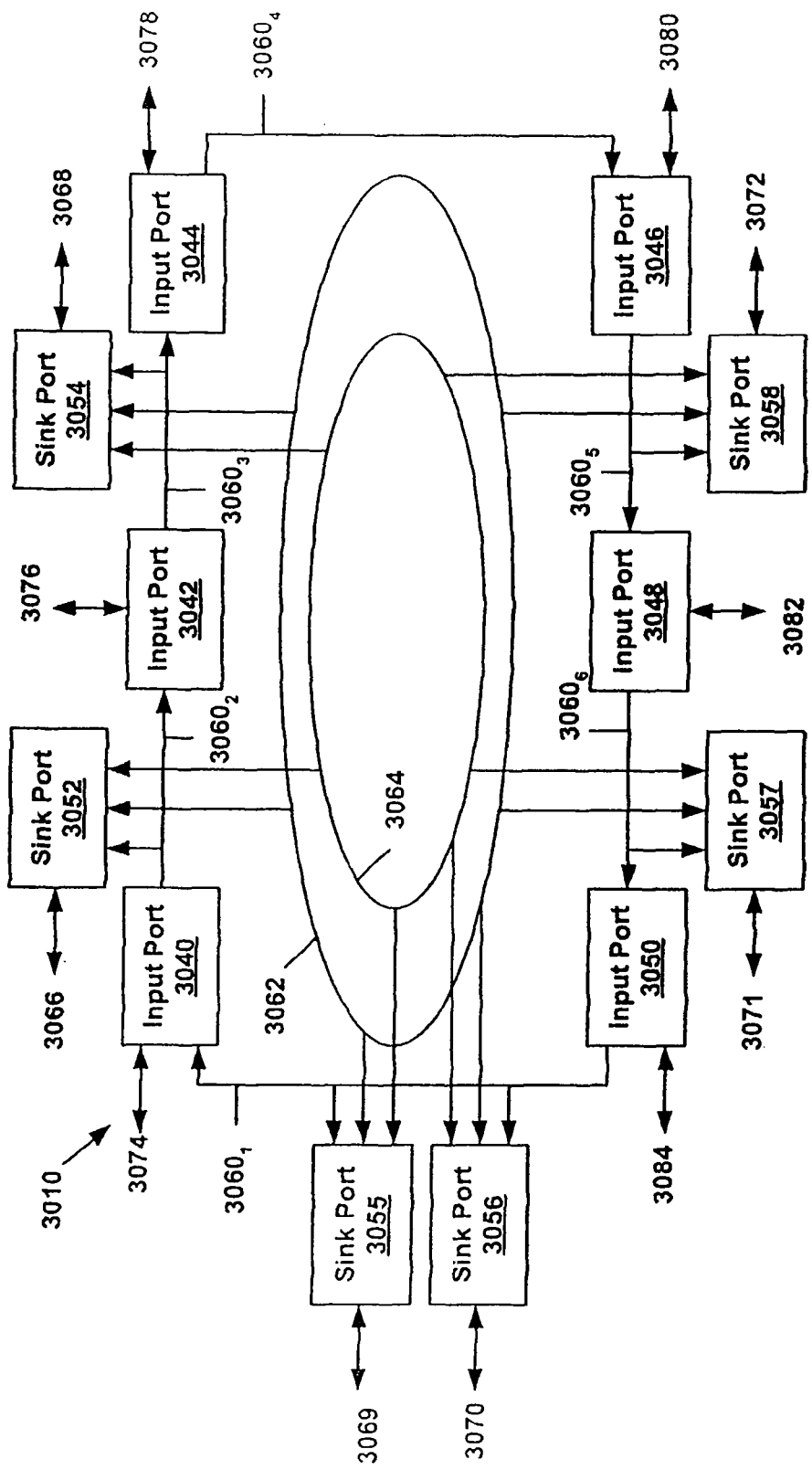
FIG. 37 shows one embodiment of a cross-bar switch in accordance with the present invention.

FIG. 37 depicts circuitry for one embodiment of cross-bar switch 3010 in accordance with the present invention. Although explained in detail below with reference to cross-bar switch 3010, the circuitry shown in FIG. 37 is also applicable to cross-bar switches 3012 and 3014 in FIG. 36. In one embodiment, cross-bar switch 3010 is implemented in an integrated circuit. Alternatively, cross-bar switch 3010 is not implemented in an integrated circuit.

Cross-bar switch 3010 includes input ports 3040, 3042, 3044, 3046, 3048, and 3050 for receiving data packets on communications links 3074, 3076, 3078, 3080, 3082, and 3084, respectively. Each communications link 3074, 3076, 3078, 3080, 3082, and 3084 is designed for coupling to a data source, such as a DTE or cross-bar device, and supports protocol and signaling for transferring packets. One such protocol and signaling standard is the IEEE 802.3 Standard for a communications network supporting GMII Gigabit Ethernet.

Each input port is coupled to another input port via data ring 3060. Data ring 3060 is formed by data ring segments $3060_1$-$3060_6$, which each couple one input port to another input port. Segment $3060_1$ couples input port 3050 to input port 3040. Segment $3060_2$ couples input port 3040 to input port 3042. Segment $3060_3$ couples input port 3042 to input port 3044. Segment $3060_4$ couples input port 3044 to input port 3046. Segment $3060_5$ couples input port 3046 to input port 3048. Segment $3060_6$ couples input port 3048 to input port 3050, completing data ring 3060.

When an input port receives a data packet on a communications link, the input port forwards the data packet to another input port via the data ring segment coupling the input ports. For example, input port 3040 forwards data received on communications link 3074 to input port 3042 via ring segment $3060_2$. Input port 3042 forwards data received on communications link 3076 to input port 3044 via ring segment $3060_3$. Input port 3044 forwards data received on communications link 3078 to input port 3046 via ring segment $3060_4$. Input port 3046 forwards data received on communications link 3080 to input port 3048 via ring segment $3060_5$. Input port 3048 forwards data received on communications link 3082 to input port 3050 via ring segment $3060_6$. Input port 3050 forwards data received on communications link 3084 to input port 3040 via ring segment $3060_1$.

Input ports also forward data received on a data ring segment to another input port. For example, input port 3040 forwards data received on ring segment $3060_1$ to input port 3042 via ring segment $3060_2$. Input port 3042 forwards data received on ring segment $3060_2$ to input port 3044 via ring segment $3060_3$. Input port 3044 forwards data received on ring segment $3060_3$ to input port 3046 via ring segment $3060_4$. Input port 3046 forwards data received on ring segment $3060_4$ to input port 3048 via ring segment $3060_5$. Input port 3048 forwards data received on ring segment $3060_5$ to input port 3050 via ring segment $3060_6$. Input port 3050 forwards data received on ring segment $3060_6$ to input port 3040 via ring segment $3060_1$.

Cross-bar switch 3010 also includes data rings 3062 and 3064. Although not shown in detail, data rings 3062 and 3064 are the same as data ring 3060, each coupling input ports (not shown) together via ring segments. In some embodiments, however, data rings 3060, 3062, and 3064 include different numbers of segments supporting different numbers of input ports.

Cross-bar 3010 includes sink ports 3052, 3054, 3055, 3056, 3057, and 3058 for transmitting data packets onto communications links 3066, 3068, 3069, 3070, 3071, and 3072, respectively. Sink ports 3052, 3054, 3055, 3056, 3057, and 3058 are each coupled to data rings 3060, 3062, and 3064 to receive data that input ports supply to rings 3060, 3062, and 3064. Sink ports 3052, 3054, 3055, 3056, 3057, and 3058 snoop data on data rings 3060, 3062, and 3064 to determine whether the data is targeted for a device coupled to the sink port's communication link, such as a DTE or cross-bar switch. Each communications link 3066, 3068, 3069, 3070, 3071, and 3072 is designed for coupling to a data target, such as a DTE or cross-bar device, and supports protocol and signaling for transferring packets. One such protocol and signaling standard is the IEEE 802.3 Standard for a communications network supporting GMII Gigabit Ethernet.

Sink ports 3052, 3054, 3055, 3056, 3057, and 3058 are each capable of supporting data transfers to multiple target addresses on their respective communications links—allowing cross-bar switch 3010 to implicitly support multicast addressing. Sink ports 3052, 3054, 3055, 3056, 3057, and 3058 are each capable of simultaneously receiving multiple data packets from rings 3060, 3062, and 3064 and transferring the data to the identified targets—allowing cross-bar switch 3010 to be non-blocking when multiple input ports receive data packets destined for the same target. This functionality provides advantages over traditional cross-bar switches, which only support one target address per output port and one packet at a time for a target.

Figure 38:
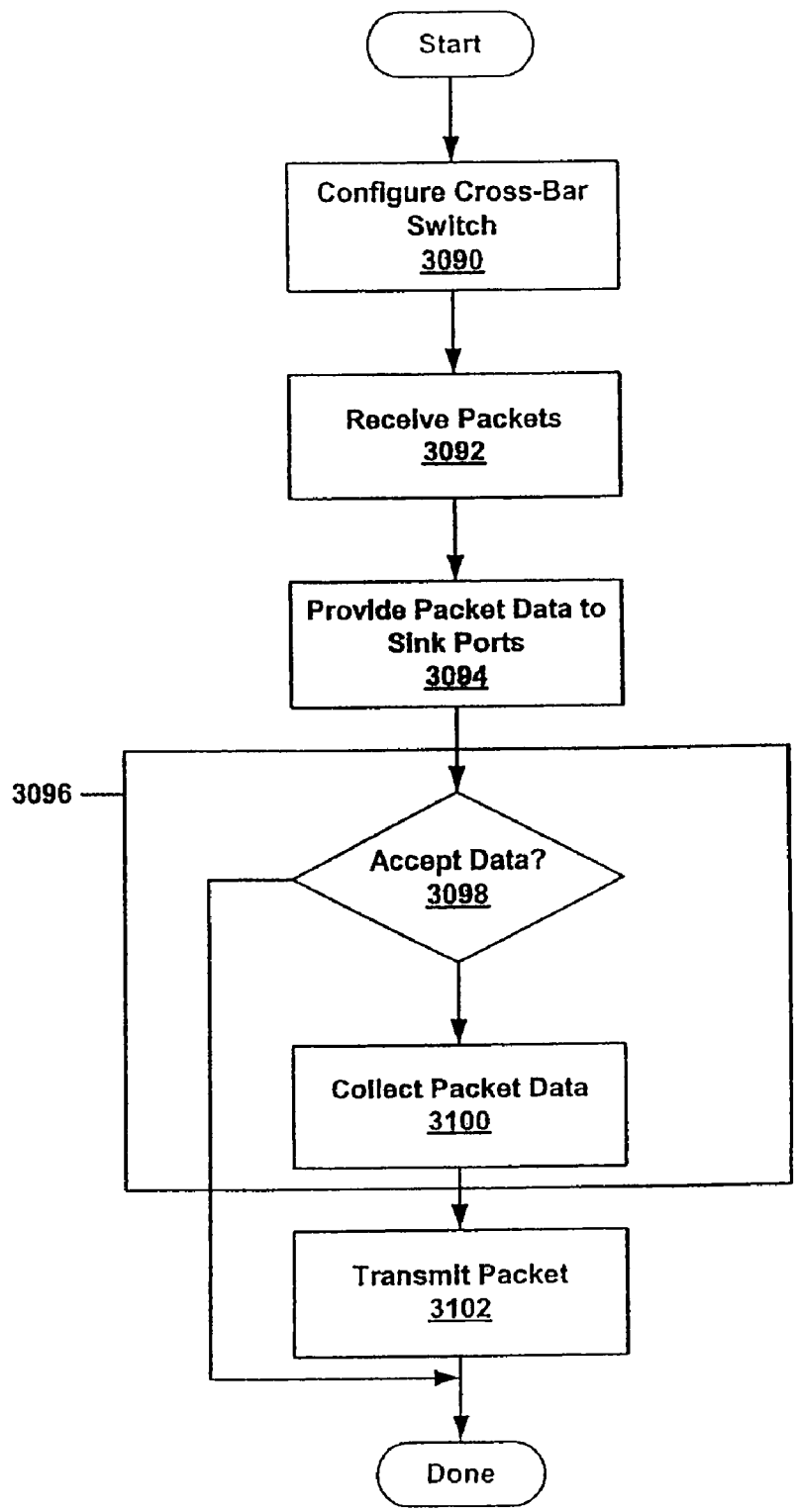
FIG. 38 shows a process employed by a cross-bar switch in accordance with the present invention.

FIG. 38 depicts a flow diagram illustrating a series of steps performed by cross-bar switch 3010. A user configures cross-bar switch 3010 for operation (step 3090). In operation, the input ports in cross-bar switch 3010 receive packets on their respective communications links (step 3092). The input ports provide the packets to the sink ports in cross-bar switch 3010. In cross-bar switch 3010 in FIG. 37, the input ports forward the packet data to either data ring 3060, 3062, or 3064 for retrieval by the sink ports (step 3094).

Each sink port performs a snooping and collection process—identifying and storing packets addressed to targets supported by the sink port (step 3096). Each sink port snoops the packet data on rings 3060, 3062, and 3064 to determine whether to accept the data (step 3098). If a sink port detects that a packet fails to meet acceptance criteria, then the sink port does not accept the packet. If a sink port determines that a packet meets acceptance criteria, then the sink port collects the packet data from ring 3060, 3062, or 3064 (step 3100). Cross-bar switch 3010 transmits packets collected in the sink ports to targeted destinations via the sink ports' respective communication links (step 3102). Further details regarding sink port operation appear below, including the acceptance and collection of packets.

In configuration (step 3090), a user sends configuration packets to at least one input port in cross-bar switch 3010 for delivery to a designated sink port. Configuration packets include configuration settings and instructions for configuring the targeted sink port. For example, input port 3040 forwards a configuration packet to data ring 3060 targeted for sink port 3052. Sink port 3052 retrieves the configuration packet from ring 3060 and performs a configuration operation in response to the configuration packet. In some instances, a designated sink port responds to a configuration packet by sending a response packet, including status information. Alternatively, the designated sink port responds to the configuration packet by writing configuration data into internal control registers.

Table I below shows a sink port configuration and status register structure in one embodiment of the present invention.

TABLE I

Sink Port Configuration and Status Register Structure

P
Port Address Table [31:0]
Port Address Table [63:32]
Port Address Table [95:64]
Port Address Table [127:96]
R
Retry Time [15:0]
FIFO Thresholds/Priority Weighting Values [23:0]
Total Packet Count
Configuration Packet Count
Port Enable Rejection Count
Packet Size Rejection Count
Bandwidth Allocation Rejection Count
Sink Overload Rejection Count The sink port registers provide the following configuration settings: 1) Port Enable ("P")—set to enable the sink port and deasserted to disable the sink port; 2) Port Address Table [127:0]—set bits identify the destination addresses associated with the sink port. For example, when bits 64, 87, and 123 are set, the sink port accepts data packets with those destination addresses; 3) Retry Mode ("R")—set to enable retry operation for the sink port and deasserted to disable retry operation (further details regarding retry operation appear below); 4) Retry Time [15:0]—set to indicate the period of time allowed for retrying a packet transmission; and 5) FIFO Thresholds and Priority Weighting Values [23:0]–set to identify FIFO thresholds and priority weighting values employed in bandwidth allocation management, which is described in detail below.

The sink port register block also maintains the following status registers: 1) Total Packet Count—indicating the number of non-configuration packets accepted by the sink port from data rings 3060, 3062, and 3064; 2) Configuration Packet Count—indicating the number of configuration packets received by cross-bar switch 3010; 3) Port Enable Rejection Count—indicating the number of packets having a destination address supported by the sink port, but rejected due to the sink port being disabled; 4) Packet Size Reject Count—indicating the number of packets rejected by the sink port because not enough storage room existed for them in the sink port; 5) Bandwidth Allocation Rejection Count—indicating the number of packets rejected by the sink port for bandwidth allocation reasons; 6) Sink Overload Rejection Count—indicating the number of packets rejected by the sink port because the sink port was already receiving a maximum allowable number of packets.

Figure 39:
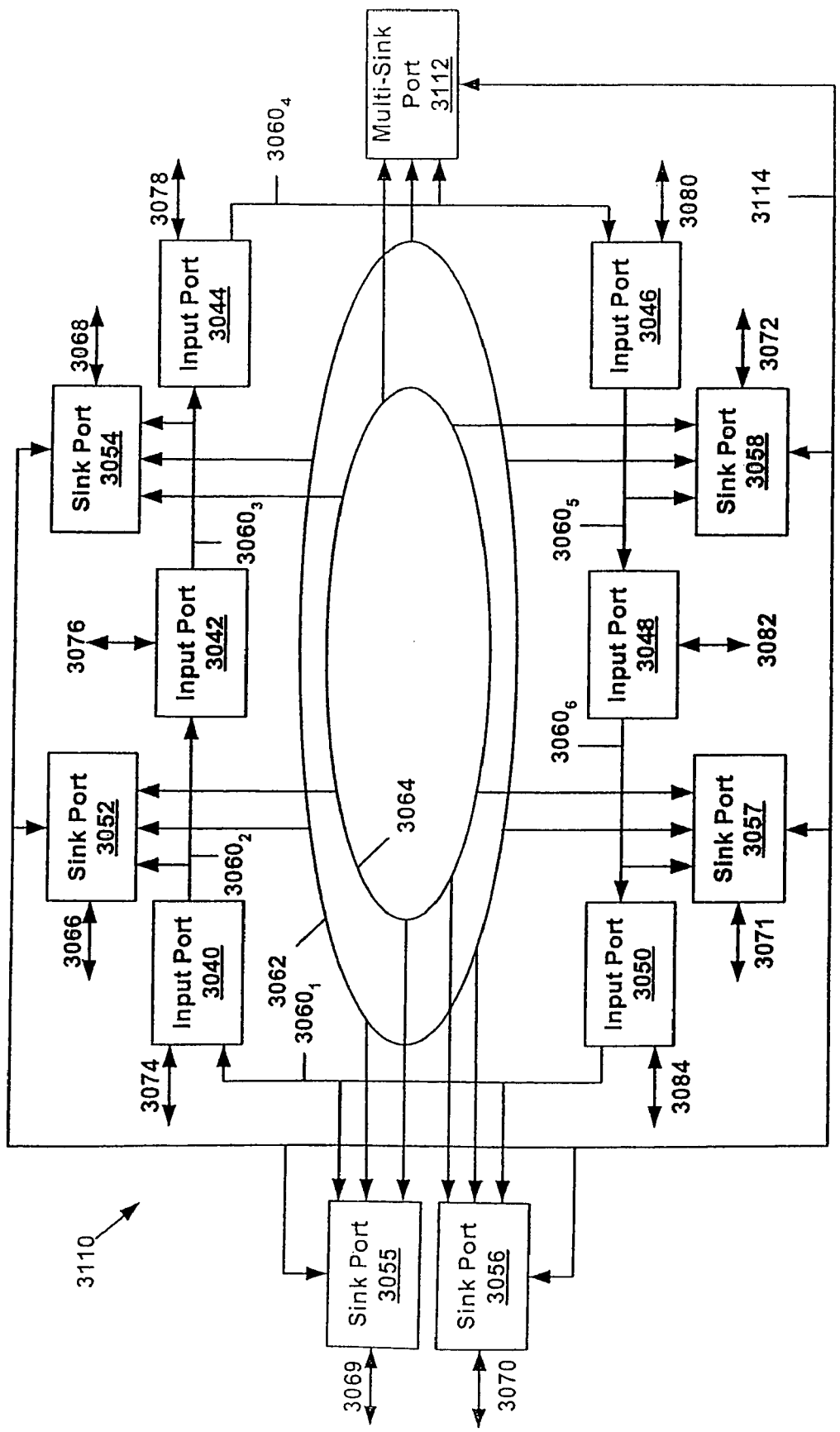
FIG. 39 illustrates an alternate embodiment of a cross-bar in accordance with the present invention.

FIG. 39 shows cross-bar switch 3110—an alternate version of cross-bar switch 3010, providing explicit support for multicast packets. In cross-bar switch 3110, the elements with the same reference numbers appearing in cross-bar switch 3010 operate as described for cross-bar switch 3010 with any additional functionality being specified below. Cross-bar switch 3110 includes multi-sink port 3112, which is coupled to sink ports 3052, 3054, 3055, 3056, 3057, and 3058 by interface 3114. Multi-sink port 3112 is also coupled to data rings 3060, 3062, and 3064. In one embodiment of the present invention, switching elements 200 in FIG. 4 are cross-bar switches 3110.

In operation, multi-sink port 3112 snoops data on rings 3060, 3062, and 3064. Multi-sink port 3112 accepts multicast packets that have destination addresses included within a set of addresses supported by multi-sink port 3112. Multi-sink port 3112 forwards accepted packets over interface 3114 to sink ports in cross-bar switch 3110 that have communication links leading to at least one of the addressed destinations. The sink ports then transfer the packets to their intended destinations. Greater details regarding the operation of multi-sink port 3112 appear below.

Like sink ports 3052, 3054, 3055, 3056, 3057, and 3058, multi-sink port 3112 also maintains a set of configuration and status registers. Table II below shows a register structure for multi-sink port 3112 in one embodiment of the present invention.

TABLE II

Multi-Sink Port Configuration and Status Register Structure

| | |
|---|---|
| Port Address Table [31:0] | T |
| Port Address Table [63:32] | |
| Port Address Table [95:64] | |
| Port Address Table [127:96] | |
| FIFO Thresholds/Priority Weighting Values [23:0] | |
| Total Packet Count | |
| Configuration Packet count | |
| Port Enable Rejection Count | |
| Packet Size Rejection Count | |
| Bandwidth Allocation Rejection Count | |
| Sink Overload Rejection Count | |
| Multicast Register 0 [19:0] | |
| ... | |
| Multicast Register 63 [19:0] | |

The multi-sink port registers with the same name as sink port registers perform the same function. The multi-sink port register block includes the following additional registers: 1) Multicast Timeout Select ("T")—set to indicate the maximum timeout for multicast packets. In one embodiment the maximum timeout is either 1,600 or 9,000 internal clock cycles of cross-bar switch 3110; and 2) Multicast Registers 0-63—each identifying a set of sink ports to be targeted in response to a multicast destination address.

In one embodiment, cross-bar 3110 includes 20 sink ports and each Multicast Register contains 20 corresponding bits. Each set bit indicates that the corresponding sink port is targeted to receive packets with destination addresses corresponding to the Multicast Resister's address. Multi-sink port 3112 accepts all packets with destination addresses selected in the Port Address Table and maps the last 6 bits of the destination address to a Multicast Register (See Table II). Further details about the operation of multi-sink port 3112 appear below.

The above-described implementations of cross-bar switches 3010 and 3110 are only two examples of cross-bar switches in accordance with the present invention. Many possible variations fall within the scope of the present invention. For example, in one embodiment of the present invention, rings 3060, 3062, and 3064 are each capable of linking 8 input ports together and have connections to 24 sink ports. In one such embodiment, cross-bar switch 3010 in FIG. 37 and cross-bar switch 3110 in FIG. 39 each include 20 input ports and 20 sink ports—leaving 4 input port slots unused and 4 sink port slots unused. In this embodiment, each sink port supports up to 128 target addresses and can simultaneously accept up to 7 data packets—6 from input ports and 1 from multi-sink port 3112. In alternate embodiments, there is no limit on the number of data packets simultaneously accepted by a sink port.

C. Data Rings

Rings 3060, 3062, and 3064 (FIGS. 37 and 49) include a data field and a control field. In one embodiment of the present invention, the data field is 8 bytes wide and the control field includes the following signals: 1) Data Valid—indicating whether the data field contains valid data; 2) Valid Bytes—indicating the number of valid bytes in the data field; 3) First Line—indicating whether the data field contains the first line of data from the packet supplied by the input port; 4) Last Line—indicating whether the data field contains the last line of data from the packet supplied by the input port; and 5) Source—identifying the input port supplying the packet data carried in the data field.

One with ordinary skill will recognize that different control signals and different data field widths can be employed in alternate embodiments of the present invention.

D. Packet Formats

Cross-bar switches 3010 and 3110 support the following 3 types of packets: 1) Data Packets; 2) Configuration Packets; and 3) Read Configuration Response Packets.

1. Data Packets

Cross-bar switches 3010 and 3110 employ data packets to transfer non-configuration information. Table III below illustrates the format of a data packet in one embodiment of the present invention.

TABLE III

Data Packet Format

| | | |
|---|---|---|
| 0 | Destination Address | |
| 1 | Size [7:0] | |
| 2 | Priority Level | Size [13:8] |
| 3 | | |
| 4 | | |
| 5 | | |
| 6 | | |
| 7 | | |
| 8-end | Payload | |

A data packet includes a payload and header. The header appears in the data packet's first 8 bytes (Bytes 0-7). The payload immediately follows the header. In one embodiment, the payload is a packet that complies with the IEEE 802.3 Standard for a data packet, except the preamble field is excluded. In one such embodiment, legal packet sizes range from 64 bytes to 9,216 bytes.

The header includes the following fields: 1) Destination Address—identifying the data packet's targeted destination; 2) Size [13:0]—providing the data packet's size in bytes; 3) Priority Level—providing a priority level for the data packet that is used in bandwidth allocation management. The remaining portion of the header is reserved.

In one embodiment, cross-bar switches 3010 and 3110 perform error checking to ensure that an incoming packet contains the number of bytes indicated in the packet's Size field. If there is an error, the packet will be flagged with an error upon subsequent transmission. In one such embodiment, input ports perform the size check and pass error information on to the sink ports.

2. Configuration Packets

Configuration packets carry configuration instructions and settings for cross-bar switches 3010 and 3110. Table IV below shows the format of a configuration packet in one embodiment of the present invention.

TABLE IV

Configuration Packet Format

| | |
|---|---|
| 0 | Configuration Identifier |
| 1 | |
| 2 | Cross-Bar Switch Identifier |
| ... | |
| 8 | Command |
| 9 | Configuration Register Address ("CRA") [7:0] |
| 10 | Port Identifier             CRA [10:8] |
| ... | |
| 16-63 | Data |

The configuration packet is 64 bytes long, allowing the entire packet to fit on either data ring 3060, 3062, or 3064. The configuration packet includes the following fields: 1) Configuration Identifier—identifying the packet as a configuration packet. In one embodiment, this field is set to a value of 127; 2) Cross-Bar Switch Identifier—identifying the cross-bar switch for which the configuration packet is targeted; 3) Command—identifying the configuration operation to be performed in response to the packet; 4) Port Identifier—identifying a sink port or multi-sink port in the identified cross-bar switch; 5) Configuration Register Address ("CRA") [10:0]—identifying a configuration register in the identified sink port or multi-sink port; 6) Data—containing data used in the configuration operation. Remaining fields in the configuration packet are reserved.

A configuration packet containing a write command causes the identified cross-bar switch to write configuration data into to the identified configuration register in the identified sink port. In a write command configuration packet, the Data field contains a value for the sink port to write into the identified configuration register. In one embodiment, this value can be up to 4 bytes long.

A configuration packet containing a read command causes the identified cross-bar switch to send a response packet containing the values of registers in the identified sink port. In a read command configuration packet, the Data field contains a header to be used by a read configuration response packet.

In one embodiment the header is 16 bytes, as shown below in the description of the read configuration response packets. This header is user programmable and set to any value desired by the entity issuing the read command configuration packet.

3. Read Configuration Response Packets

Read configuration response packets carry responses to read commands issued in configuration packets. Multi-sink port 3112 and sink ports 3052, 3054, 3055, 3056, 3057, and 3058 supply read configuration response packets on their communications links. Table V below shows the format of a sink port's read configuration response packet.

TABLE V

Sink Port Read Configuration Response Packet Format

| | | | | |
|---|---|---|---|---|
| 0 | Header [31:0] | | | |
| 1 | Header [63:32] | | | |
| 2 | Header [95:64] | | | |
| 3 | Header [127:96] | | | |
| 4 | Priority Weighting Values [11:0] | FIFO Thresholds [11:0] | R | P |
| 5 | | Retry Time | | |
| 6 | Port Address Table [31:0] | | | |
| 7 | Port Address Table [63:32] | | | |
| 8 | Port Address Table [95:64] | | | |
| 9 | Port Address Table [127:96] | | | |
| 10 | Total Packet Count | | | |
| 11 | Configuration Packet Count | | | |

TABLE V-continued

Sink Port Read Configuration Response Packet Format

| | |
|---|---|
| 12 | Port Enable Rejection Count |
| 13 | Packet Size Rejection Count |
| 14 | Bandwidth Allocation Rejection Count |
| 15 | Sink Overload Rejection Count |

Header [127:0] is the header provided in the read command configuration packet. The remaining fields of the read configuration response packet provide the data held in the above-described sink port registers with corresponding names (See Table I).

Table VI below shows the format of a multi-sink port's read configuration response packet.

TABLE VI

Multi-Sink Port Read Configuration Response Packet Format

| | | | |
|---|---|---|---|
| 0 | Header [31:0] | | |
| 1 | Header [63:32] | | |
| 2 | Header [95:64] | | |
| 3 | Header [127:96] | | |
| 4 | Priority Weighting Values [11:0] | FIFO Thresholds [11:0] | T |
| 5 | | Multicast Register [19:0] | |
| 6 | Port Address Table [31:0] | | |
| 7 | Port Address Table [63:32] | | |
| 8 | Port Address Table [95:64] | | |
| 9 | Port Address Table [127:96] | | |
| 10 | Total Packet Count | | |
| 11 | Configuration Packet Count | | |
| 12 | Port Enable Rejection Count | | |
| 13 | Packet Size Rejection Count | | |
| 14 | Bandwidth Allocation Rejection Count | | |
| 15 | Sink Overload Rejection Count | | |

Header [127:0] is the header provided in the read command configuration packet. The Multicast Register field contains the contents of the multi-sink port's Multicast Register that corresponds to the configuration packet's Configuration Register Address field. The remaining fields of the read configuration response packet provide the data held in the above-described multi-sink port registers with corresponding names (See Table II).

E. Input Ports

Figure 40:
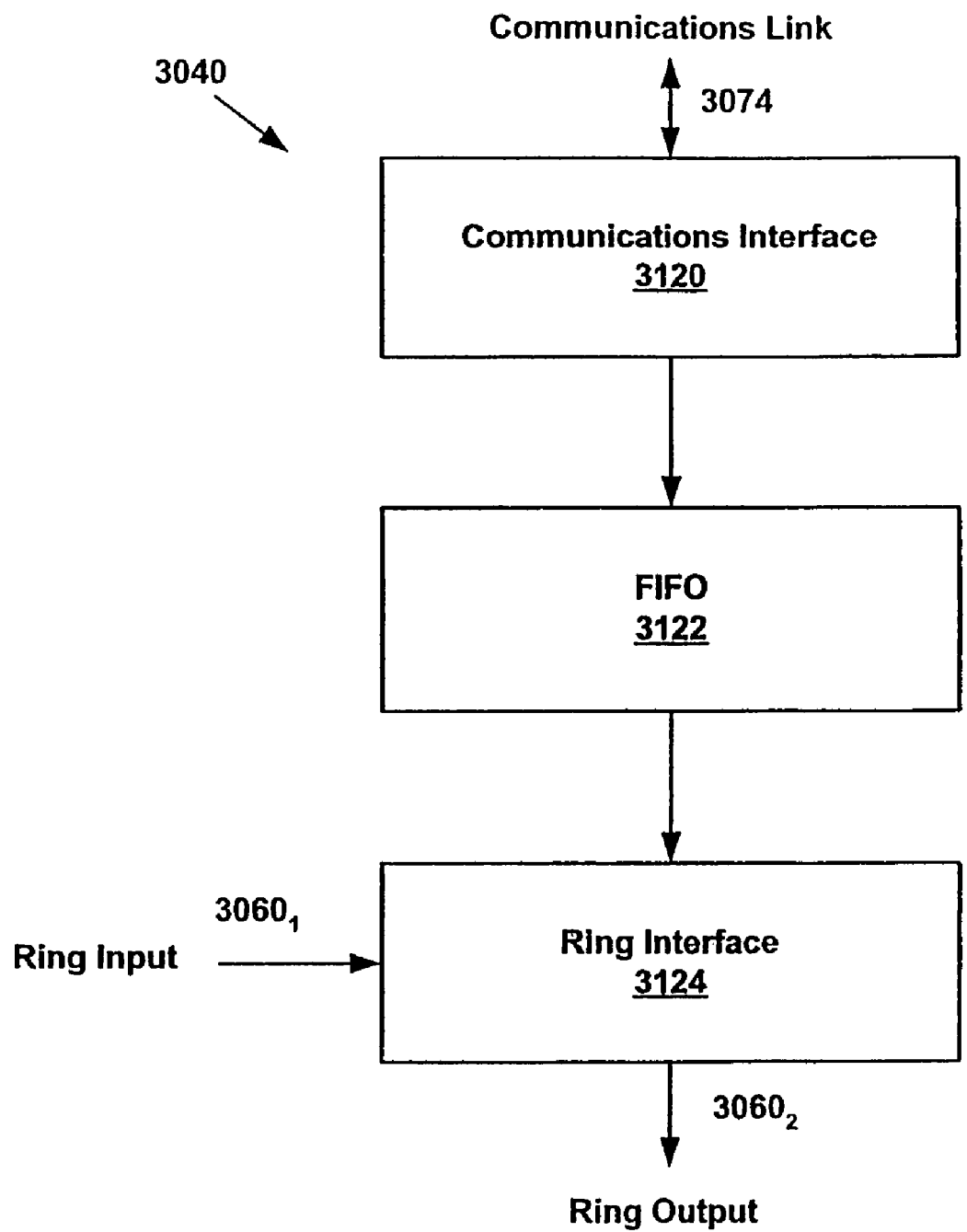
FIG. 40 depicts a block diagram for an input port in the cross-bar switches shown in FIGS. 37 and 39.

FIG. 40 shows a block diagram of input port 3040. FIG. 40 is also applicable to input ports 3042, 3044, 3046, 3048, and 3050.

Input port 3040 includes communications interface 3120 coupled to receive data from communications link 3074. Communication interface 3120 is coupled to provide the received data to FIFO 3122, so the data becomes synchronized with the cross-bar switch's internal clock. In one version of input port 3040, FIFO 3122 holds 32 bytes.

FIFO 3122 is coupled to provide the received data to ring interface 3124, which is coupled to data ring 3060. Ring interface 3124 is also coupled to receive data from data ring segment 3060₁. Ring interface 3124 forwards data onto ring 3060 via data ring segment 3060₂. In addition to providing data, ring interface 3124 also generates and provides the above-described data ring control information on ring segment 3060₂.

Data is forwarded on ring 3060 in time slots. Input port 3040 is allotted a time slot on ring 3060 for forwarding data from communications link 3074 onto ring segment 3060₂. In each remaining time slot, input port 3040 forwards data from ring segment $3060_1$ onto segment $3060_2$. In one embodiment, all input ports coupled to ring 3060 place communications link data onto ring 3060 in the same time slot. When ring interface 3124 receives data on segment $3060_1$ that originated from sink port 3040, ring interface 3124 terminates any further propagation of this data on ring 3060. In one embodiment, sink port 3040 recognizes the arrival of data originating from sink port 3040 by counting the number of time slots that elapse after placing data from link 3074 onto any segment $3060_2$—sink port 3040 knows the number of time slots required for data placed on ring 3060 by port 3040 to propagate around ring 3060 back to port 3040.

In one embodiment, the interface between communications interface 3120 and communications link 3074 includes the following signals: 1) RXD—an input to input port 3040 providing 8 bits of received data; 2) RX_EN—an input to input port 3040 indicating RXD is valid; 3) RX_ER—an input to input port 3040 indicating an error in RXD; 4) COL—an output from input port 3040 indicating that the cross-bar switch cannot accept the incoming data on RXD; and 5) RX_CLK—an input to input port 3040 providing a 125 MHz clock for timing reference for RXD.

In one embodiment of the present invention, the above-described signals conform to the reception signals in the IEEE 802.3 Standard for GMII Gigabit Ethernet. In one such embodiment, RX_CLK is the same frequency as the internal clock of cross-bar switch 3010 within 100 parts per million.

One of ordinary skill will recognize that in alternate embodiments of the present invention communications interface 3120 interfaces to devices conforming to different network standards than described above.

F. Sink Ports

Figure 41:
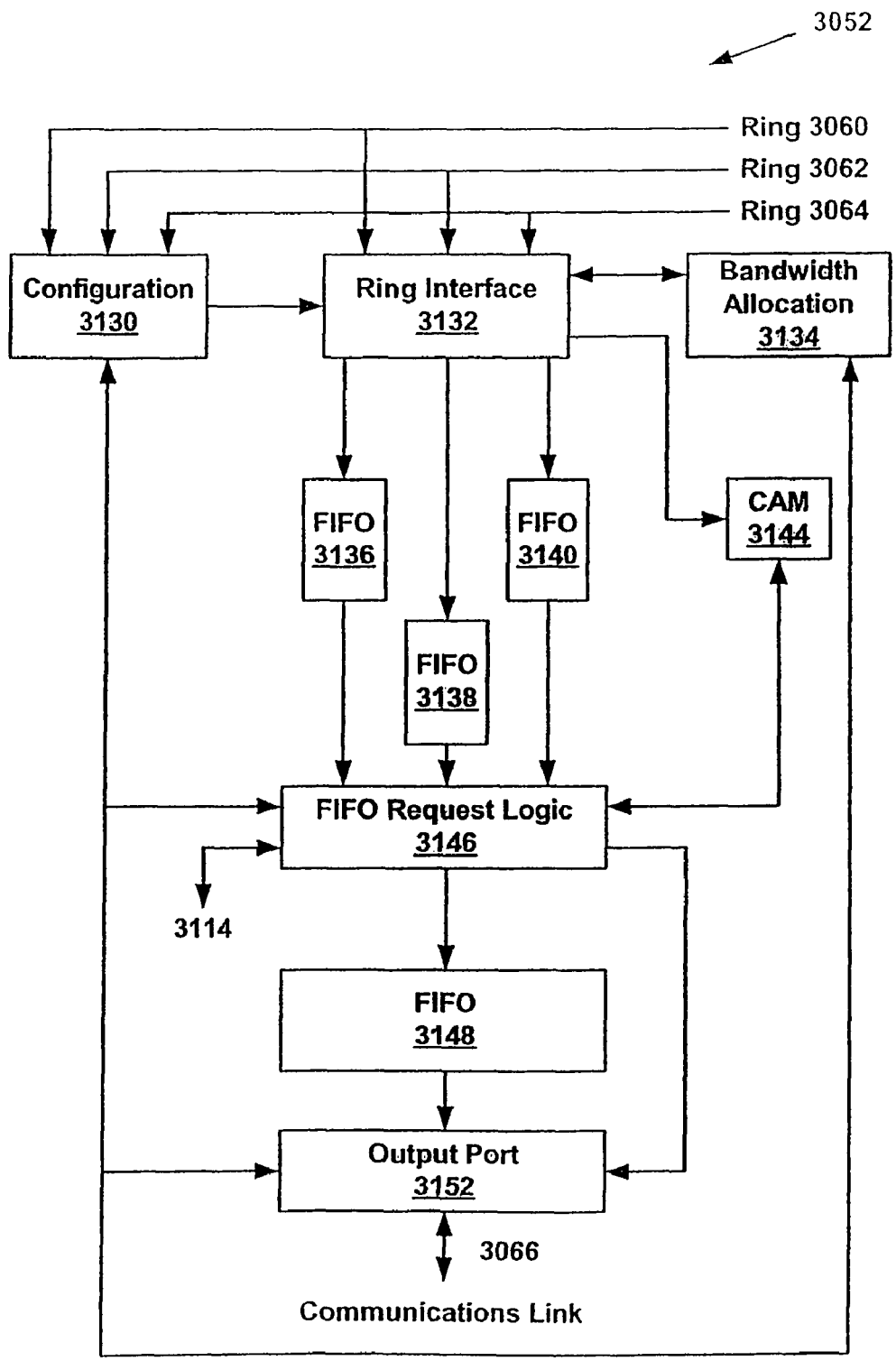
FIG. 41 depicts a block diagram for a sink port in the cross-bar switches shown in FIGS. 37 and 39.

FIG. 41 depicts one version of sink port 3052 that is also applicable to sink ports 3054, 3055, 3056, 3057, and 3058. Sink port 3052 includes ring interface 3132 coupled to receive data from data rings 3060, 3062, and 3064. Ring interface 3132 accepts data packets targeted for sink port 3052. Ring interface 3132 also accepts configuration packets addressed to cross-bar switches other than the one containing ring interface 3132—these configuration packets are treated as data packets. Further details regarding data acceptance is presented below.

Ring interface 3132 is coupled to FIFOs 3136, 3138, and 3140 to provide immediate storage for data retrieved from rings 3060, 3062, and 3064. FIFOs 3136, 3138, and 3140 each store data from a respective ring. FIFO 3136 stores data from ring 3060. FIFO 3138 stores data from ring 3062. FIFO 3140 stores data from ring 3064.

FIFO request logic 3146 couples FIFOs 3136, 3138, and 3140 to FIFO 3148. FIFO request logic 3146 is also coupled to multi-sink port interface 3114 for coupling multi-sink port 3112 to FIFO 3148. FIFO 3148 is coupled to output port 3152 to provide packet data for transmission onto communications link 3066.

FIFO 3148 serves as a staging area for accumulating packet data for transmission onto communications link 3066. In one embodiment, FIFO request logic 3146 arbitrates access to FIFO 3148 over an 8 cycle period. One cycle is dedicated to transferring data from interface 3114 to FIFO 3148, if data exists on interface 3114. Another cycle is reserved for transferring data from FIFO 3148 to output port 3152. The remaining cycles are shared on a round-robin basis for FIFOs 3136, 3138, and 3140 to transfer data to FIFO 3148.

In an alternate embodiment, FIFO 3148 is a multiple port memory capable of simultaneously performing data exchanges on 4 ports. In such an embodiment, there is no need to arbitrate access to FIFO 3148 and FIFOs 3136, 3138, and 3140 can be eliminated ring interface 3132 directly transfers data to FIFO 3148. In this embodiment, the number of packets that can be simultaneously received by sink port 3052 is not limited to 7, since FIFO 3148 is no longer shared over 8 cycles.

Output port 3152 ensures that packets are transmitted onto communications link 3066 in accordance with the signaling protocol employed on link 3066. In one embodiment, communications link 3066 employs the following signals: 1) TXD—an output from sink port 3052 providing a byte of transmit data; 2) TX_EN—an output from sink port 3052 indicating TXD has valid data; 3) TX_ER—an output of sink port 3052 indicating an error with the data transmitted by sink port 3052; 4) TX_CLK—an output from sink port 3052 providing a timing reference for TXD; 5) Hold-off/Retry—an input to sink port 3052 indicating the receiving port cannot accept data (TXD).

The sink port's Retry Mode register controls the operation of Hold-off/Retry (See Table I). When retry mode is enabled, sink port 3052 aborts data transmission on communications link 3066 when Hold-off/Retry is asserted. Sink port 3052 attempts to retransmit the aborted packet at a later time after Hold-off/Retry is deasserted. Sink port 3052 attempts to retransmit the packet for the time period indicated in the sink port's Retry Time register (See Table I). When retry mode is not enabled, asserting Hold-off/Retry causes sink port 3052 to discontinue data transmission on communications link 3066 once the current packet transmission is complete. Sink port 3052 resumes data transmission on communications link 66 once Hold-off/Retry is deasserted.

In one embodiment of the present invention, the above-described signals, except Hold-off/Retry, conform to the transmission signals in the IEEE 802.3 Standard for GMII Gigabit Ethernet. In one such embodiment, TX_CLK is the same frequency as the internal clock of cross-bar switch 3010, and output port 3152 provides an inter-packet gap of 12 TX_CLK cycles between transmitted packets.

One of ordinary skill will recognize that in alternate embodiments of the present invention sink port 3052 includes interfaces to devices conforming to different signaling standards.

Sink port 3052 also includes content addressable memory ("CAM") 3144. CAM 3144 maintains a list of pointers into FIFO 3148 for each of the data packets accepted by ring interface 3132. Ring interface 3052 and FIFO request logic 3146 are coupled to CAM 3144 to provide information about received packets. Based on the provided information, CAM 3144 either creates or supplies an existing FIFO pointer for the packet data being received. Using the supplied pointers, FIFO request logic 3146 transfers data from interface 3114 and FIFOs 3136, 3138, and 3140 to FIFO 3148. The combination of FIFO request logic 3146, CAM 3144 and FIFO 3148 form a multiple entry point FIFO—a FIFO capable of receiving data from multiple sources, namely interface 3114 and FIFOs 3136, 3138, 3140, and 3148. Further details regarding the operation of CAM 3144 appear below.

Sink port 3052 includes bandwidth allocation circuit 3134 to ensure quality of service by regulating sink port bandwidth for different packet priority levels. Bandwidth allocation circuit 3134 is coupled to exchange data with ring interface 3132 to facilitate bandwidth allocation management, which is described in detail below.

Sink port 3052 includes configuration block 3130 for receiving configuration packets. Configuration block 3130 is coupled to data rings 3060, 3062, and 3064 to accept configuration packets addressed to sink port 3052 in cross-bar switch 3010 (switch 3110 in FIG. 39). Configuration block 3130 contains the sink port register structure described above with reference to Table I.

In response to a write command configuration packet, configuration block 3130 modifies the register block in sink port 3052. In response to a read command configuration packet, configuration block 3130 creates a read configuration response packet, as described above with reference to Table V. Configuration block 3130 is coupled to output port 3152 to forward the read configuration response packet onto communications link 3066. Configuration block 3130 is also coupled to Ring interface 3132, FIFO request logic 3146, bandwidth allocation circuit 3134, and output port 3152 to provide configuration settings.

Figure 42:
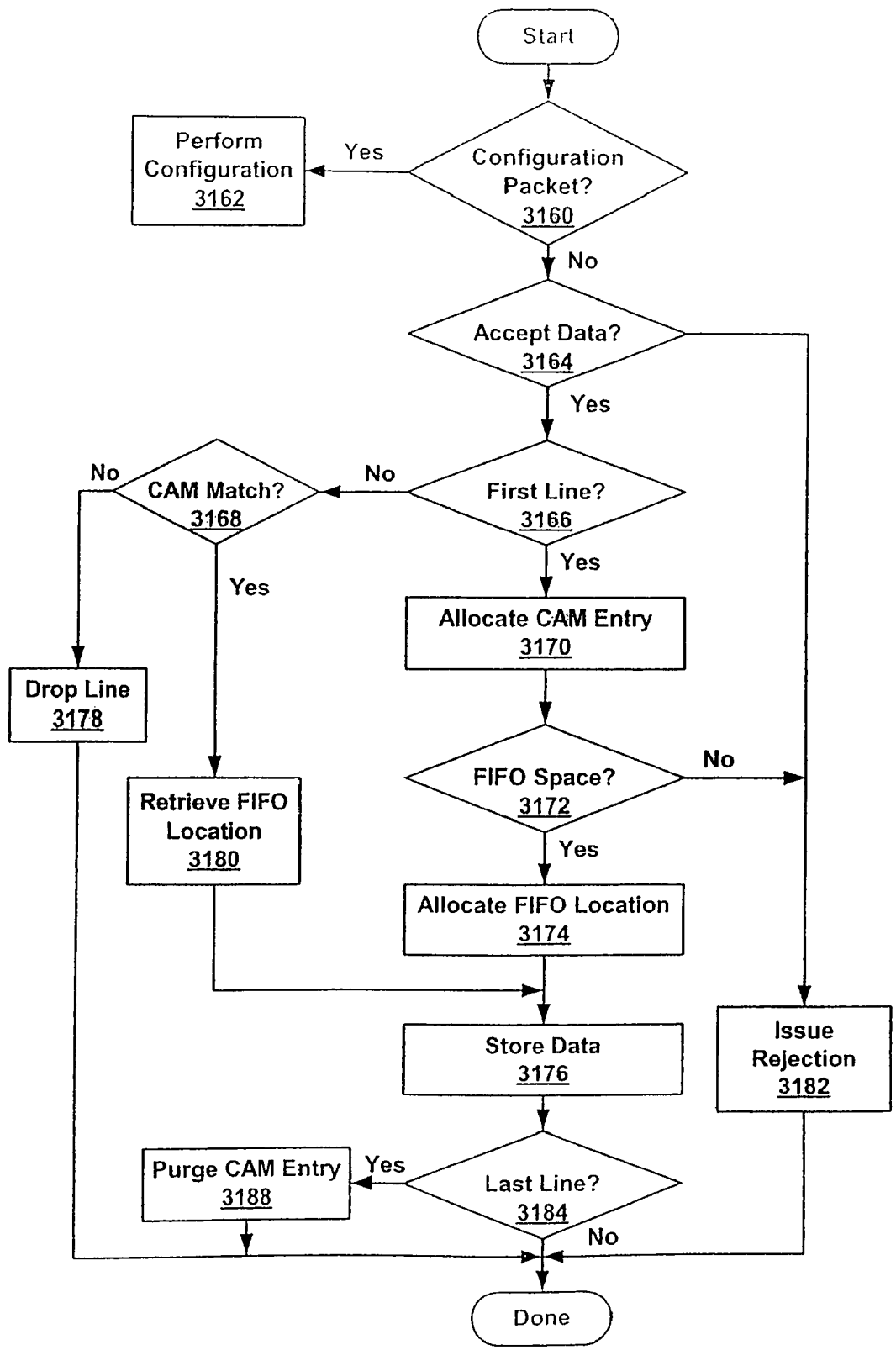
FIG. 42 shows a process employed by the sink port depicted in FIG. 41 for accepting and storing data.

FIG. 42 illustrates steps performed during the operation of sink port 3052 to store data in FIFO 3148 in one embodiment of the present invention. The same process is applicable to sink ports 3054, 3055, 3056, 3057, and 3058.

When sink port 3052 detects data on data ring 3060, 3062, or 3064, sink port 3052 determines whether the data belongs to a configuration packet directed to sink port 3052 (step 3160). Sink port 3052 examines the incoming packet for the following conditions: 1) Configuration Identifier signaling a configuration packet; 2) Cross-Bar Switch Identifier identifying the cross-bar switch housing sink port 3052; and 3) Port Identifier identifying sink port 3052. If these conditions are met, sink port 3052 identifies the packet as a configuration packet for sink port 3052 and performs the configuration command specified in the packet (step 3162). Otherwise, ring interface 3132 determines whether to accept the incoming packet data (step 3164).

In performing configuration operations (step 3162) sink port 3052 forwards the incoming packet to configuration block 3130. Configuration block 3130 performs the command called for in the packet. In response to a write command, configuration block 3130 modifies the configuration registers in sink port 3052 in accordance with the packet's write instruction. In response to a read command, configuration block 3130 generates a read configuration response packet and forwards the packet to output port 3152 for transmission onto communications link 3066.

When determining whether to accept the packet (step 3164), ring interface 3132 makes a series of evaluations. In one embodiment of the present invention, these include verifying the following conditions: 1) sink port 3052 is configured to accept the packet's Destination Address, if the First Line data ring control signal is asserted; 2) sink port 3052 is currently accepting data from the input port source providing the data, if the First Line data ring control signal is not asserted; 3) bandwidth allocation logic 3134 has not indicated that the priority level for the received data is halted, if the First Line data ring control signal is asserted; 4) sink port 3052 has not already accepted the maximum allowable number of packets for concurrent reception; 5) sink port 3052 is enabled to accept packet data; 6) the packet is a legal packet size—in one embodiment a legal packet size ranges from 3064 to 9,000 bytes; and 7) space is available for the packet in FIFO 3148.

Sink port 3052 rejects the incoming data if the incoming packet data fails to meet any of the conditions (step 3182). Sink port 3052 issues the rejection signal to the input port that placed the rejected packet data on data ring 3060, 3062, or 3064. The input port stops receiving the packet and makes no more transfers of the packet's data to data ring 3060, 3062, or 3064. When the rejected packet is targeted to multiple sink ports, the other sink ports will also stop receiving the packet data on ring 3060, 3062, or 3064. The loss of data causes these ports to assert the TX_ER signal if packet transmission has already started.

If all the acceptance conditions are met, sink port 3052 conditionally accepts the packet data. As part of initially accepting the data, ring interface 3132 provides the data ring control signals to CAM 3144. CAM 3144 determines whether the data originates from a packet's first line (step 3166). If the data is a first line, then CAM 3144 allocates a new CAM entry for the packet (step 3170). In one embodiment, each CAM entry includes an address tag and a pointer into FIFO 3148. The address tag contains the Source Identifier for the packet from the data ring control signals. The pointer into FIFO 3148 serves as an address in FIFO 3148 for beginning to store the received data. The address for the pointer into FIFO 3148 is determined at a later time.

Once a CAM location is allocated, FIFO request logic 3146 determines whether FIFO 3148 still has room for the newly accepted packet (step 3172). As described above, FIFO request logic 3146 transfers data from FIFOs 3136, 3138, and 3140 to FIFO 3148. When FIFO request logic 3146 retrieves data for a new packet from FIFO 3136, 3138, or 3140, request logic 3146 makes this determination by comparing the bytes available in FIFO 3148 to the Size field in the data packet header.

If FIFO 3148 does not have sufficient space, then sink port 3052 rejects the packet (step 3182) and purges the packet's allocated entry in CAM 3144. If FIFO 3144 has sufficient space, FIFO request logic 3146 allocates a block of memory in FIFO 3148 for the packet (3174). As part of the allocation, FIFO request logic 3146 supplies CAM 3144 with a FIFO pointer for the packet (step 3174). Once a block of memory in FIFO 3148 is allocated, request logic 3146 stores the packet data in FIFO 3148 (step 3176). As part of storing the data in FIFO 3148, FIFO request logic 3146 provides CAM 3144 with an updated FIFO pointer to the location in FIFO 3148 for the next data received from this packet.

If the accepted packet data is not a packet's first line (step 3166), then CAM 3144 determines whether a FIFO pointer for the data's packet is maintained in CAM 3144 (step 3168). CAM 3144 compares the Source Identifier provided by ring interface 3132 against the address tags in CAM 3144. If CAM 3144 doesn't find a match, the accepted data is dropped and the process for that packet is done in sink port 3052 (step 3178).

If CAM 3144 locates a matching source tag (step 3168), then CAM 3144 provides the corresponding pointer into FIFO 3148 to FIFO request logic 3146 when requested (step 3180). FIFO request logic 3146 requests the pointer after removing data from FIFO 3136, 3138, or 3140. After obtaining the FIFO pointer, FIFO request logic 3146 stores the data in FIFO 3148 and provides CAM 3144 with an updated FIFO pointer (step 3176).

After performing a data store, FIFO request logic 3146 determines whether the stored data is the last line of a packet (step 3184). In one embodiment, FIFO request logic 3146 receives the Last Line data ring control signal from ring interface 3132 to make this determination. In an alternate embodiment, the control signals from data rings 3060, 3062, and 3064 are carried through FIFOs 3136, 3138, and 3140, along with their corresponding data. If the data is a packet's last line, then FIFO request logic 3146 instructs CAM 3144 to purge the entry for the packet (step 3188). Otherwise, no further action is taken with respect to the stored data.

Output port 3152 retrieves packet data from FIFO 3148 and transmits packets onto communications link 3066. FIFO request logic 3146 provides output port 3152 with a signal indicating whether FIFO 3148 is empty. As long as FIFO 3148 is not empty, output port 3152 retrieves packet data from FIFO 3148.

When multi-sink port 3112 wishes to transfer a data packet to sink-port 3052, multi-sink port 3112 issues a request to sink port 3052 on interface 3114. FIFO request logic 3146 receives the request and sink port 3052 determines whether to accept the packet data. Sink port 3052 accepts the data if sink port 3052 is enabled and FIFO 3148 in sink port 3052 has capacity to handle the additional packet.

In one embodiment, sink port 3052 performs the steps shown in FIG. 42 with the following exceptions and modifications. Sink port 3052 does not determine whether multi-sink port 3112 is sending a configuration packet—this is not necessary. FIFO request logic 3146 determines whether to accept the packet from multi-sink port 3112 (step 3164), instead of ring interface 3132 making this determination.

In response to a multi-sink request, the acceptance step (3164) is modified. Acceptance is initially granted by FIFO request logic 3146 asserting an acknowledgement signal on interface 3114, if sink port 3052 is enabled. If sink port 3052 is not enabled, FIFO request logic 3146 does not assert an acknowledgement. After sink port 3052 issues an acknowledgement, multi-sink port 3112 sends packet data to FIFO request logic 3146. The remaining process steps described in FIG. 42 are performed for the data from multi-sink port 3112. In one embodiment, if sink port 3052 discovers that FIFO 3148 has insufficient space (step 3172, FIG. 42), sink port 3052 withholds acknowledgement from multi-sink port 3112—sink port 3052 does not issue a rejection signal.

Sink port 3052 regulates access to FIFO 3148, so multi-sink port 3112 and data rings 3060, 3062, and 3064 have access for write operations and output port 3152 has access for read operations. In one embodiment, sink port 3052 allocates access to FIFO 3148 within every 8 accesses to FIFO 3148. Within every 8 accesses to FIFO 3148, sink port 3052 allocates 6 access for writing FIFO 3148 with packet data not originating from multi-sink port 3112. Sink port 3052 allocates 1 access for writing packet data originating from multi-sink port 3112. Sink port 3052 reserves 1 cycle for output port 3152 to read data from FIFO 3148. In one such embodiment, sink port 3052 only allows concurrent reception of 6 packets from rings 3060, 3062, and 3064 and 1 packet from multi-sink port interface 3114.

G. Multi-Sink Port

Figure 43:
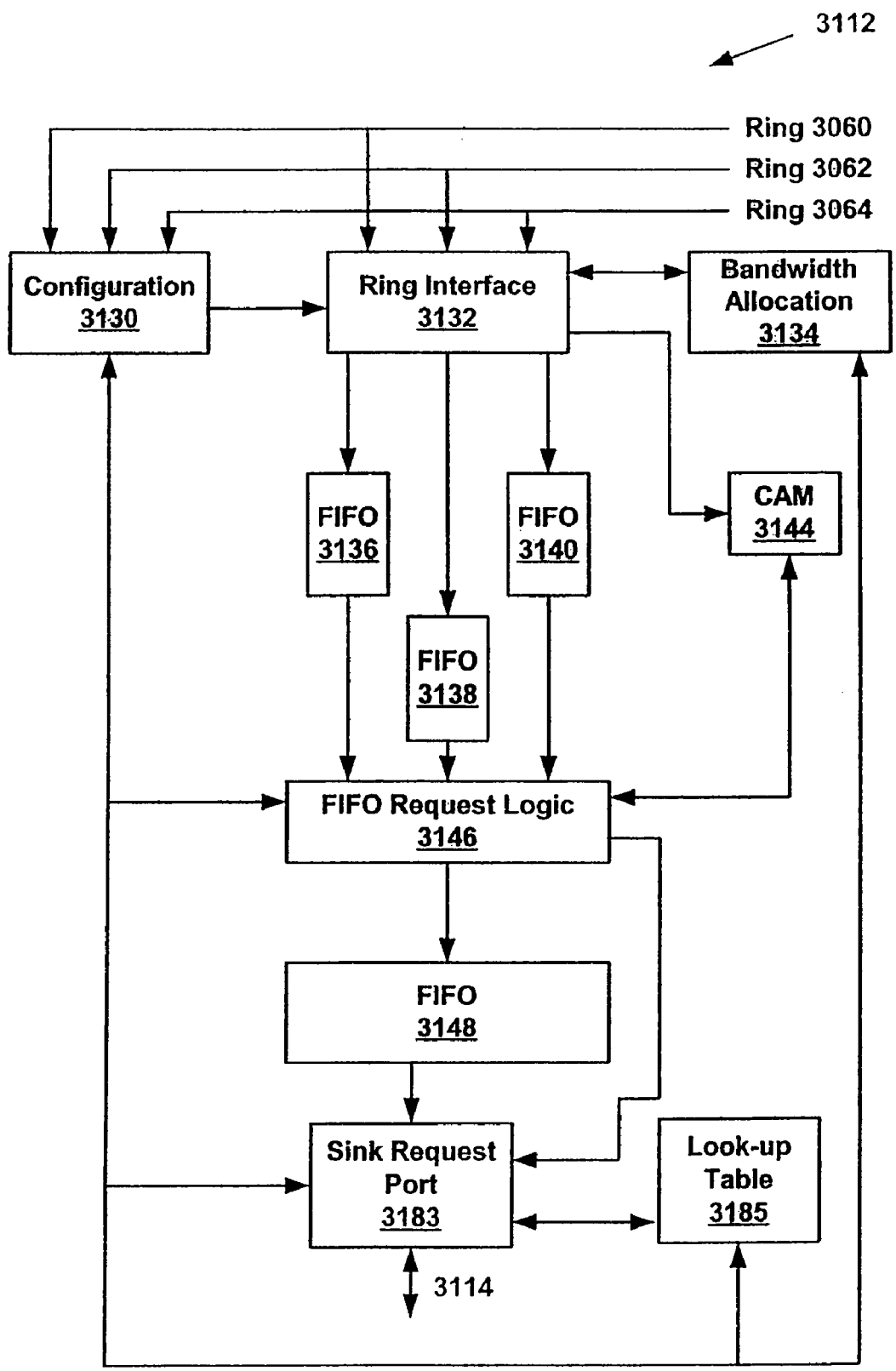
FIG. 43 shows a block diagram for the multi-sink port depicted in FIG. 39.

FIG. 43 depicts a design for multi-sink port 3112 in one embodiment of the present invention. Multi-sink port 3112 is very similar to the sink port 3052 architecture and operation shown in FIGS. 41 and 42. The elements in FIG. 43 with the same reference numbers as elements in FIG. 41 operate the same, with the following exception. Ring interface 3132 does not accept configuration packets targeting ports other than multi-sink port 3112.

In multi-sink port 3112, sink request port 3183 and lookup table 3185 replace output port 3152 from sink port 3052. Lookup table 3185 contains the contents of the Multicast Registers described above with reference to the configuration registers for multi-sink port 3112 (Table II)—configuration block 3130 passes Multicast Register information to look-up table 3185 and maintains the other configuration registers for multi-sink port 3112. Sink request port 3183 is coupled to FIFO 3148 to retrieve packet data and FIFO request logic 3146 to receive a signal indicating whether FIFO 3148 is empty. Sink request port 3183 retrieves data from FIFO 3148 when FIFO 3148 is not empty. Sink request port 3183 forwards the retrieved packet data to sink ports targeted to receive the packet data. Sink request port 3183 is coupled to lookup table 3185 to identify the sink ports targeted by the packet.

Sink request port 3183 supplies packet data on sink port interface 3114. Sink port interface 3114 includes 2 separate buses. One bus carries packet data to sink ports that first respond to a data transfer request from multi-sink port 3112. The other bus provides the same packet data to sink ports that accept the request from multi-sink port 3112 at a later time. In one embodiment, each bus in interface 3114 includes an 8 byte wide data path and the control signals identified above for data rings 3060, 3062, and 3064. In order to establish communication with the sink ports, interface 3114 also includes request and acknowledgement signals.

Figure 44:
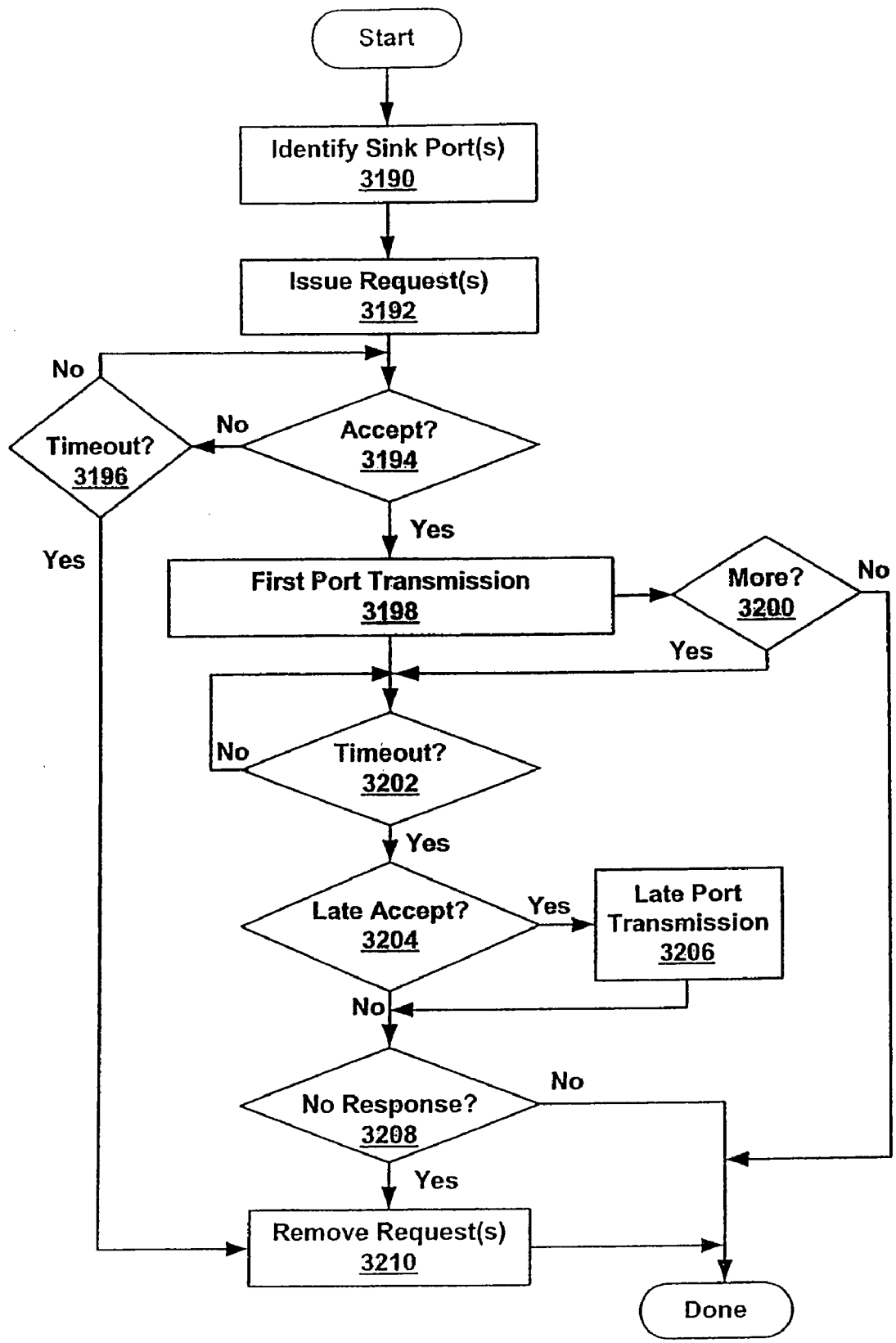
FIG. 44 shows a process employed by the multi-sink port depicted in FIG. 43 for transferring packet data to sink ports.

FIG. 44 illustrates a series of steps performed by sink request port 3183 to transfer packets to sink ports in one embodiment of the present invention. Prior to the process shown in FIG. 44, multi-sink port 3112 stores data into FIFO 3148 in port 3112 by employing the process described above with reference to FIG. 42. Sink request port 3183 retrieves a data packet from FIFO 3148 and determines the targeted sink ports for the packet (step 3190). Sink request port 3183 provides the packet's Destination Address to lookup table 3185. Lookup table 3185 employs a portion of the Destination Address to identify the targeted sink ports. In one embodiment, lookup table 3183 employs the 6 least significant bits of the Destination Address to select a Multicast Register, which identifies the sink ports corresponding to the Destination Address.

Sink request port 3183 asserts a request to the targeted sink ports on interface 3114 (step 3192). Sink request port 3183 then waits for a sink port acknowledgement (step 3194). Sink request port 3183 only allows the request to remain outstanding for a predetermined period of time. In one embodiment, a user configures this time period to either 1,500 or 9,000 cycles of the internal clock for cross-bar switch 3110. While the request is pending without acknowledgement, sink request port 3183 monitors the elapsed request time to determine whether the predetermined time period has elapsed (step 3196). As long as the time period has not elapsed, sink request port 3183 continues to await an acknowledgement (step 3194). If the predetermined period of time elapses, sink request port 3183 removes the requests and the multi-sink data packet is not forwarded (step 3210).

After an acknowledgement is received (step 3194), sink request port 3183 transmits packet data to the accepting sink ports on the first bus in interface 3114, along with the specified control signals (step 3198). After initiating the packet data transmission, sink request port 3183 determines whether more sink port requests are outstanding (step 3200). If sink request port 3183 detects that all requested sink targets have provided an acknowledgement (step 3200), then the multi-sink data transmission process is over If sink request port 3183 determines that not all requested sink ports have provided an acknowledgement (step 3200), port 3183 waits for the predetermined time period to elapse (step 3202). After the time period elapses, sink request port 3180 determines whether any additional sink ports have acknowledged the request (step 3204). For each sink port issuing a late acknowledgement, sink request port transmits packet data to the port over the second bus in interface 3114, along with data ring control signals (step 3206).

If there are no late acceptances, sink request port 3183 determines whether any ports failed to respond to the pending request (step 3208). Sink request port 3183 makes this same determination after initiating packet data transmission to the late accepting sink ports. For each sink port not acknowledging the request, sink request port 3183 removes the request (step 3210). If there are no sink ports failing to acknowledge the request, then the multi-sink port's requested data transfer is complete.

Multi-sink port 3112 repeats the above-described process for all data stored in FIFO 3148.

H. Bandwidth Allocation

Bandwidth allocation circuit 3134 (FIG. 41) monitors traffic flowing through sink port 3052 and manages the bandwidth allocated to different data packet priority levels. In multi-sink port 3112, bandwidth allocation circuit 3134 (FIG. 43) performs the same function. The operation of bandwidth allocation circuit 3134 is described below with reference to sink port 3052. The same operation applies to sink ports 3054, 3055, 3056, 3057, and 3058, as well as multi-sink port 3112.

Data packets arrive at cross-bar switch 3010 with a Priority Level field in their headers (See Table III). Bandwidth allocation circuit 3134 instructs ring interface circuit 3132 to reject packets with priority levels receiving more bandwidth than allotted. Ring interface 3132 employs these instructions to reject new incoming packets during the acceptance step (step 3164) described above with reference to FIG. 42. In one embodiment, bandwidth allocation circuit 3134 doesn't call for the rejection of any priority levels until the number of bytes in FIFO 3148 exceeds a predetermined threshold and multiple priority levels appear at ring interface 3132.

Figure 45:
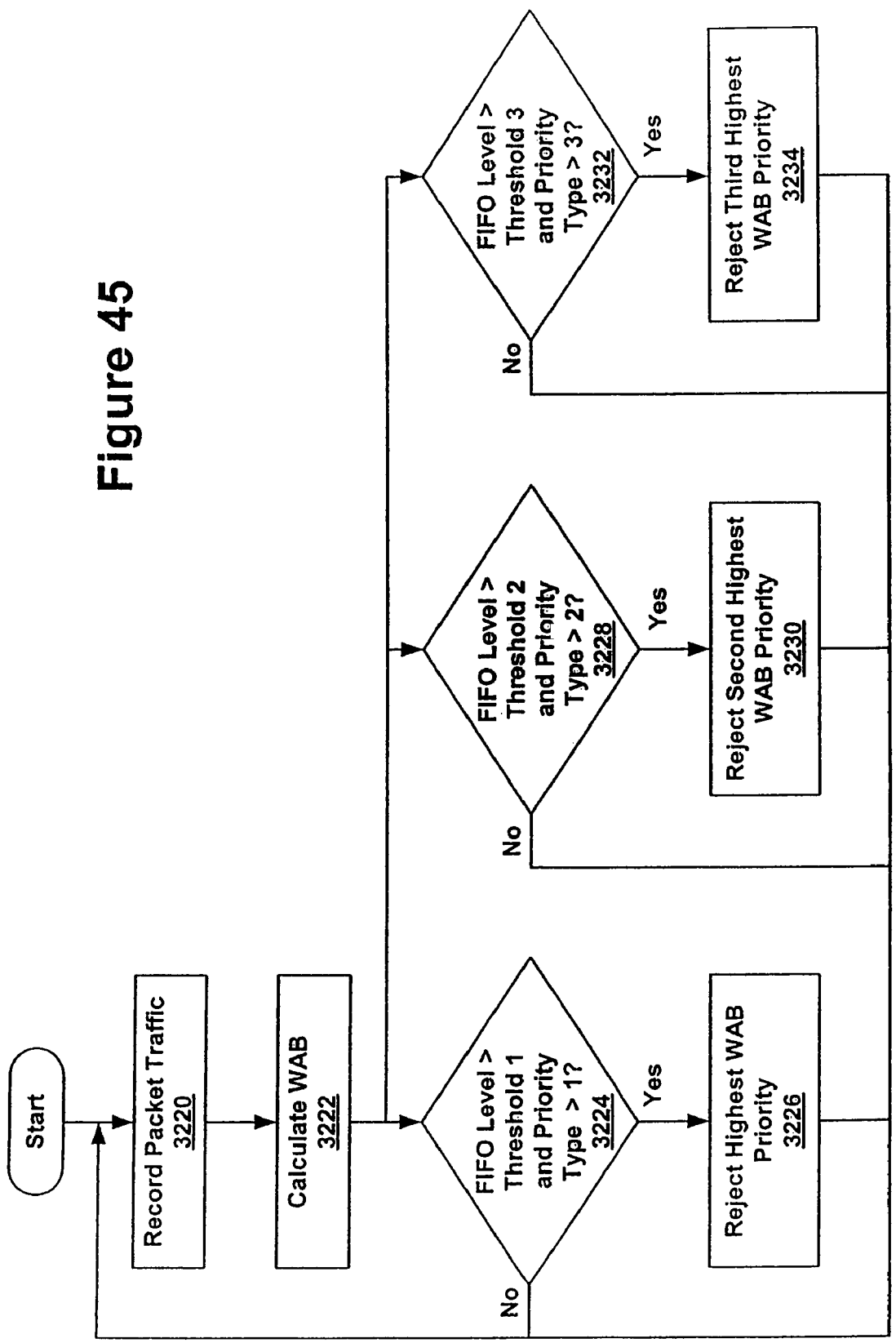
FIG. 45 illustrates a bandwidth allocation process employed by a cross-bar switch in accordance with the present invention.

FIG. 45 illustrates a series of steps performed by bandwidth allocation circuit 3134 in sink port 3052 and multi-sink port 3112 in one embodiment of the present invention. In configuring the sink port or multi-sink port for bandwidth allocation, a user configures the port to have three threshold values for FIFO 3148 (See Tables I and II—FIFO Thresholds field). A user provides these threshold values in a write command configuration packet for entry into the port's configuration registers.

As packets pass through ring interface 3132, bandwidth allocation circuit 3134 records the amount of packet traffic for each priority level for a fixed time window (step 3220). Bandwidth allocation circuit 134 also maintains historic traffic counts for each priority level. In one embodiment, the time window is approximately half the size of FIFO 3148 (approximately 16K bytes in one embodiment), and four historical time window periods are maintained. In alternate embodiments, the time window period and the number of historical time window periods are modified. A greater number of historical time periods decreases the significance of the traffic in the current time period in allocating bandwidth. In one embodiment, there are 4 possible priority levels, and the priority level for a packet appears in the packet's header (See Table III). In one such embodiment, bandwidth allocation circuit 3134 records packet traffic for each priority level using the Size field in packet headers.

Bandwidth allocation circuit 3134 calculates a weighted average bandwidth ("WAB") for each priority level (step 3222). Sink port 3052 and multi-sink port 3112 are configured to have a Priority Weighting Value ("PWV") for each priority level (See Tables I and II). Bandwidth allocation circuit 3134 calculates the WAB for each priority by dividing the sum of the priority's recorded traffic for the current and historical time window periods by the priority's PWV.

After performing WAB calculations (step 3222), bandwidth allocation circuit 3134 makes a series of determinations. Bandwidth allocation circuit 3134 determines whether the lowest FIFO threshold value (Threshold 1) has been surpassed and more than 1 WAB value is greater than 0—indicating that more than 1 priority level appears in the received data packets (step 3224). If these conditions are both true, bandwidth allocation circuit 3134 instructs ring interface 3132 to reject new incoming packets with a priority level matching the priority level with the highest WAB value (step 3226). If either the FIFO threshold or WAB condition isn't met, bandwidth allocation circuit 3134 does not issue the rejection instruction.

Bandwidth allocation circuit 3134 also determines whether the second highest FIFO threshold value (Threshold 2) has been surpassed and more than 2 WAB values are greater than 0—indicating that more than 2 priority levels appear in the received data packets (step 3228). If these conditions are both true, bandwidth allocation circuit 3134 instructs ring interface 3132 to reject new incoming packets with a priority level matching the priority level with the second highest WAB value (step 3230). If either condition is not met, bandwidth allocation circuit 3134 does not issue the rejection instruction.

Bandwidth allocation circuit 3134 also determines whether the highest FIFO threshold value (Threshold 3) has been surpassed and more than 3 WAB values are greater than 0—indicating that more than 3 priority levels appear in the received data packets (step 3232). If these conditions are both true, bandwidth allocation circuit 3134 instructs ring interface 3132 to reject new incoming packets with a priority level matching the priority level with the third highest WAB value (step 3234). If either condition fails, bandwidth allocation circuit 3134 does not issue the rejection instruction. In one embodiment, bandwidth allocation circuit 3134 performs the above-described tests and issues rejection instructions on a free running basis.

Ring interface 3132 responds to a rejection instruction from bandwidth allocation circuit 3134 by refusing to accept packets with identified priority levels. Ring interface 3132 continues rejecting the packets for a predetermined period of time. In one embodiment, the predetermined time period is 6000 cycles of the port's clock.

The following provides an example of bandwidth allocation circuit 3134 in operation. FIFO 3148 has 32,000 bytes, and the FIFO thresholds are as follows: 1) Threshold 1 is 18,000 bytes; 2) Threshold 2 is 20,000 bytes; and 3) Threshold 3 is 28,000 bytes. The priority weighting values are as follows: 1) PWV for Priority 1 is 16; 2) PWV for Priority 2 is 8; 3) PWV for Priority 3 is 4; and 4) PWV for Priority 4 is 128.

The sum of the recorded traffic in the current time window and four historical time windows for each priority is 128 bytes, and FIFO 3148 contains 19,000 bytes. The WAB values are as follows: 1) WAB for Priority 1 is 8; 2) WAB for Priority 2 is 16; 3) WAB for Priority 3 is 32; and 4) WAB for Priority 4 is 1. This results in bandwidth allocation circuit 3134 instructing ring interface 3132 to reject packets with priority level 3—the priority level with the highest WAB value.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. A network device comprising:
a set of compute elements internal to the network device, wherein the set of compute elements perform a set of network services on packet data, and wherein the set of compute elements are arranged in a processing pipeline to provide the set of network services;
a forwarding table stored within the network device that defines a plurality of different routes through the compute elements of the network device, the routes defining different sets of one or more of the network services and specifying an order for applying the network services;
a hardware switching fabric internal to the network device and coupling the compute elements to communicate the packet data between the compute elements; and
a flow control element to receive a data packet, to identify the data packet as being associated with a subscriber of a data center, and to identify a subset of the network services that are associated with the identified subscriber,
wherein, in response to receiving the data packet, the flow control element selects one of the routes based on the subset of network services identified as associated with the subscriber and attaches a route tag to the packet to identify the selected route,
wherein the route tag causes the data packet to be forwarded within the network device to a first one of the compute elements in the processing pipeline and causes output from one of the compute elements in the processing pipeline to be forwarded to a next compute element in the processing pipeline along the selected route through the compute elements for performing the subset of the services associated with the identified subscriber.

2. The network device of claim 1 wherein said set of network services further includes Web switching.

3. The network device of claim 1 wherein said set of network services further includes Web caching.

4. The network device of claim 1, further comprising at least one removable blade,
wherein one or more of the plurality of compute elements and switching fabric are arranged on the blade, and
wherein the one or more of the plurality of compute elements are arranged on the blade in the processing pipeline to provide the network services to the packet traffic.

5. The network device of claim 4 wherein said device includes at least two blades.

6. The network device of claim 1 further including at least one secure input/output port and at least one public input/output port.

7. The network device of claim 1 wherein each of said compute elements is optimized to perform one of said set of services.

8. The network device of claim 1 wherein each of said compute elements performs all said services in said set.

9. The network device of claim 1 wherein a first set of said plurality of compute elements comprise control elements and a second set of said plurality of compute element comprise service computation elements.

10. The network device of claim 1, further comprising control code executed on one or more of the control elements to enable said network services on the service computation elements,
wherein said control code includes an operating system, and
wherein said control code includes an IP stack.

11. The network device of claim 10 wherein said control code includes a service provisioning architecture.

12. The network device of claim 10 wherein said control code includes content services applications.

13. The network device of claim 1, wherein the network services include at least a stateful firewall service, Network Address Translation, Internet Protocol forwarding, bandwidth management, Secure Sockets Layer operations or virtual private networking.

14. A network services device, comprising:
a plurality of compute elements optimized to provide network content services on data packets coupled to the device; and
a switching fabric coupling said plurality of compute elements; and
an input/output element coupled to said switching fabric and said network,
wherein the compute elements are arranged in a processing pipeline to provide said set of network services; and
flow control means for receiving a data packet, identifying the data packet as being associated with a subscriber of a data center, identifying a set of one or more of the network services that are associated with the identified subscriber, and attaching a route tag to the data packet,
wherein the flow control means stores a forwarding table that defines a plurality of different routes through the compute elements of the network device, the routes defining different sets of one or more of the network services and specifying an order for applying the network services,
wherein, in response to receiving the data packet, the flow control means selects one of the routes based on the subset of network services identified as associated with the subscriber, and attaches the route tag to the packet to identify the selected route,
wherein the switch fabric forwards the data packet along the selected route through the processing pipeline of the compute elements to perform the one or more network services associated with the identified subscriber.

15. The network services device of claim 14 wherein said plurality of compute elements further includes:
means for performing a stateful firewall service;
means for performing Network Address Translation;
means for performing Internet Protocol forwarding;
means for performing bandwidth management;
means for performing Secure Sockets Layer operations,
means for performing virtual private networking; and
means for performing Web caching.

16. The network services device of claim 14 wherein said plurality of compute elements further includes means for performing Web switching.

17. The network services device of claim 14 wherein said plurality of compute elements is provided on a plurality of blades, each blade including a subset of said plurality of compute elements.

18. The network services device of claim 17 wherein said switching fabric includes a cross-bar switch.

19. The network services device of claim 18 wherein each said blade includes at least one cross-bar switch and at least one of said plurality of compute elements.

20. The network services device of claim 19 wherein a first of said plurality of blades includes at least a first of said compute elements comprising a control compute element and at least a second of said blades includes at least a second of said compute elements comprising a content service provision element.

21. The network services device of claim 14 further comprising a computer-readable storage medium storing code, on one of said compute elements, for routing packets within the network services device to said compute elements and microcode in said compute elements to perform said services.

22. The network services device of claim 21 wherein said device further includes a control compute element maintaining flow conversations amongst said plurality of compute elements.

23. A network content services device, coupled to a network and at least one secure content domain, comprising:
- a plurality of compute elements;
- a first input/output port coupled to said network;
- a second input/output port coupled to the secure content domain;
- a switching fabric coupling the input/output ports and compute elements;
- a computer-readable storage medium storing code operable on the plurality of compute elements to provide network services to streams of packets received from subscribers, wherein the compute elements are arranged in a processing pipeline to operate said code; and
- a flow control element to receive a data packet, to identify the data packet as being associated with a subscriber of a data center, to identify a set of one or more of the network services that are associated with the identified subscriber, wherein the flow control element stores a forwarding table that defines a plurality of different routes through the compute elements of the network device, the routes defining different sets of one or more of the network services and specifying an order for applying the network services, wherein, in response to receiving the data packet, the flow control element selects one of the routes based on the subset of network services identified as associated with the subscriber, and attaches a route tag to the packet to identify the selected route, and wherein the switch fabric forwards the data packet along the selected route through the processing pipeline of the compute elements to perform the one or more network services associated with the identified subscriber.

* * * * *

UNITED STATES PATENT AND TRADEMARK OFFICE
CERTIFICATE OF CORRECTION

| | | |
|---|---|---|
| PATENT NO. | : 7,765,328 B2 | Page 1 of 1 |
| APPLICATION NO. | : 11/983135 | |
| DATED | : July 27, 2010 | |
| INVENTOR(S) | : Bryers et al. | |

It is certified that error appears in the above-identified patent and that said Letters Patent is hereby corrected as shown below:

On the Title page, Item (75) 12th inventor, "Chau Ahn Ngoc Nguyen" should read
-- Chau Anh Ngoc Nguyen --

Signed and Sealed this
Eighth Day of October, 2013

Teresa Stanek Rea
*Deputy Director of the United States Patent and Trademark Office*